(12) United States Patent  
Kinoshita et al.

(10) Patent No.: US 7,864,232 B2  
(45) Date of Patent: Jan. 4, 2011

(54) SIGNAL PROCESSING APPARATUS FOR SOLID-STATE IMAGING DEVICE, SIGNAL PROCESSING METHOD, AND IMAGING SYSTEM

(75) Inventors: Masaya Kinoshita, Kanagawa (JP); Hideho Une, Tokyo (JP); Masahito Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 11/557,675

(22) Filed: Nov. 8, 2006

(65) Prior Publication Data

US 2007/0146511 A1 Jun. 28, 2007

(30) Foreign Application Priority Data

Nov. 17, 2005 (JP) ............................. 2005-332308

(51) Int. Cl.  
*H04N 5/335* (2006.01)
(52) U.S. Cl. ...................................... 348/272; 348/234
(58) Field of Classification Search ................. 348/242, 348/241, 272, 222.1, 234  
See application file for complete search history.

(56) References Cited

U.S. PATENT DOCUMENTS 7,202,895 B2 * 4/2007 Hirai ........................... 348/272  
2004/0119854 A1 * 6/2004 Funakoshi et al. ........... 348/242

FOREIGN PATENT DOCUMENTS

| JP | 06006599 A | * | 1/1994 |
| JP | 10-271519 | | 10/1998 |
| JP | 2000-188761 | | 7/2000 |
| JP | 2004-135206 | | 4/2004 |
| JP | 2004135206 A | * | 4/2004 |

* cited by examiner

*Primary Examiner*—Tuan Ho  
(74) *Attorney, Agent, or Firm*—Oblon, Spivak, McClelland, Maier & Neustadt, L.L.P.

(57) ABSTRACT

A signal processing apparatus corrects color mixture between pixel cells in a solid-state imaging device in which the pixel cells including photoelectric transducers are two-dimensionally arranged in an array and in which color filters having primary color components for generating luminance components and other color components are arranged over the pixel cells. The signal processing apparatus includes correction processing means for performing the correction to the signal from a target pixel by using the signals from multiple neighboring pixels adjacent to the target pixel in the solid-state imaging device and correction parameters independently set for the signals.

17 Claims, 45 Drawing Sheets

(1) WHEN VALUE OF DIRECTIONAL SELECTION IS EQUAL TO ZERO

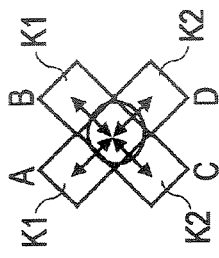

Sig_C' = Sig_C + K1×[(Sig_C−Sig_UL) + (Sig_C−SigLR)] + K2×[(Sig_C−SigUR) + (Sig_C−SigLL)]

(2) WHEN VALUE OF DIRECTIONAL SELECTION IS EQUAL TO ONE

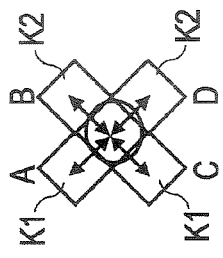

Sig_C' = Sig_C + K1×[(Sig_C−Sig_UL) + (Sig_C−SigLL)] + K2×[(Sig_C−SigUR) + (Sig_C−SigLR)]

(3) WHEN VALUE OF DIRECTIONAL SELECTION IS EQUAL TO TWO

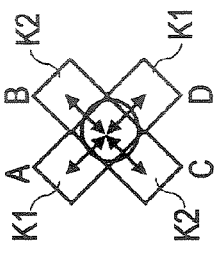

Sig_C' = Sig_C + K1×[(Sig_C−Sig_UL) + (Sig_C−SigUR)] + K2×[(Sig_C−SigLR) + (Sig_C−SigLL)]

FIG. 20

Sig_C' = Sig_C + K[(Sig_C−Sig_UL) + (Sig_C−SigUR) + (Sig_C−SigLL) + (Sig_C−SigLR)]

| | | |
|---|---|---|
| 4N+1-TH LINE | R/Ggo/Gb/Ggo ch | R1 R2 R3 R4 R5 R6 |
| | Gr/Gge/B/Gge ch | Gr1 Gr2 Gr3 Gr4 Gr5 Gr6 |
| 4N+2-TH LINE | R/Ggo/Gb/Ggo ch | Ggo1 Ggo2 Ggo3 Ggo4 Ggo5 Ggo6 |
| | Gr/Gge/B/Gge ch | Gge1 Gge2 Gge3 Gge4 Gge5 Gge6 |
| 4N+3-TH LINE | R/Ggo/Gb/Ggo ch | Gb1 Gb2 Gb3 Gb4 Gb5 Gb6 |
| | Gr/Gge/B/Gge ch | B1 B2 B3 B4 B5 B6 |
| 4N+4-TH LINE | R/Ggo/Gb/Ggo ch | Ggo1 Ggo2 Ggo3 Ggo4 Ggo5 Ggo6 |
| | Gr/Gge/B/Gge ch | Gge1 Gge2 Gge3 Gge4 Gge5 Gge6 |
| (N=0,1,2,3,...) | | |

FIG. 30

| | R/Gb ch | R1 | R2 | R3 | R4 | R5 | R6 |
|---|---|---|---|---|---|---|---|
4N+2-TH LINE
| | Gr/B ch | Gr1 | Gr2 | Gr3 | Gr4 | Gr5 | Gr6 |
| | Ggo ch | Ggo1 | Ggo2 | Ggo3 | Ggo4 | Ggo5 | Ggo6 |
| | Gge ch | Gge1 | Gge2 | Gge3 | Gge4 | Gge5 | Gge6 |

| | R/Gb ch | Gb1 | Gb2 | Gb3 | Gb4 | Gb5 | Gb6 |
4N+4-TH LINE
| | Gr/B ch | B1 | B2 | B3 | B4 | B5 | B6 |
| | Ggo ch | Ggo1 | Ggo2 | Ggo3 | Ggo4 | Ggo5 | Ggo6 |
| | Gge ch | Gge1 | Gge2 | Gge3 | Gge4 | Gge5 | Gge6 |

(N=0,1,2,3,,,)

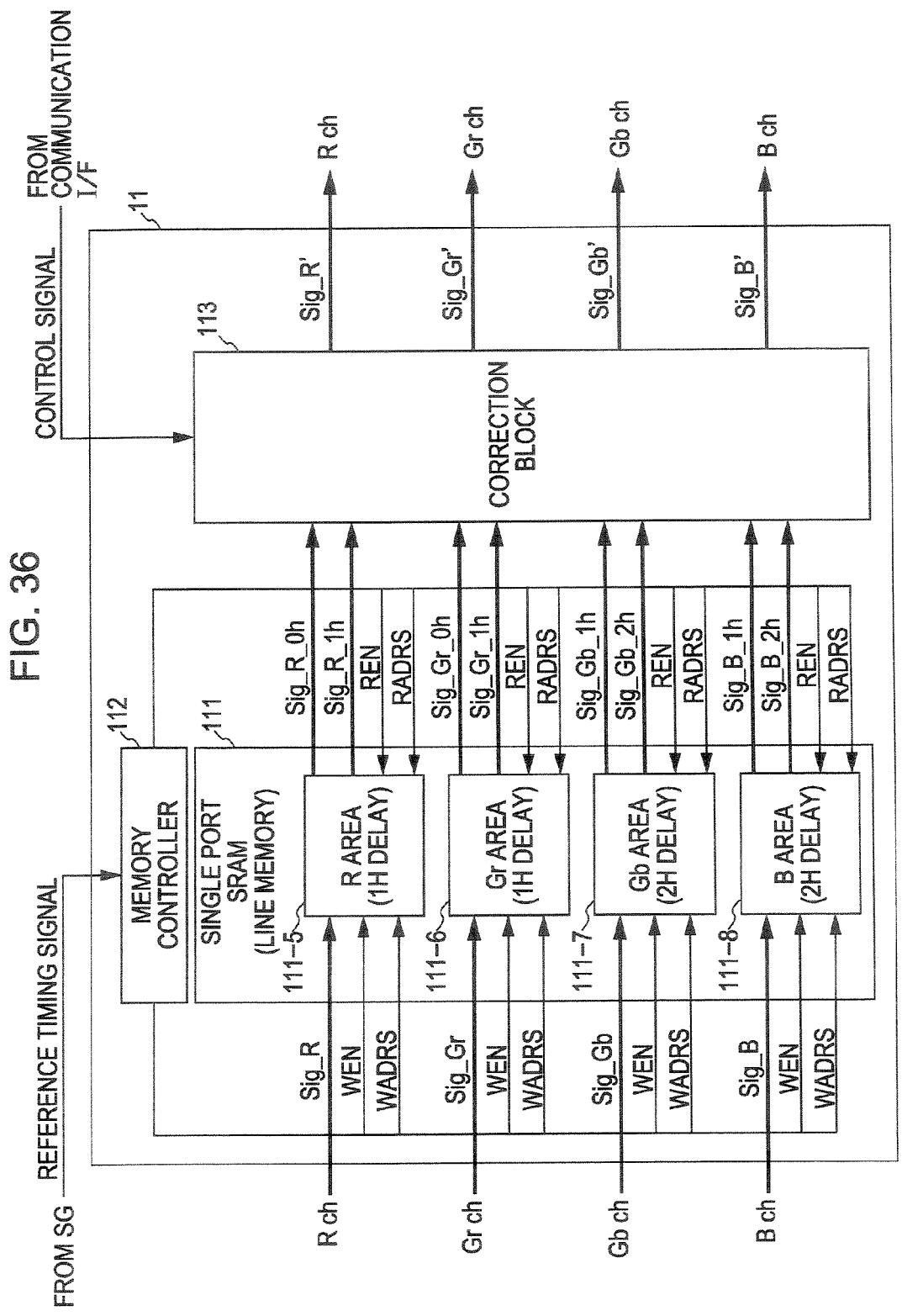

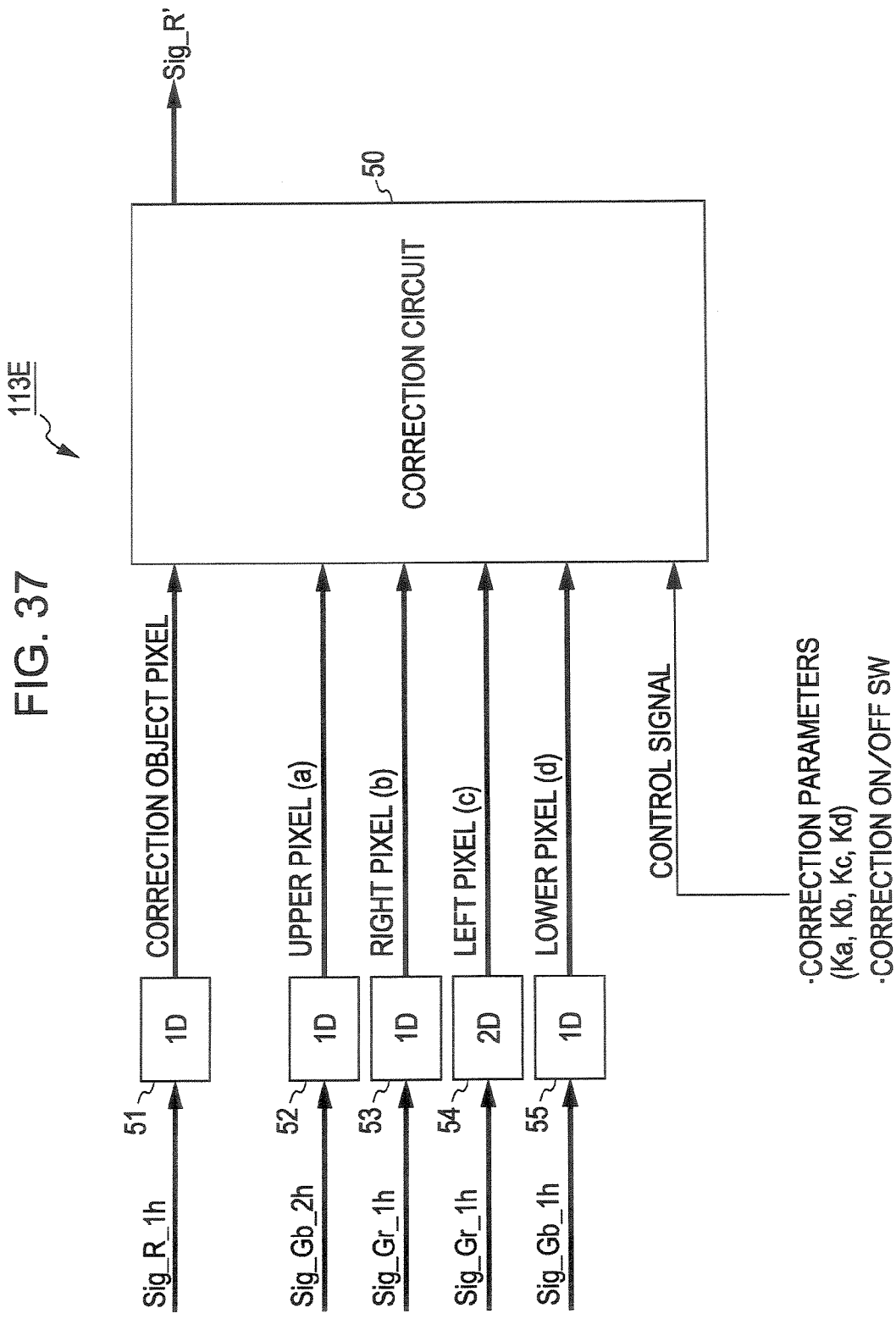

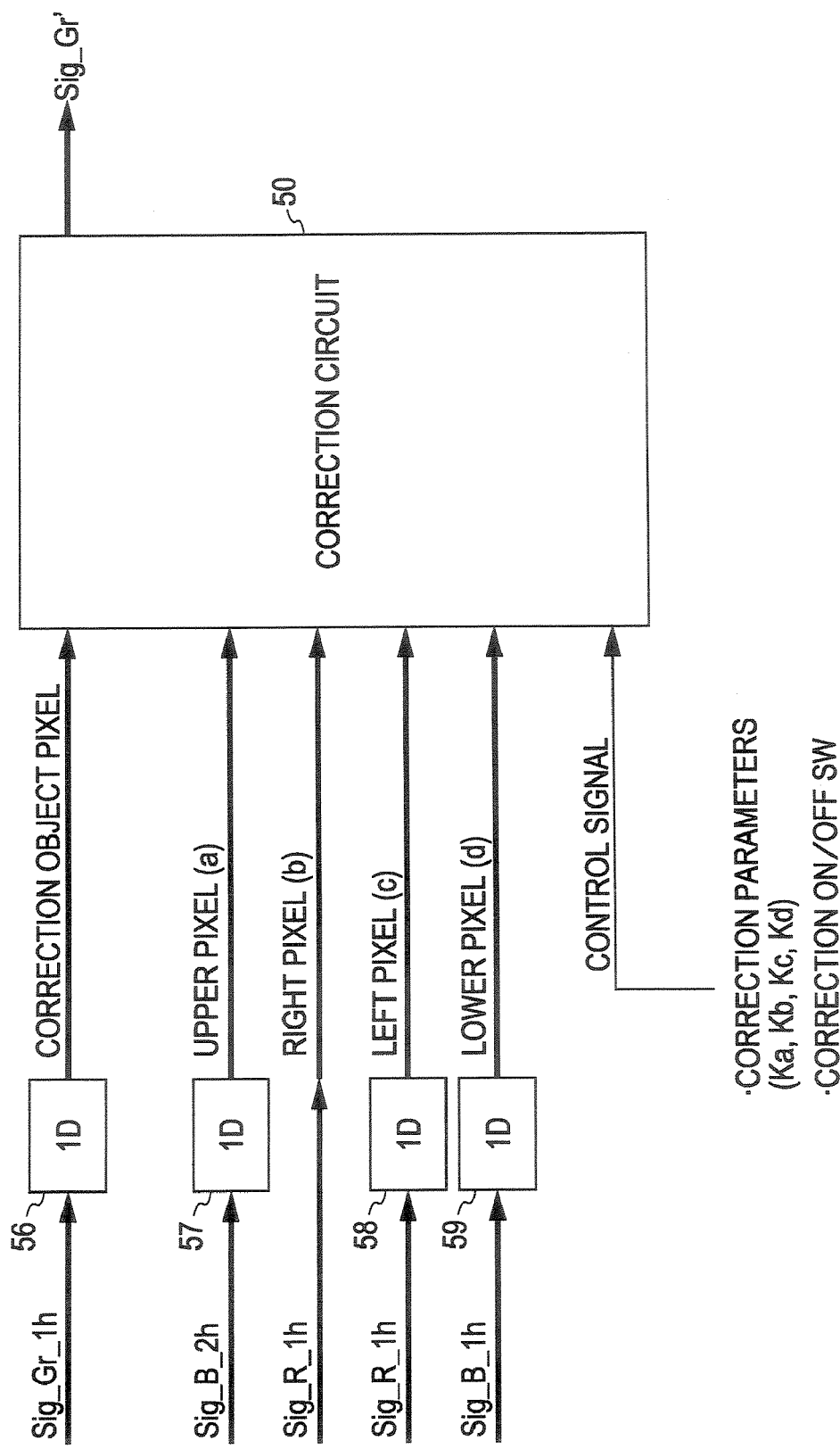

FIG. 45
(1) WHEN VALUE OF DIRECTIONAL SELECTION IS EQUAL TO ZERO
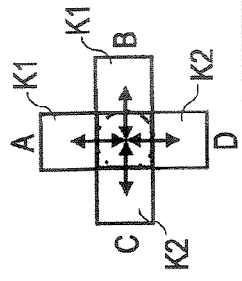
Sig_C' = Sig_C + K1×[(Sig_C−Sig_Up) + (Sig_C−SigR)] + K2×[(Sig_C−SigL) + (Sig_C−SigLo)]
(2) WHEN VALUE OF DIRECTIONAL SELECTION IS EQUAL TO ONE
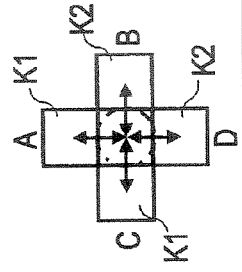
Sig_C' = Sig_C + K1×[(Sig_C−Sig_Up) + (Sig_C−SigL)] + K2×[(Sig_C−SigR) + (Sig_C−SigLo)]
(3) WHEN VALUE OF DIRECTIONAL SELECTION IS EQUAL TO TWO
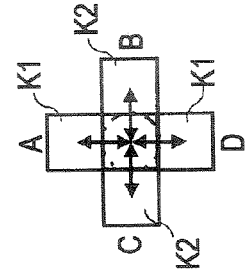
Sig_C' = Sig_C + K1×[(Sig_C−Sig_Up) + (Sig_C−SigLo)] + K2×[(Sig_C−SigR) + (Sig_C−SigL)]

$Sig\_C' = Sig\_C + K[(Sig\_C-SigL) + (Sig\_C-Sig\_Up) + (Sig\_C-SigR) + (Sig\_C-SigL) + (Sig\_C-SigLo)]$

WHEN F NUMBER IS LARGE

WHEN F NUMBER IS SMALL

SIGNAL PROCESSING APPARATUS FOR SOLID-STATE IMAGING DEVICE, SIGNAL PROCESSING METHOD, AND IMAGING SYSTEM

CROSS REFERENCES TO RELATED APPLICATIONS

The present invention contains subject matter related to Japanese Patent Application JP 2005-332308 filed in the Japanese Patent Office on Nov. 17, 2005, the entire contents of which are incorporated herein by reference.

BACKGROUND OF THE INVENTION

1. Field of the Invention

The present invention relates to signal processing apparatuses for solid-state imaging devices, signal processing methods, and imaging systems. More particularly, the present invention relates to a signal processing apparatus capable of correcting color mixture in the pixel area of a solid-state imaging device, a signal processing method in the signal processing apparatus, and an imaging system including the signal processing apparatus.

2. Description of the Related Art

Solid-state imaging devices, such as charge coupled device (CCD) image sensors and complementary metal oxide semiconductor (CMOS) image sensors, have structures in which condenser microlenses are layered on color separation filters that are layered on pixel cells including photoelectric transducers.

In color solid-state imaging devices having the above structures, the distances between the pixel areas and the microlenses are increased because of the color filters located between the pixel areas and the microlenses. The distance between the pixels, that is, the pixel pitch decreases with decreasing size of the pixel cells involved in an increase in number of the pixels. Accordingly, light transmitting through the color filter for a certain pixel cell can enter neighboring pixel cells to cause a problem of color mixture.

In order to resolve the problem of the color mixture caused by the decreased size of the pixel cells, in solid-state imaging devices in related art in which the pixels having the three primary colors including red (R), green (G), and blue (B) are arranged in a checker pattern, signal components corresponding to a certain ratio are subtracted from the signal of a pixel having a given color (for example, refer to Japanese Unexamined Patent Application Publication No. 2004-135206). The signal components corresponding to the certain ratio are calculated from the signals of pixels that are adjacent to the pixel having the given color and that have a color other than the given color.

SUMMARY OF THE INVENTION

It has been considered that the colors of multiple neighboring pixels adjacent to a target pixel are isotropically mixed into the target pixel in the pixel area, that is, the color mixture from the multiple neighboring pixels occurs in the same ratio in the pixel area. Under this consideration, the same correction parameter is used for the multiple neighboring pixels to resolve the problem of the color mixture in the related art disclosed in, for example, Japanese Unexamined Patent Application Publication No. 2004-135206.

However, since the photoelectric transducers (photosensitive sections) can be shifted from the centers of the pixel cells depending on the layout of the circuit sections, the wiring, or the signal reading sections in actual solid-state imaging devices, the physical center of each pixel cell does not necessarily coincide with the optical center thereof. Accordingly, the color mixture from the neighboring pixels into the target pixel does not necessarily occur isotropically but occurs directionally.

As a result, in related art disclosed in, for example, Japanese Unexamined Patent Application Publication No. 2004-135206, in which the same correction parameter is used for multiple neighboring pixels to correct the color mixture, it is not possible to correct the color mixture in accordance with the degree of the color mixture from the neighboring pixels into the target pixel, that is, it is not possible to correct the color mixture with directionality.

It is desirable to provide a signal processing apparatus for a solid-state imaging device, a signal processing method, and an imaging system, capable of realizing the correction of the color mixture with directionality.

According to an embodiment of the present invention, a signal processing apparatus correcting color mixture between pixel cells in a solid-state imaging device in which the pixel cells including photoelectric transducers are two-dimensionally arranged in an array and in which color filters having primary color components for generating luminance components and other color components are arranged over the pixel cells includes correction processing means for performing the correction to the signal from a target pixel by using the signals from multiple neighboring pixels adjacent to the target pixel in the solid-state imaging device and correction parameters independently set for the signals.

According to another embodiment of the present invention, a signal processing method of correcting color mixture between pixel cells in a solid-state imaging device in which the pixel cells including photoelectric transducers are two-dimensionally arranged in an array and in which color filters having primary color components for generating luminance components and other color components are arranged over the pixel cells includes the step of performing the correction to the signal from a target pixel by using the signals from multiple neighboring pixels adjacent to the target pixel in the solid-state imaging device and correction parameters independently set for the signals.

According to another embodiment of the present invention, an imaging system includes a solid-state imaging device in which pixel cells including photoelectric transducers are two-dimensionally arranged in an array and in which color filters having primary color components for generating luminance components and other color components are arranged over the pixel cells; an optical system through which light from a subject is led to the solid-state imaging device; and correction processing means for performing correction to the signal from a target pixel by using the signals from multiple neighboring pixels adjacent to the target pixel in the solid-state imaging device and correction parameters independently set for the signals.

Since the correction parameters for the signals from the multiple neighboring pixels are independent of each other in the correction of the color mixture between the pixels in the solid-state imaging device, the amount of correction of the color mixture from the neighboring pixels into the target pixel can be arbitrarily set for every neighboring pixel by using the independent correction parameters. As a result, it is possible to give the directionality to the amount of correction of the color mixture from the neighboring pixels into the target pixel, that is, to set different amounts of correction for different neighboring pixels.

According to the present invention, the directionality can be given to the amount of correction of the color mixture from the neighboring pixels into the target pixel, so that the color mixture can be corrected in accordance with the degree of the color mixture from the neighboring pixels into the target pixel. Consequently, it is possible to realize the correction of the color mixture in accordance with the directionality even if the color mixture from the neighboring pixels into the target pixel has the directionality.

BRIEF DESCRIPTION OF THE DRAWINGS

FIG. 20 illustrates correction model equations of the correction circuit in the second example according to the first embodiment of the present invention;

FIG. 30 shows a sequence of output signals from the rearrangement processing circuit according to the second embodiment of the present invention;

FIG. 36 is a block diagram showing an example of the configuration of a color-mixture correction circuit according to the third embodiment of the present invention;

FIG. 37 is a block diagram showing an example of the configuration of an R channel correction sub-block;

FIG. 39 is a block diagram showing an example of the configuration of a Gr channel correction sub-block;

FIG. 45 illustrates correction model equations of the correction circuit in the second example according to the third embodiment of the present invention;

DESCRIPTION OF THE PREFERRED EMBODIMENTS

Embodiments of the present invention will now be described in detail with reference to the accompanying drawings.

Figure 1:
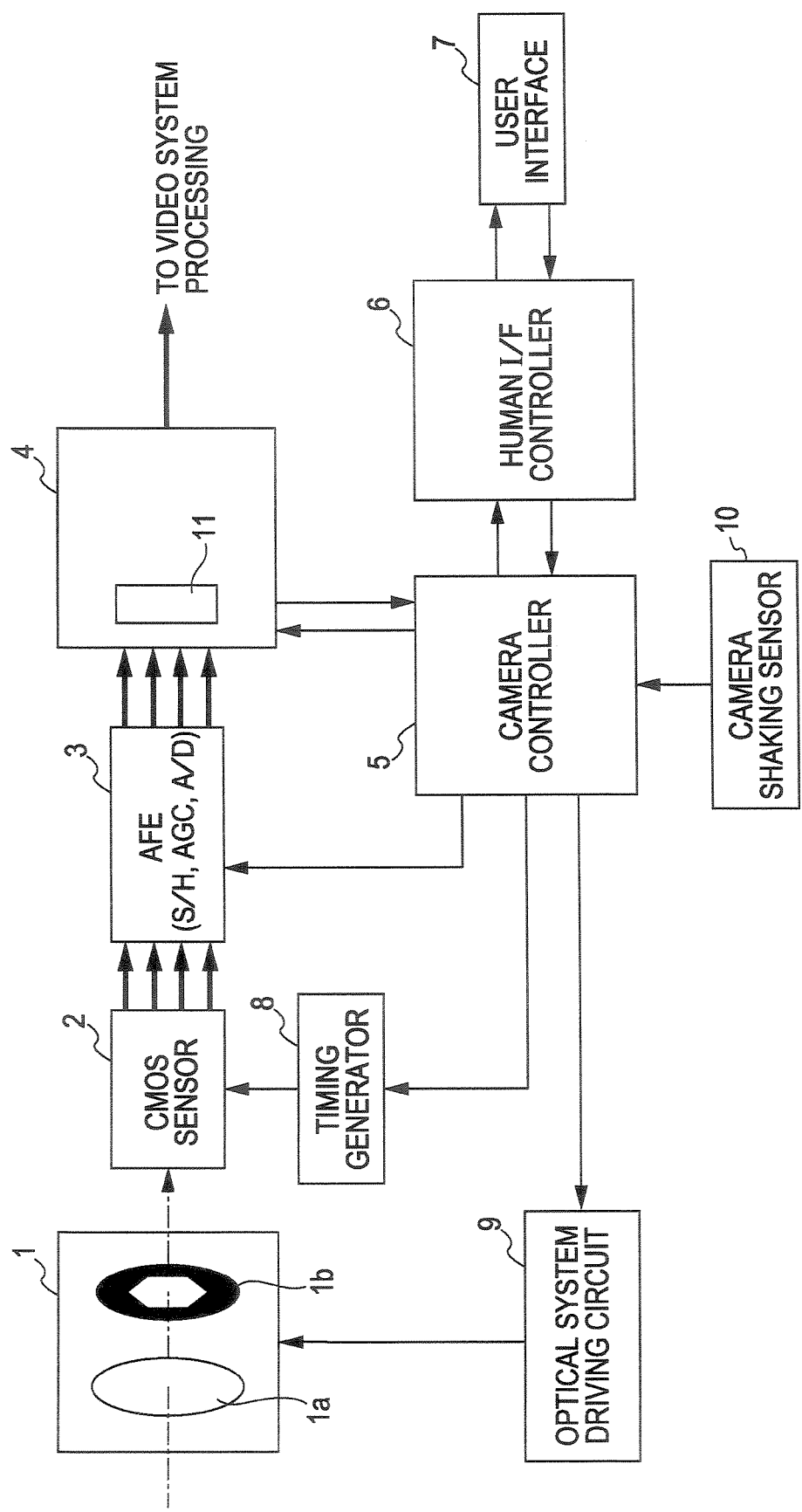
FIG. 1 is a block diagram showing an example of the structure of a video camera according to an embodiment of the present invention.

FIG. 1 is a block diagram showing an example of the structure of an imaging system, such as a video camera, according to an embodiment of the present invention. Although the present invention is embodied by the video camera, the present invention is not limited to the application to the video camera. The present invention is applicable to other imaging systems including a digital still camera.

Referring to FIG. 1, the video camera according to this embodiment of the present invention includes an optical system 1, a CMOS image sensor 2, which is a solid-state imaging device, an analog front end (AFE) 3, a digital signal processing circuit 4, a camera controller 5, a human interface (I/F) controller 6, a user interface 7, a timing generator 8, an optical system driving circuit 9, and a camera shaking sensor 10.

The optical system 1 includes a lens 1a through which incident light from a subject (not shown) forms an image on the imaging surface of the CMOS image sensor 2 and an aperture 1b controlling the light intensity of the incident light through the lens 1a. The CMOS image sensor 2 performs photoelectric conversion to the incident light through the optical system 1 in units of pixels to output an analog electrical signal. The structure of the CMOS image sensor 2 will be described in detail below. The electrical signal is output from the CMOS image sensor 2 through multiple channels, for example, four channels.

The AFE 3 is an analog signal processing circuit. After performing signal processing including sample/hold (S/H) and automatic gain control (AGC) to the analog signal supplied from the CMOS image sensor 2 through the four channels, the AFE 3 performs analog-to-digital (A/D) conversion to the analog signal and supplies the digital signal to the digital signal processing circuit 4. The digital signal processing circuit 4 performs a variety of signal processing to the digital signal supplied from the AFE 3 through the four channels in accordance with instructions from the camera controller 5.

The signal processing performed in the digital signal processing circuit 4 includes so-called camera signal processing, such as white balancing, gamma correction, and color difference processing, and a calculation process of detected data (data indicating information, such as the brightness, contrast, and hue, in the screen) used for controlling the camera. The digital signal processing circuit 4 includes a color-mixture correction circuit 11, by which the present invention is characterized, in addition to the circuits performing the above signal processing. The color-mixture correction circuit 11 will be described in detail below.

The camera controller 5 is, for example, a microcomputer. The camera controller 5 acquires the state of the current input image on the basis of the detected data supplied from the digital signal processing circuit 4 and information concerning camera shaking supplied from the camera shaking sensor 10, and performs the camera control in accordance with various setting modes supplied through the human I/F controller 6. The camera controller 5 supplies the processed data to the digital signal processing circuit 4 as camera image control data, to the optical system driving circuit 9 as lens control data or aperture control data, to the timing generator 8 as timing control data, and to the AFE 3 as gain control data.

The digital signal processing circuit 4, the optical system driving circuit 9, the timing generator 8, and the AFE 3 perform desired signal processing, driving of the optical system 1, timing generation, and gain processing, respectively, in accordance with the control values supplied from the camera controller 5. The CMOS image sensor 2 sequentially retrieves signals in an arbitrary area from a pixel array unit, described below, in response to various timing signals generated by the timing generator 8 and supplies the retrieved signals to the AFE 3.

Menu operation and others performed by a user are controlled by the human I/F controller 6 through the user interface 7. The human I/F controller 6 is, for example, a microcomputer. The human I/F controller 6 detects which shooting mode the user currently selects or which control the user wants and supplies information concerning an instruction from the user to the camera controller 5. Conversely, the camera controller 5 supplies the camera control information including the distance between the subject and the camera, the f-number, the shutter speed, and the magnification to the human I/F controller 6 to indicate the current camera information to the user through the user interface 7.

The color-mixture correction circuit 11 by which the present invention is characterized has slightly different configurations or slightly differently operates depending on how pixels are arranged in the CMOS image sensor 2 or the color coding of the color separation filter. The arrangement of the pixels in the CMOS image sensor 2, the color coding of the color separation filter, and the configuration and operation of the color-mixture correction circuit 11 corresponding to the arrangement of the pixels in the CMOS image sensor 2 and the color coding of the color separation filter will be described in first to third embodiments of the present invention.

First Embodiment

Figure 2:
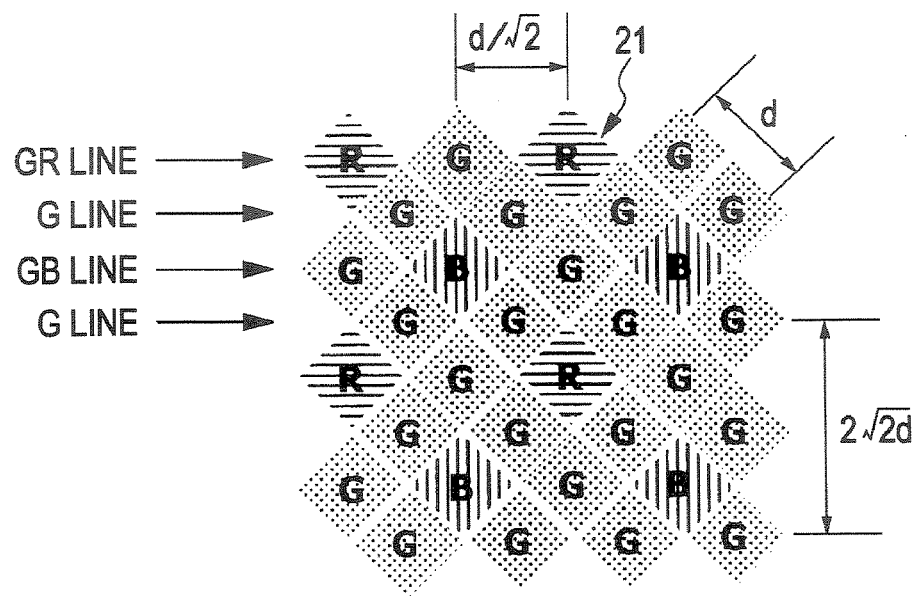
FIG. 2 shows an example of the color coding of a CMOS image sensor according to a first embodiment of the present invention.

FIG. 2 shows an example of the color coding of the CMOS image sensor according to a first embodiment of the present invention.

The CMOS image sensor has a pixel array unit in which pixel cells 21 including the photoelectric transducers are two-dimensionally arranged in an array. As shown in FIG. 2, in the CMOS image sensor according to the first embodiment of the present invention, the pixel cells 21 are arranged at an angle of 45° with respect to the pixel array in a square lattice, typified by the common pixel array in a checker pattern.

The CMOS image sensor according to the first embodiment of the present invention has pixel shifted arrangement in which the pixels are shifted by half of the pixel pitch $\sqrt{2}d$ for every row and column, where the distance (hereinafter referred to as "pixel pitch") between the pixels in the pixel array in the square lattice is denoted by "d" and the horizontal and vertical pixel pitch with respect to the pixel pitch "d" is denoted by "√2d". Specifically, the pixels in odd-numbered rows are horizontally (in the direction in which the columns are arranged) shifted from the pixels in even-numbered rows by half of the pixel pitch √2d, and the pixels in odd-numbered columns are vertically (in the direction in which the rows are arranged) shifted from the pixels in even-numbered columns by half of the pixel pitch √2d.

In the color coding of the color separation filter in the above pixel shifted arrangement, the first line is a GR line in which G pixels and R pixels are alternately arranged, the second line is a G line in which only G pixels are arranged, the third line is a GB line in which B pixels and G pixels are alternately arranged, and the fourth line is a G line in which only G lines are arranged. The above four lines are repeated in units of four lines in the subsequent lines in the color coding of the color separation filter.

In the color coding of the color separation filter, as apparent from FIG. 2, the primary color components (G components in this example) for generating the luminance (Y) components are arranged so as to surround the other color components (R and B components in this example). The R components and B components are horizontally and vertically arranged at intervals of 2√2d.

In this color coding, the horizontal and vertical sampling rate of the G components is d/√2 and the horizontal and vertical sampling rate of the R and B components is 2√2d. In other words, the R and B components are arranged every two columns (odd-numbered columns in this example) and every two rows (odd-numbered rows in this example) such that the horizontal and vertical sampling rate is equal to one fourth of that of the G components. Accordingly, the G components have the horizontal and vertical resolution four times higher than that of the R and B components. When the sampling rate is yielded at an angle of 45°, the sampling rate of the G components is equal to "d" and the sampling rate of the R and B components is equal to "2d".

Special frequency characteristics will now be considered. Since the sampling rate of the G components is d/√2 in the horizontal and vertical directions, it is possible to sample signals having a frequency of as much as (1/√2)fs according to the sampling theorem. Since the sampling rate of the G components is "d" at an angle of 45°, it is possible to sample signals having a frequency of as much as (¼)fs according to the sampling theorem.

Since the R components are arranged at the same interval as the B components, the R components can be considered in the same manner as in the B components. Accordingly, only the R components will be described here.

In terms of the special frequency characteristics of the R components, since the sampling rate of the R components is 2√2d in the horizontal and vertical directions, it is possible to sample signals having a frequency of as much as (¼√2)fs according to the sampling theorem. Since the sampling rate of the R components is "2d" at an angle of 45°, it is possible to sample signals having a frequency of as much as (½)fs according to the sampling theorem.

Adopting the color coding in which the primary color components (G components in this example) for generating the luminance (Y) components are arranged so as to surround the other color components (R and B components in this example) in the pixel shifted arrangement allows the G components to exist in all the rows and columns. Since the special frequency characteristics of the G components, to which human beings have higher visibility, can be improved, the resolution of not only subjects with achromatic colors but also subjects with chromatic colors can be increased. In addition, since the need to balance the levels of the RGB components is eliminated, there is the advantage of no color fault.

The pixel shifted arrangement has the following advantages, compared with the pixel array in a square lattice. Since the pixel shifted arrangement has a pixel pitch smaller than that of the pixel array in a square lattice, the pixel shifted arrangement can provide a higher resolution. If the pixel shifted arrangement has the same resolution as that of the pixel array in a square lattice, the pixel cells can be arranged at a pixel pitch greater than that of the pixel array in a square lattice. Accordingly, the opening of the pixel cells can be widened, thus improving the S/N ratio.

Figure 3:
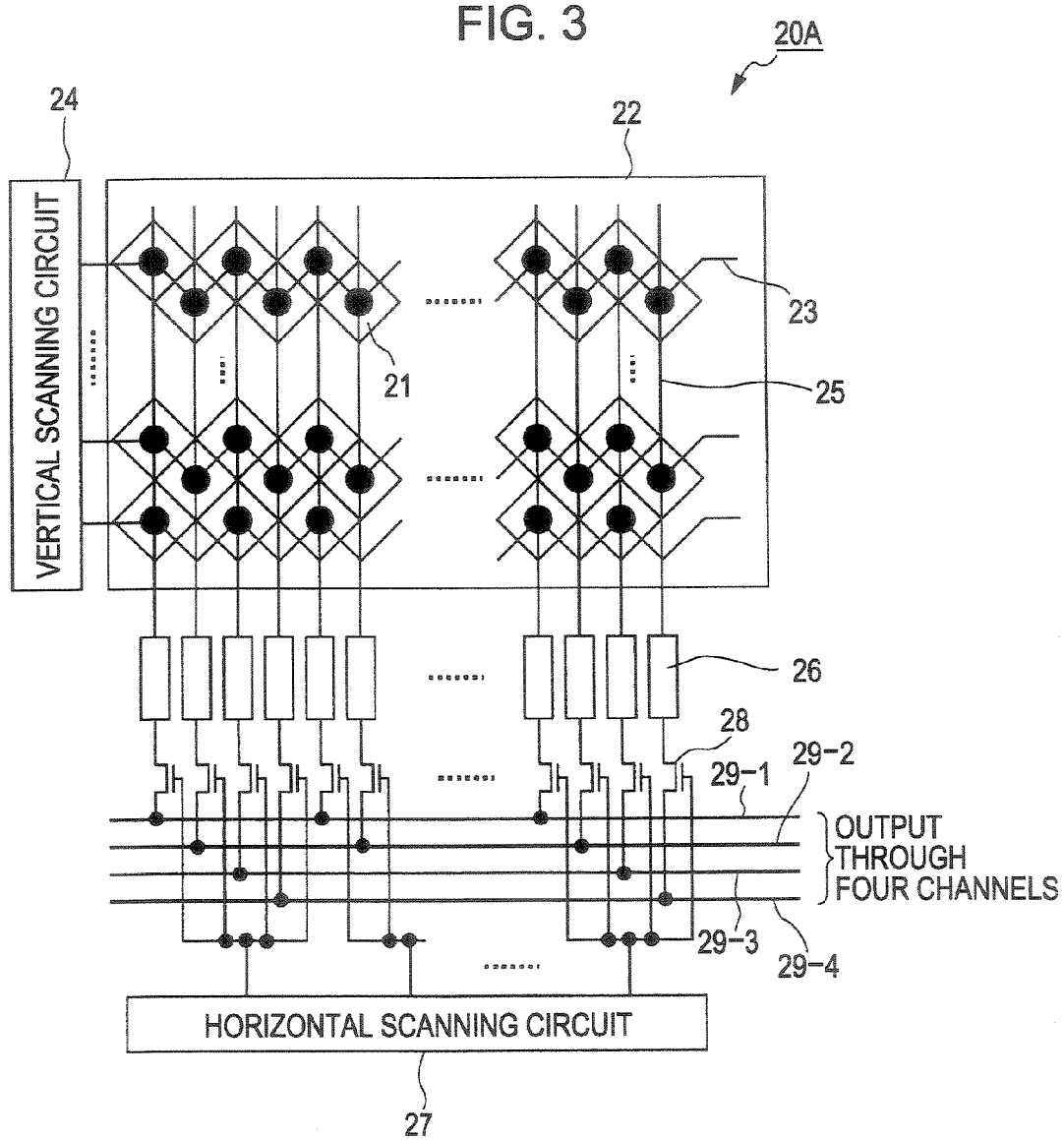
FIG. 3 is a block diagram schematically showing an example of the structure of the CMOS image sensor according to the first embodiment of the present invention.

FIG. 3 is a block diagram schematically showing an example of the structure of a CMOS image sensor 20A according to the first embodiment of the present invention.

Referring to FIG. 3, the CMOS image sensor 20A includes a pixel array unit 22 in which the pixel cells 21 including the photoelectric transducers have the pixel shifted arrangement, and adopts the color coding in which the G components are arranged so as to surround the R and B components in the pixel shifted arrangement. In the CMOS image sensor 20A, each pixel drive line 23 is commonly wired to the pixel cells 21 in a horizontal zigzag row in units of two rows and a vertical scanning circuit 24 sequentially selects and scans the pixel drive lines 23.

The signals from the pixel cells 21 in the horizontal zigzag row, which are selected and scanned by the vertical scanning circuit 24 through the pixel drive lines 23, are held in column processing circuits 26 provided for every pixel column through vertical signal lines 25 wired for every pixel column. The signals corresponding to one row (horizontal zigzag row), held in each column processing circuit 26, are sequentially output to four horizontal signal lines 29-1 to 29-4 in units of four pixels through horizontal selector switches 28 sequentially selected by a horizontal scanning circuit 27 in units of four switches.

As described above, in the CMOS image sensor 20A according to the first embodiment of the present invention, the signals in units of multiple neighboring pixels, for example, four neighboring pixels for every row are read out in parallel through the four horizontal signal lines 29-1 to 29-4 by using multiple channels (four channels in this example) and are horizontally scanned over one screen. After all the signals during one horizontal scanning period (1H) have been read out, the signals in the subsequent row are horizontally scanned to read out the signals from the pixels over one screen. According to the first embodiment of the present invention, one row means one horizontal zigzag row.

Figures 4, 5:
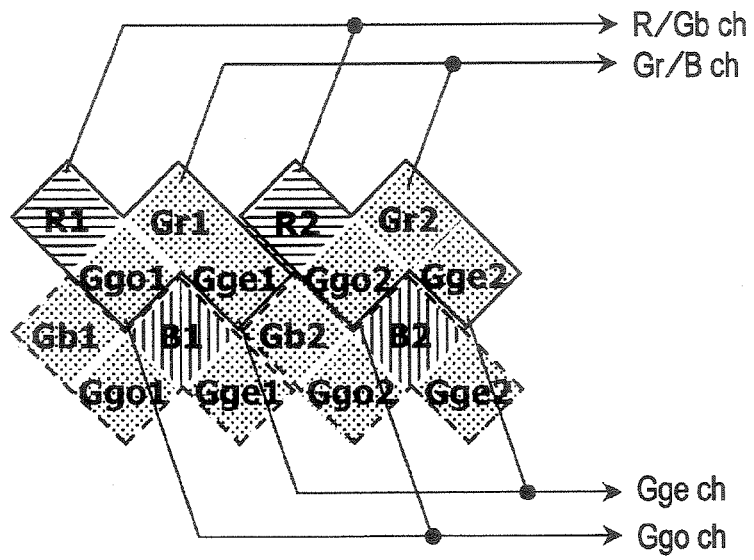
FIG. 4 is a diagram showing the definition of R, G, and B pixels according to the first embodiment of the present invention.
FIG. 5 shows a sequence of output signals through channels according to the first embodiment of the present invention.

For convenience, sixteen R, G, and B pixels in the first to eighth columns in the first and second rows in the color coding shown in FIG. 2 are defined as shown in FIG. 4. Specifically, in the first row, the pixel R among the four pixels in the first unit is defined as a pixel R1 and the pixel R among the four pixels in the second unit is defined as a pixel R2. In the second row, the pixel B among the four pixels in the first unit is defined as a pixel B1 and the pixel B among the four pixels in the second unit is defined as a pixel B2.

In the first row, the pixel G among the four pixels in the first unit, in contact with the pixels R1 and B1 with sides, is defined as a pixel Ggo1; the pixel G among the four pixels in the first unit, in contact with pixels R1 and R2 with apices, is defined as a pixel Gr1; and the pixel G among the four pixels in the first unit, in contact with the pixels B1 and R2 with sides, is defined as a pixel Gge1. Also in the first row, the pixel G among the four pixels in the second unit, in contact with the pixels R2 and B2 with sides, is defined as a pixel Ggo2; the pixel G among the four pixels in the second unit, in contact with the pixels R2 and (R3) with apices, is defined as a pixel Gr2; and the pixel G among the four pixels in the second unit, in contact with the pixels B2 and (R3) with sides, is defined as a pixel Gge2.

In the second row, the pixel G among the four pixels in the first unit, in contact with the pixels R1 and B1 with apices, is defined as a pixel Gb1; the pixel G among the four pixels in the first unit, in contact with the pixel B1 with a side, is defined as a pixel Ggo1; and the pixel G among the four pixels in the first unit, in contact with the pixel B1 with a side, is defined as a pixel Gge1. Also in the second row, the pixel G among the four pixels in the second unit, in contact with the pixels B1, R2, and B2 with apices, is defined as a pixel Gb2; the pixel G among the four pixels in the second unit, in contact with the pixel B2 with a side, is defined as a pixel Ggo2; and the pixel G among the four pixels in the second unit, in contact with the pixel B2 with a side, is defined as a pixel Gge2.

Under the above definition, the signals in units of the four neighboring pixels for every row (horizontal zigzag row) are read out in parallel through the four channels in one clock cycle of a clock signal, on which the operation of the CMOS image sensor 20A is based, to output an R/Gb signal, a Gr/B signal, a Gge signal, and a Ggo signal through the four channels, as shown in FIG. 4. FIG. 5 shows a sequence of the output signals through the channels in the above readout method.

The present invention does not depend on the readout method. Even if the number of the channels or the readout method is varied, the present invention is applicable to all the cases only by building subsequent processing in accordance with the channels through which the signals are read out or in accordance with the readout method (only by incorporating a mechanism corresponding to the varied sequence).

For simplicity, the above readout method is exemplified in which the signals in units of the four neighboring pixels for every row (horizontal zigzag row) are read out in parallel through the four channels in one clock cycle.

Digital Signal Processing Circuit

Figure 6:
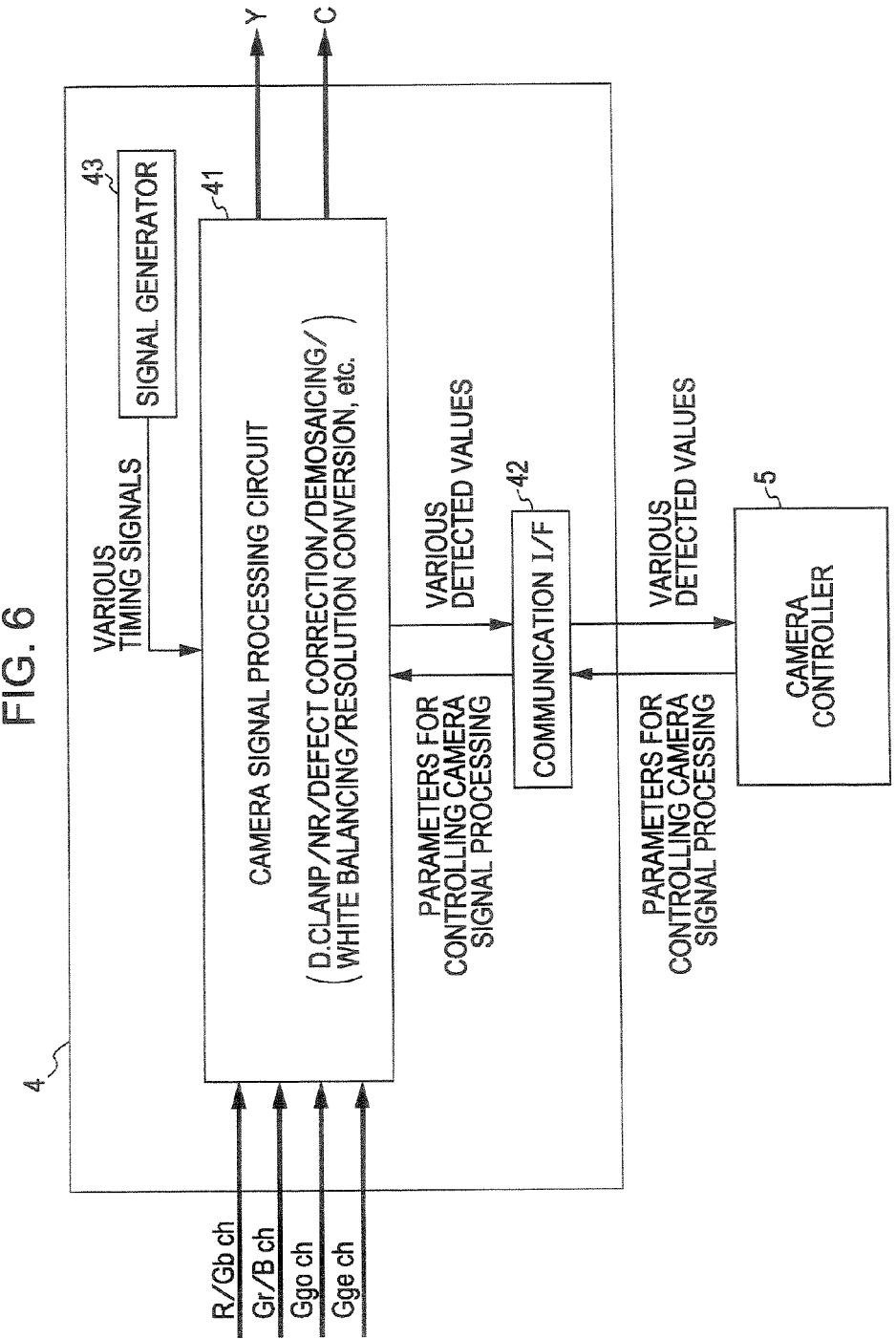
FIG. 6 is a block diagram showing an example of the configuration of a digital signal processing circuit according to the first embodiment of the present invention.

FIG. 6 is a block diagram showing an example of the configuration of the digital signal processing circuit 4. Referring to FIG. 6, the digital signal processing circuit 4 includes a camera signal processing circuit 41, a communication I/F 42, and a signal generator 43. The R/Gb, Gr/B, Ggo, and Gge signals are supplied in parallel from the CMOS image sensor 2 to the digital signal processing circuit 4 through the AFE 3 by using the four channels.

The camera signal processing circuit 41 performs a variety of camera signal processing, such as, digital clamp, noise reduction, defect correction, demosaicing (interpolation), white balancing, and resolution conversion, to the R/Gb, Gr/B, Ggo, and Gge signals through the four channels, in parallel, in response to instructions supplied from the camera controller 5 through the communication I/F 42 on the basis of various timing signals supplied from the signal generator 43. Then, the camera signal processing circuit 41 supplies the processed signals to a video system processing block as Y (luminance) and C (chroma) signals. Since the camera signal processing does not directly relate to the present invention, a detailed description of the camera signal processing is omitted herein.

Camera Signal Processing Circuit

Figure 7:
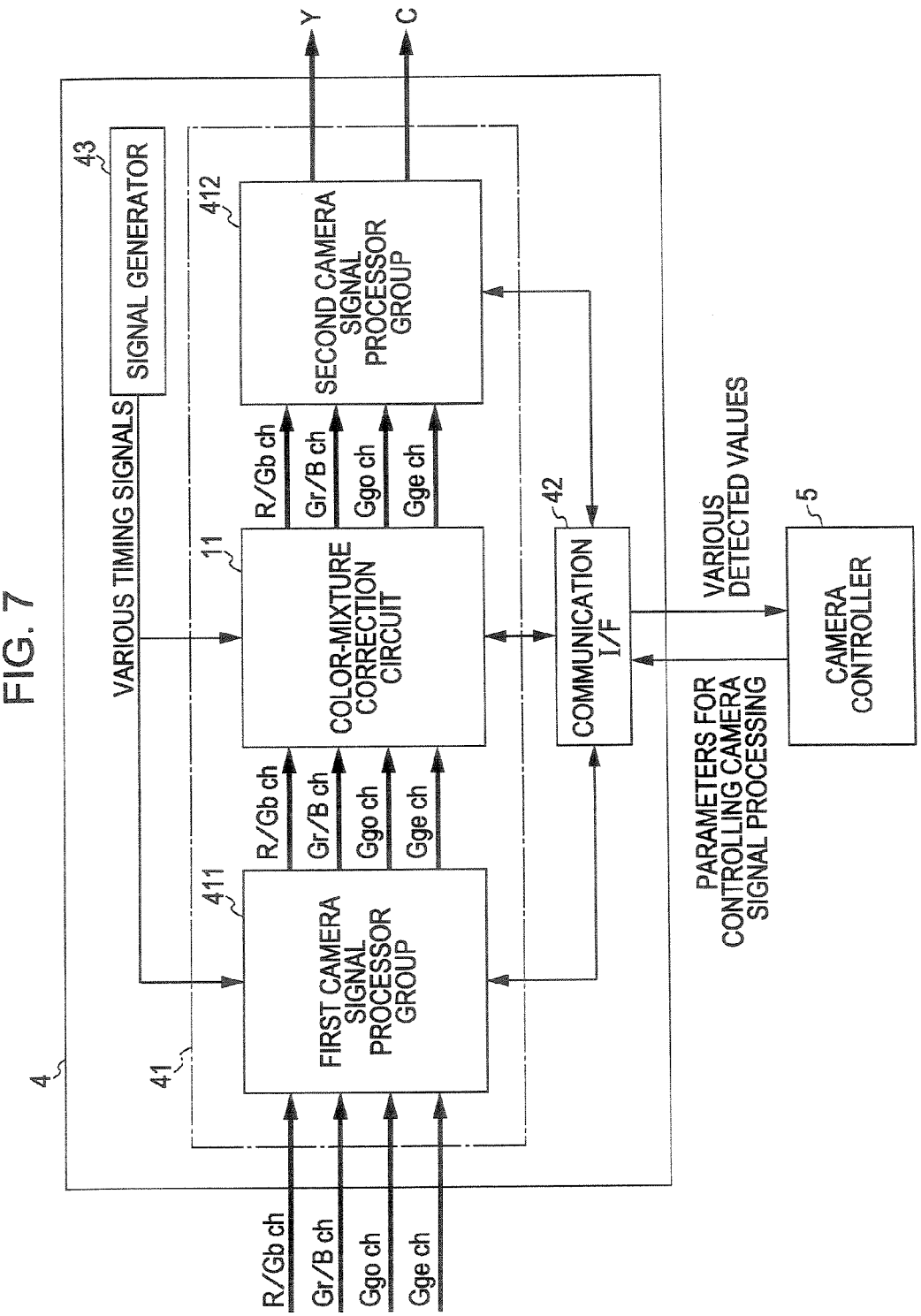
FIG. 7 is a block diagram showing an example of the internal configuration of a camera signal processing circuit according to the first embodiment of the present invention.

The camera signal processing circuit 41 includes a color-mixture correction circuit 11 to which the present invention is applied. FIG. 7 is a block diagram showing an example of the internal configuration of the camera signal processing circuit 41.

Referring to FIG. 7, the camera signal processing circuit 41 includes a first camera signal processor group 411 and a second camera signal processor group 412, in addition to the color-mixture correction circuit 11. The first camera signal processor group 411 is provided upstream of the color-mixture correction circuit 11 and the second camera signal processor group 412 is provided downstream of the color-mixture correction circuit 11. The camera signal processing circuit 41 processes, in parallel, the R/Gb, Gr/B, Ggo, and Gge signals for every four pixels, shown in FIG. 4, in one clock of the clock signal on which the camera signal processing is based.

In the camera signal processing circuit 41 in FIG. 7, the first camera signal processor group 411 performs the digital clamp, the defect correction, and the noise reduction to the signals and supplies the processed signals to the color-mixture correction circuit 11 to which the present invention is applied. The first camera signal processor group 411 is a processor group that performs various correction processes before camera YC processing. After the second camera signal processor group 412 performs the demosaicing (interpolation), the second camera signal processor group 412 generates the luminance and chroma signals in the YC processing. Finally, the second camera signal processor group 412 performs the resolution conversion and supplies the processed signals having a size suitable for the format to the downstream video system processing block.

The various timing signals are distributed from the signal generator 43 to all the circuit blocks including the color-mixture correction circuit 11 in the camera signal processing circuit 41. Each circuit block generates timings necessary for the various processes on the basis of the various timing signals. The operations of all the circuit blocks are controlled by the camera controller 5 through the communication I/F 42.

Color-Mixture Correction Circuit

Figure 8:
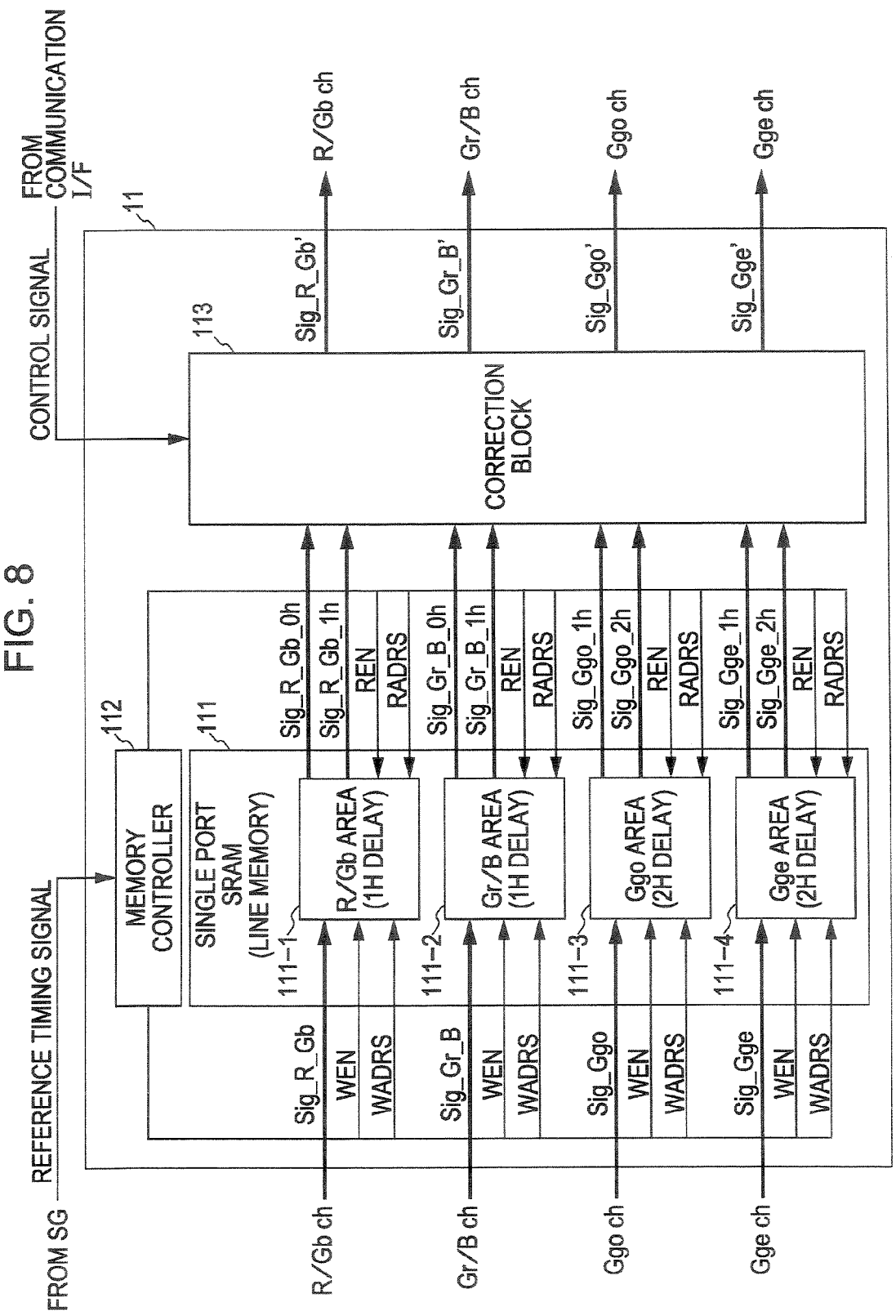
FIG. 8 is a block diagram showing an example of the configuration of a color-mixture correction circuit according to the first embodiment of the present invention.

FIG. 8 is a block diagram showing an example of the configuration of the color-mixture correction circuit 11. Referring to FIG. 8, the color-mixture correction circuit 11 includes a line memory group 111, a memory controller 112, and a correction block 113.

The line memory group 111 is provided for the R/Gb, Gr/B, Ggo, and Gge signals from the pixels through the four channels. The line memory group 111 includes line memories 111-1, 111-2, 111-3, and 111-4 for causing delays in units of rows. The line memories 111-1, 111-2, 111-3, and 111-4 form, for example, a single port static random access memory (SRAM). The line memories 111-1 and 111-2 are 1H ("H" denotes one horizontal scanning period) delay memories and the line memories 111-3 and 111-4 are 2H delay memories.

The memory controller 112 controls writing in and readout from the line memories 111-1, 111-2, 111-3, and 111-4 on the basis of the various timing signals supplied from the signal generator 43 shown in FIG. 7. The correction block 113 corrects the color mixture of the pixels in response to a control signal supplied through the communication I/F 42 shown in FIG. 7.

In the color-mixture correction circuit 11, the R/Gb, Gr/B, Ggo, and Gge signals from the pixels through the four channels are input in the line memories 111-1, 111-2, 111-3, and 111-4 in parallel, respectively. A group of signals having 0H to 2H delays for every channel is generated and output in response to a writing enabling signal WEN, a writing address signal WADRS, a readout enabling signal REN, and a readout address signal RADRS, supplied from the memory controller 112.

The line memory group 111 is structured such that a no-delay signal (Sig_R_Gb_0*h*) and a 1H-delay signal (Sig_R_Gb_1*h*) are output through the R/Gb channel, a no-delay signal (Sig_Gr_B_0*h*) and a 1H-delay signal (Sig_Gr_B_1*h*) are output through the Gr/B channel, a 1H-delay signal (Sig_Ggo_1*h*) and a 2H-delay signal (Sig_Ggo_2*h*) are output through the Ggo channel, and a 1H-delay signal (Sig_Gge_1*h*) and a 2H-delay signal (Sig_Gge_2*h*) are output through the Gge channel.

The group of the signals delayed by the line memories 111-1, 111-2, 111-3, and 111-4 is supplied to the correction block 113. The correction block 113 corrects the color mixture of the pixels in parallel for every channel in accordance with the control signal supplied through the communication I/F 42 and supplies Sig_R_Gb', Sig_Gr_B', Sig_Ggo', and Sig_Gge' signals after the correction to the downstream blocks. The correction block 113 includes four correction sub-blocks provided for the R/Gb, Gr/B, Ggo, and Gge signals from the pixels through the four channels.

R/Gb Channel Correction Sub-Block

Figure 9:
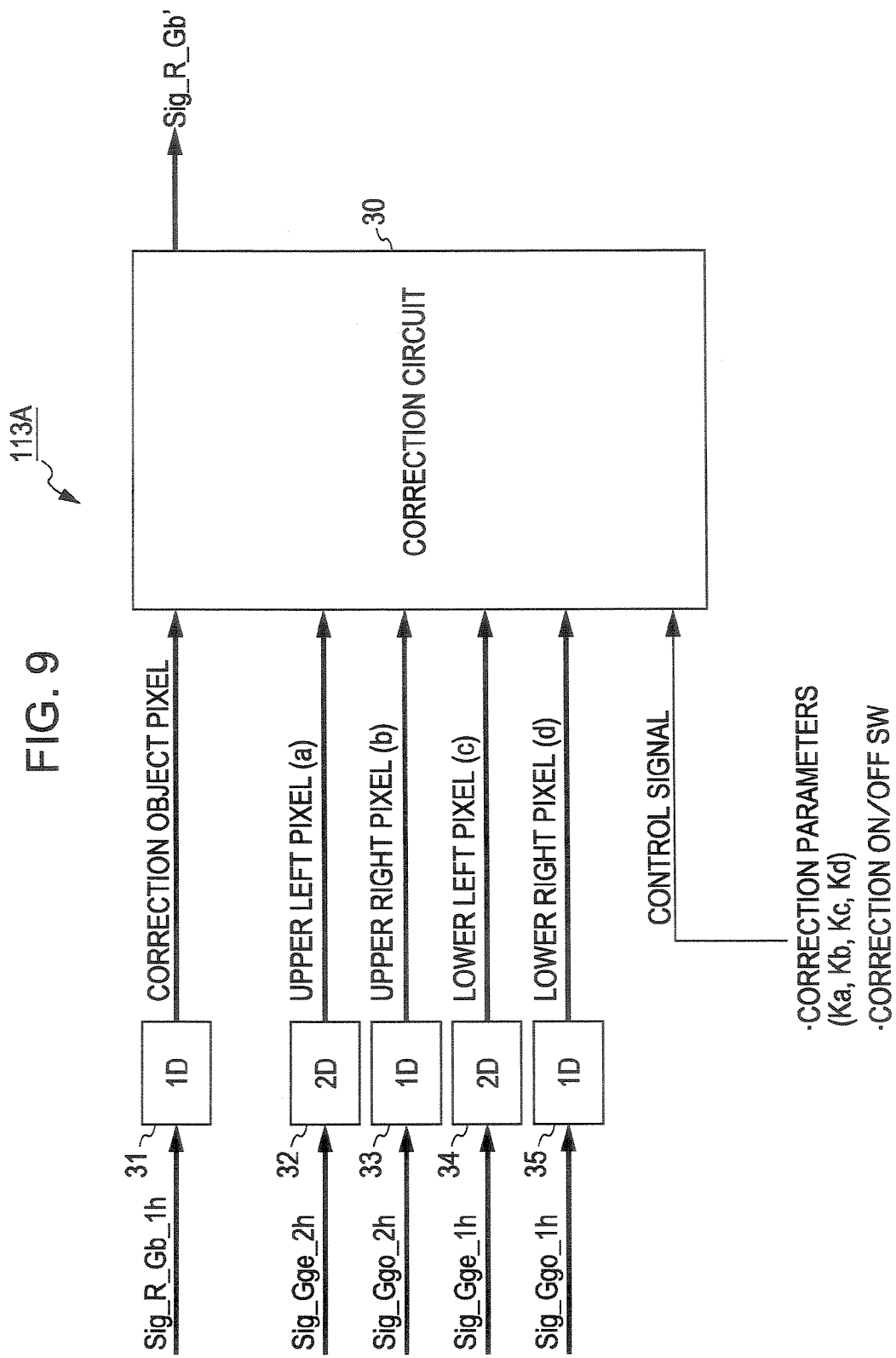
FIG. 9 is a block diagram showing an example of the configuration of an R/Gb channel correction sub-block.

FIG. 9 is a block diagram showing an example of the configuration of an R/Gb channel correction sub-block 113A. The R/Gb channel correction sub-block 113A includes a correction circuit 30 and five delay circuits 31 to 35. The 1H-delay signal Sig_R_Gb_1*h*, the 2H-delay signal Sig_Gge_2*h*, the 2H-delay signal Sig_Ggo_2*h*, the 1H-delay signal Sig_Gge_1*h*, and the 1H-delay signal Sig_Ggo_1*h*, among the total of eight signals output from the line memory group 111 in FIG. 8, the two signals being output for every channel, are input in the R/Gb channel correction sub-block 113A.

Figure 10:
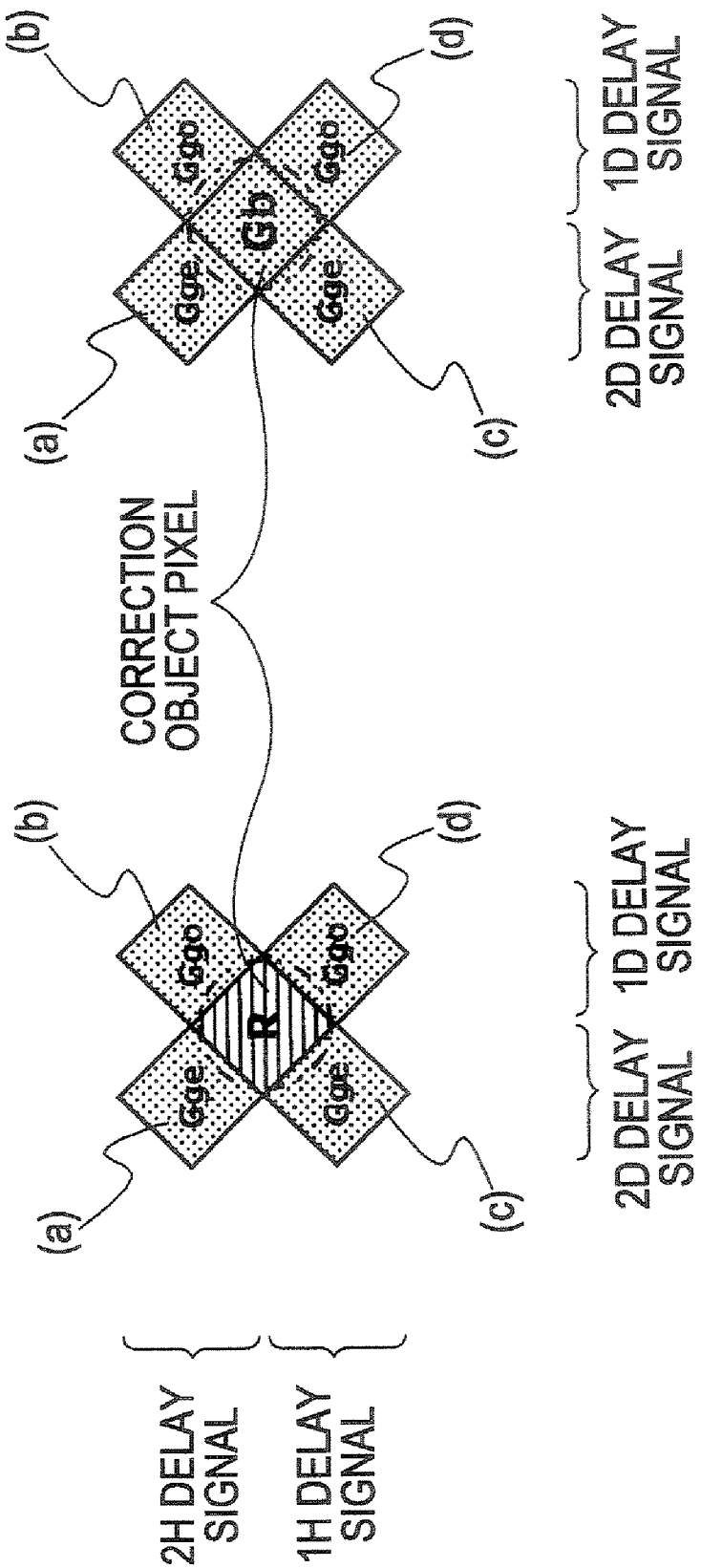
FIG. 10 shows the relationship between a correction object pixel R/Gb and four neighboring pixels diagonally adjacent to the correction object pixel.

The correction circuit 30 is shared between the channels. The circuit configuration of the correction circuit 30 will be described in detail below. The delay circuit 31 delays the 1H-delay signal Sig_R_Gb_1*h* by one clock cycle of the clock signal having a pixel period on which the correction of the color mixture is based and supplies the delayed signal to the correction circuit 30 as a signal from a correction object pixel. In the R/Gb channel correction sub-block 113A, the R/Gb pixel is the correction object pixel, as shown in FIG. 10.

The delay circuit 32 delays the 2H-delay signal Sig_Gge_2*h* by two clock cycles and supplies the delayed signal to the correction circuit 30 as a signal from an upper left pixel (a) in contact with the correction object pixel R/Gb with a side. The delay circuit 33 delays the 2H-delay signal Sig_Ggo_2*h* by one clock cycle and supplies the delayed signal to the correction circuit 30 as a signal from an upper right pixel (b) in contact with the correction object pixel R/Gb with a side.

The delay circuit 34 delays the 1H-delay signal Sig_Gge_1*h* by two clock cycles and supplies the delayed signal to the correction circuit 30 as a signal from a lower left pixel (c) in contact with the correction object pixel R/Gb with a side. The delay circuit 35 delays the 1H-delay signal Sig_Ggo_1*h* by one clock cycle and supplies the delayed signal to the correction circuit 30 as a signal from a lower right pixel (d) in contact with the correction object pixel R/Gb with a side.

As described above, when the 1H-delay signal Sig_R_Gb_1*h*, the 2H-delay signal Sig_Gge_2*h*, the 2H-delay signal Sig_Ggo_2*h*, the 1H-delay signal Sig_Gge_1*h*, and the 1H-delay signal Sig_Ggo_1*h* pass through the delay circuits 31 to 35 to cause the signal from the correction object pixel R/Gb to be a signal having a 1H delay plus one clock cycle delay, the signals from the four neighboring pixels diagonally adjacent to the correction object pixel R/Gb are extracted and the extracted signals are supplied to the correction circuit 30 along with the signal from the correction object pixel R/Gb.

Correction parameters Ka, Kb, Kc, and Kd and a control signal indicating whether the correction is turned on or off are supplied to the correction circuit 30 through the communication I/F 42 shown in FIG. 7. The correction parameters Ka, Kb, Kc, and Kd have independent values (amounts of correction). The correction parameters Ka, Kb, Kc, and Kd are set by the camera controller 5 and are supplied to the correction circuit 30 through the communication I/F 42. Accordingly, the camera controller 5 serves as setting means. The control signal indicating whether the correction is turned on or off instructs whether the correction of the color mixture is performed in the system.

If the control signal instructs turning on of the correction, the correction circuit 30 performs the correction of the color mixture to the signal from the correction object pixel R/Gb by using the correction parameters Ka, Kb, Kc, and Kd on the basis of the signals from the four neighboring pixels in contact with the correction object pixel R/Gb with sides. Since the 1H-delay signal Sig_R_Gb_1*h* is selected as an input signal to the correction circuit 30, the signal Sig_R_Gb' from the correction object pixel R/Gb after the correction is delayed by 1H with respect to the input signal to the color-mixture correction circuit 11.

Gr/B Channel Correction Sub-Block

Figure 11:
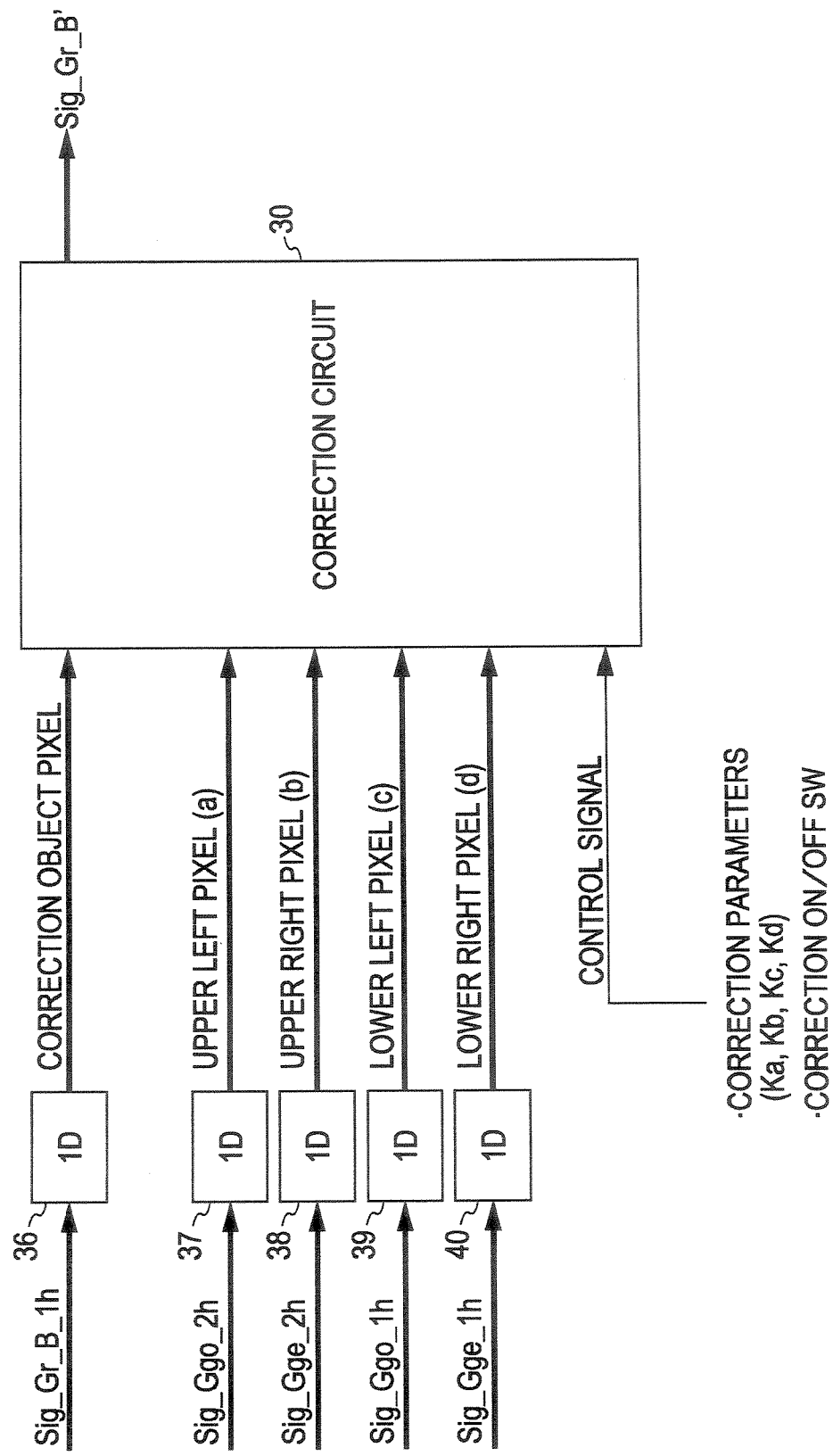
FIG. 11 is a block diagram showing an example of the configuration of a Gr/B channel correction sub-block.

FIG. 11 is a block diagram showing an example of the configuration of a Gr/B channel correction sub-block 113B. The Gr/B channel correction sub-block 113B includes five delay circuits 36 to 40, in addition to the correction circuit 30 as in the R/Gb channel correction sub-block 113A. The 1H-delay signal Sig_Gr_B_1*h*, the 2H-delay signal Sig_Ggo_2*h*, the 2H-delay signal Sig_Gge_2*h*, the 1H-delay signal Sig_Ggo_1*h*, and the 1H-delay signal Sig_Gge_1*h*, among the total of eight signals output from the line memory group 111 in FIG. 8, the two signals being output for every channel, are input in the Gr/B channel correction sub-block 113B.

Figure 12:
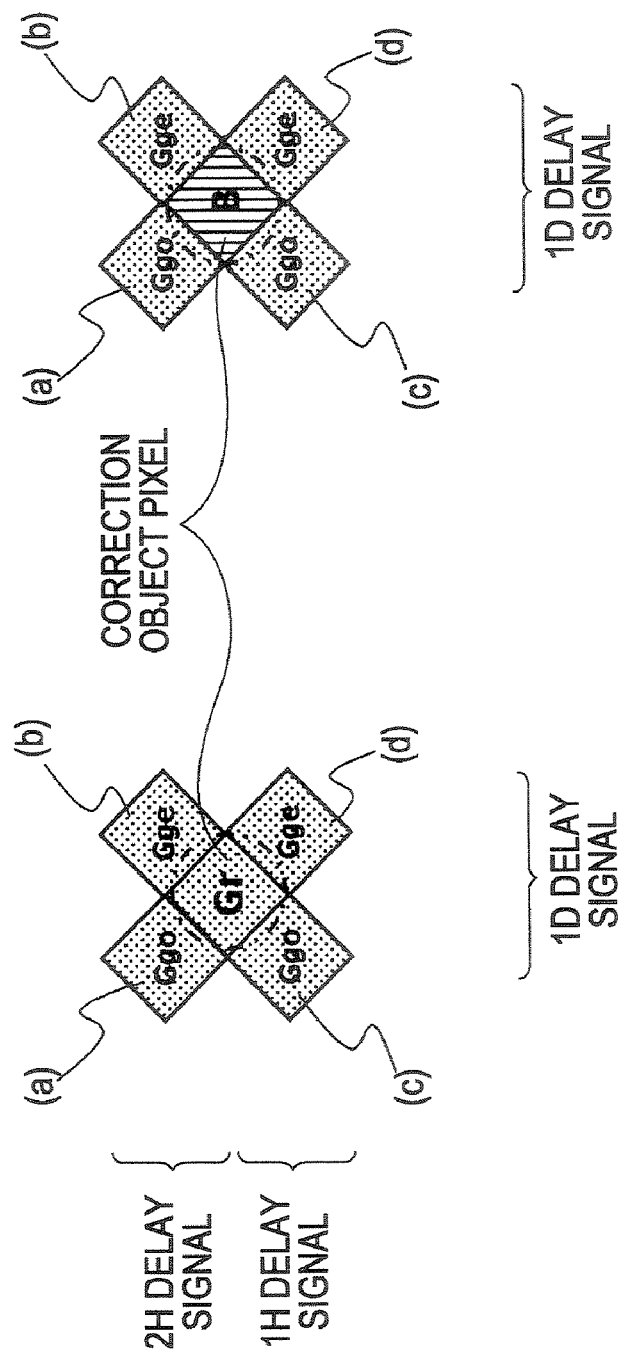
FIG. 12 shows the relationship between a correction object pixel Gr/B and four neighboring pixels diagonally adjacent to the correction object pixel.

The delay circuit 36 delays the 1H-delay signal Sig_Gr_B_1*h* by one clock cycle and supplies the delayed signal to the correction circuit 30 as a signal from a correction object pixel. In the Gr/B channel correction sub-block 113B, the Gr/B pixel is the correction object pixel, as shown in FIG. 12.

The delay circuit 37 delays the 2H-delay signal Sig_Ggo_2*h* by one clock cycle and supplies the delayed signal to the correction circuit 30 as a signal from an upper left pixel (a) in contact with the correction object pixel Gr/B with a side. The delay circuit 38 delays the 2H-delay signal Sig_Gge_2*h* by one clock cycle and supplies the delayed signal to the correction circuit 30 as a signal from an upper right pixel (b) in contact with the correction object pixel Gr/B with a side.

The delay circuit 39 delays the 1H-delay signal Sig_Ggo_1*h* by one clock cycle and supplies the delayed signal to the correction circuit 30 as a signal from a lower left pixel (c) in contact with the correction object pixel Gr/B with a side. The delay circuit 40 delays the 1H-delay signal Sig_Gge_1*h* by one clock cycle and supplies the delayed signal to the correction circuit 30 as a signal from a lower right pixel (d) in contact with the correction object pixel Gr/B with a side.

As described above, when the 1H-delay signal Sig_Gr_B_1*h*, the 2H-delay signal Sig_Ggo_2*h*, the 2H-delay signal Sig_Gge_2*h*, the 1H-delay signal Sig_Ggo_1*h*, and the 1H-delay signal Sig_Gge_1*h* pass through the delay circuits 36 to 40 to cause the signal from the correction object pixel Gr/B to be a signal having a 1H delay plus one clock cycle delay, the signals from the four neighboring pixels diagonally adjacent to the correction object pixel Gr/B are extracted and the extracted signals are supplied to the correction circuit 30 along with the signal from the correction object pixel Gr/B.

If the control signal instructs turning on of the correction, the correction circuit 30 performs the correction of the color mixture to the signal from the correction object pixel Gr/B by using the correction parameters Ka, Kb, Kc, and Kd on the basis of the signals from the four neighboring pixels in contact with the correction object pixel Gr/B with sides. Since the 1H-delay signal Sig_Gr_B_1*h* is selected as an input signal to the correction circuit 30, the signal Sig_Gr_B' from the correction object pixel Gr/B after the correction is delayed by 1H with respect to the input signal to the color-mixture correction circuit 11.

Ggo Channel Correction Sub-Block

Figure 13:
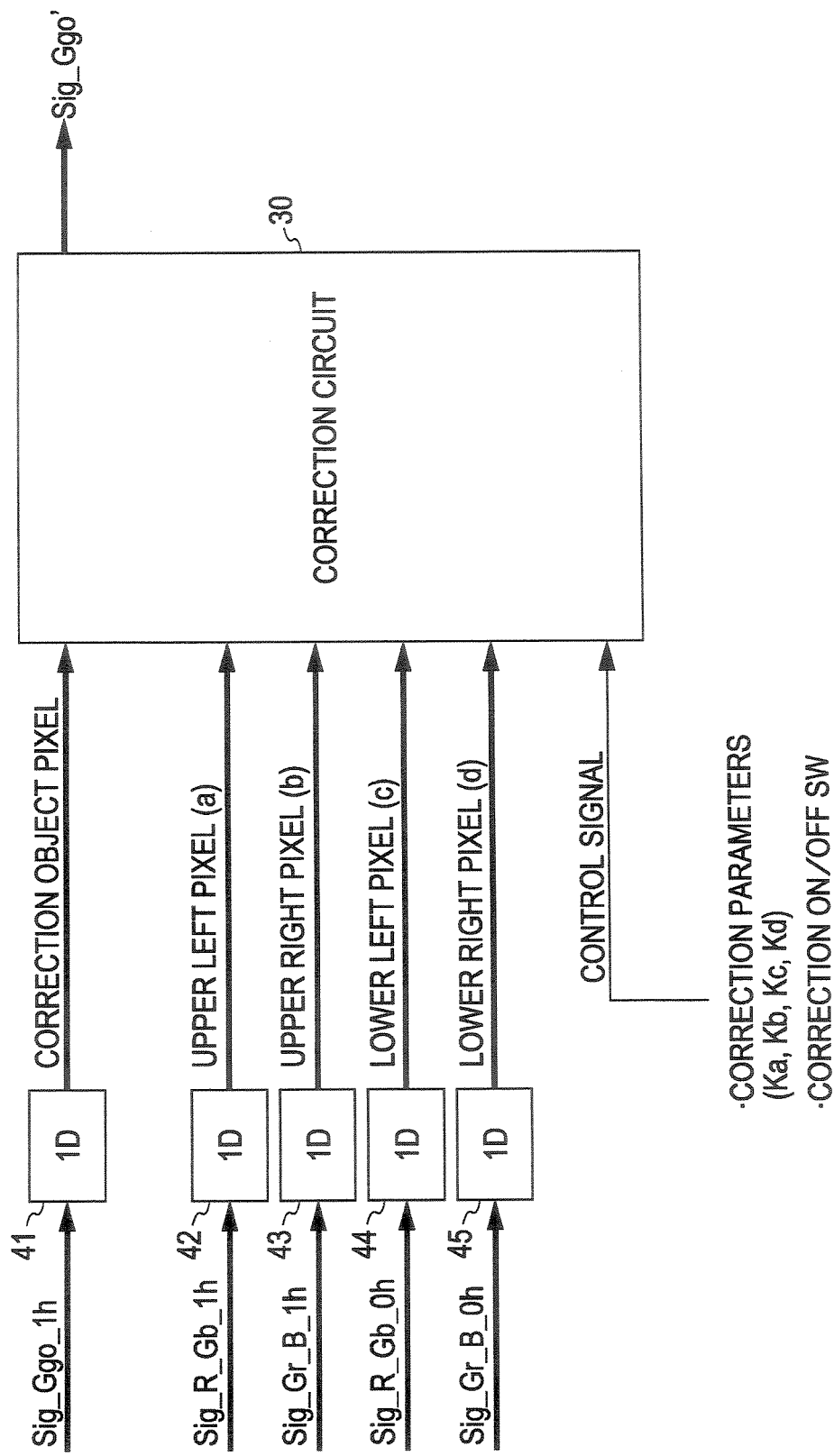
FIG. 13 is a block diagram showing an example of the configuration of a Ggo channel correction sub-block.

FIG. 13 is a block diagram showing an example of the configuration of a Ggo channel correction sub-block 113C. The Ggo channel correction sub-block 113C includes five delay circuits 41 to 45, in addition to the correction circuit 30 as in the R/Gb channel correction sub-block 113A. The 1H-delay signal Sig_Ggo_1*h*, the 1H-delay signal Sig_R_Gb_1*h*, the 1H-delay signal Sig_Gr_B_1*h*, the no-delay signal Sig_R_Gb_0*h*, and the no-delay signal Sig_Gr_B_0*h*, among the total of eight signals output from the line memory group 111 in FIG. 8, the two signals being output for every channel, are input in the Ggo channel correction sub-block 113C.

Figure 14:
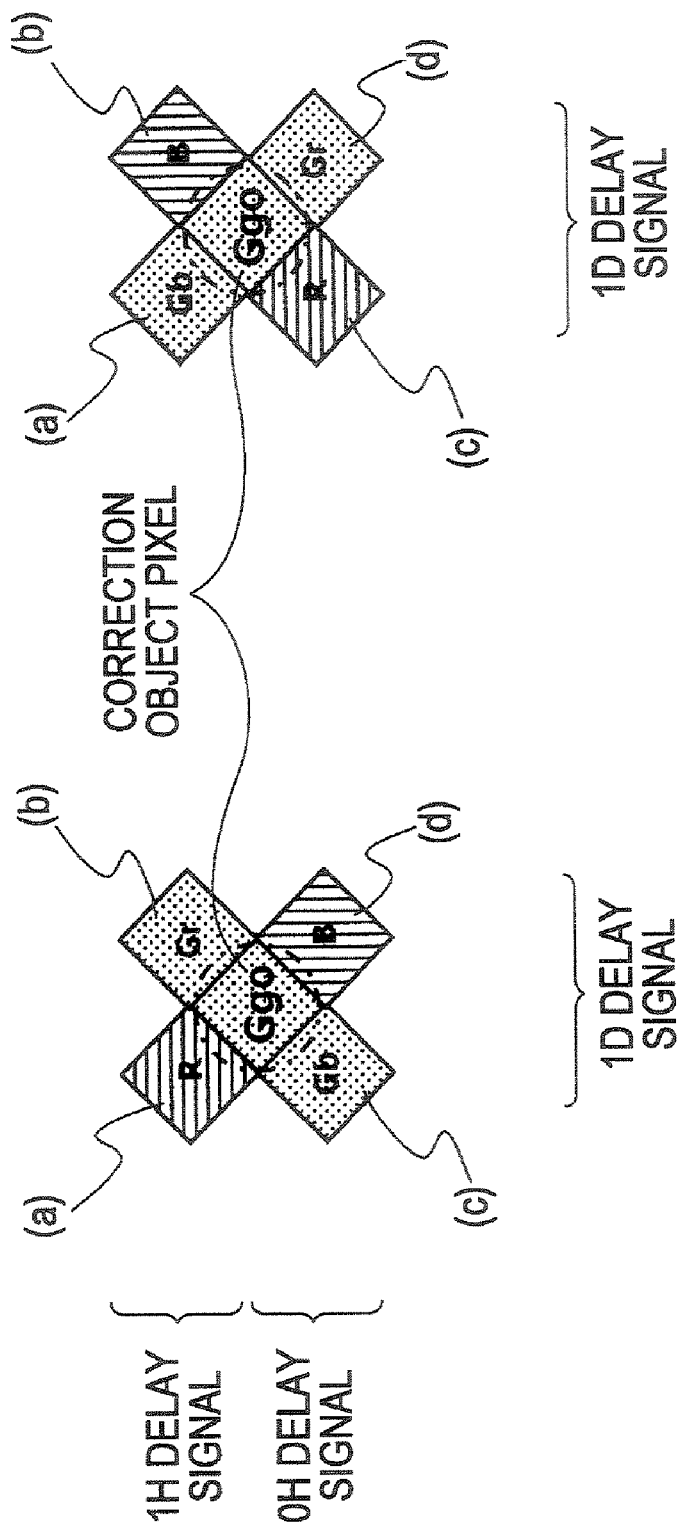
FIG. 14 shows the relationship between a correction object pixel Ggo and four neighboring pixels diagonally adjacent to the correction object pixel.

The delay circuit 41 delays the 1H-delay signal Sig_Ggo_1*h* by one clock cycle and supplies the delayed signal to the correction circuit 30 as a signal from a correction object pixel. In the Ggo channel correction sub-block 113C, the Ggo pixel is the correction object pixel, as shown in FIG. 14.

The delay circuit 42 delays the 1H-delay signal Sig_R_Gb_1*h* by one clock cycle and supplies the delayed signal to the correction circuit 30 as a signal from an upper left pixel (a) in contact with the correction object pixel Ggo with a side. The delay circuit 43 delays the 1H-delay signal Sig_GR_B_1*h* by one clock cycle and supplies the delayed signal to the correction circuit 30 as a signal from an upper right pixel (b) in contact with the correction object pixel Ggo with a side.

The delay circuit 44 delays the no-delay signal Sig_R_Gb_0*h* by one clock cycle and supplies the delayed signal to the correction circuit 30 as a signal from a lower left pixel (c) in contact with the correction object pixel Ggo with a side. The delay circuit 45 delays the no-delay signal Sig_Gr_B_0*h* by one clock cycle and supplies the delayed signal to the correction circuit 30 as a signal from a lower right pixel (d) in contact with the correction object pixel Ggo with a side.

As described above, when the 1H-delay signal Sig_Ggo_1*h*, the 1H-delay signal Sig_R_Gb_1*h*, the 1H-delay signal Sig_Gr_B_1*h*, the no-delay signal Sig_R_Gb_0*h*, and the no-delay signal Sig_Gr_B_0*h* pass through the delay circuits 41 to 45 to cause the signal from the correction object pixel Ggo to be a signal having a 1H delay plus one clock cycle delay, the signals from the four neighboring pixels diagonally adjacent to the correction object pixel Ggo are extracted and the extracted signals are supplied to the correction circuit 30 along with the signal from the correction object pixel Ggo.

If the control signal instructs turning on of the correction, the correction circuit 30 performs the correction of the color mixture to the signal from the correction object pixel Ggo by using the correction parameters Ka, Kb, Kc, and Kd on the basis of the signals from the four neighboring pixels in contact with the correction object pixel Ggo with sides. Since the 1H-delay signal Sig_Ggo_1*h* is selected as an input signal to the correction circuit 30, the signal Sig_Ggo' from the correction object pixel Ggo after the correction is delayed by 1H with respect to the input signal to the color-mixture correction circuit 11.

Gge Channel Correction Sub-Block

Figure 15:
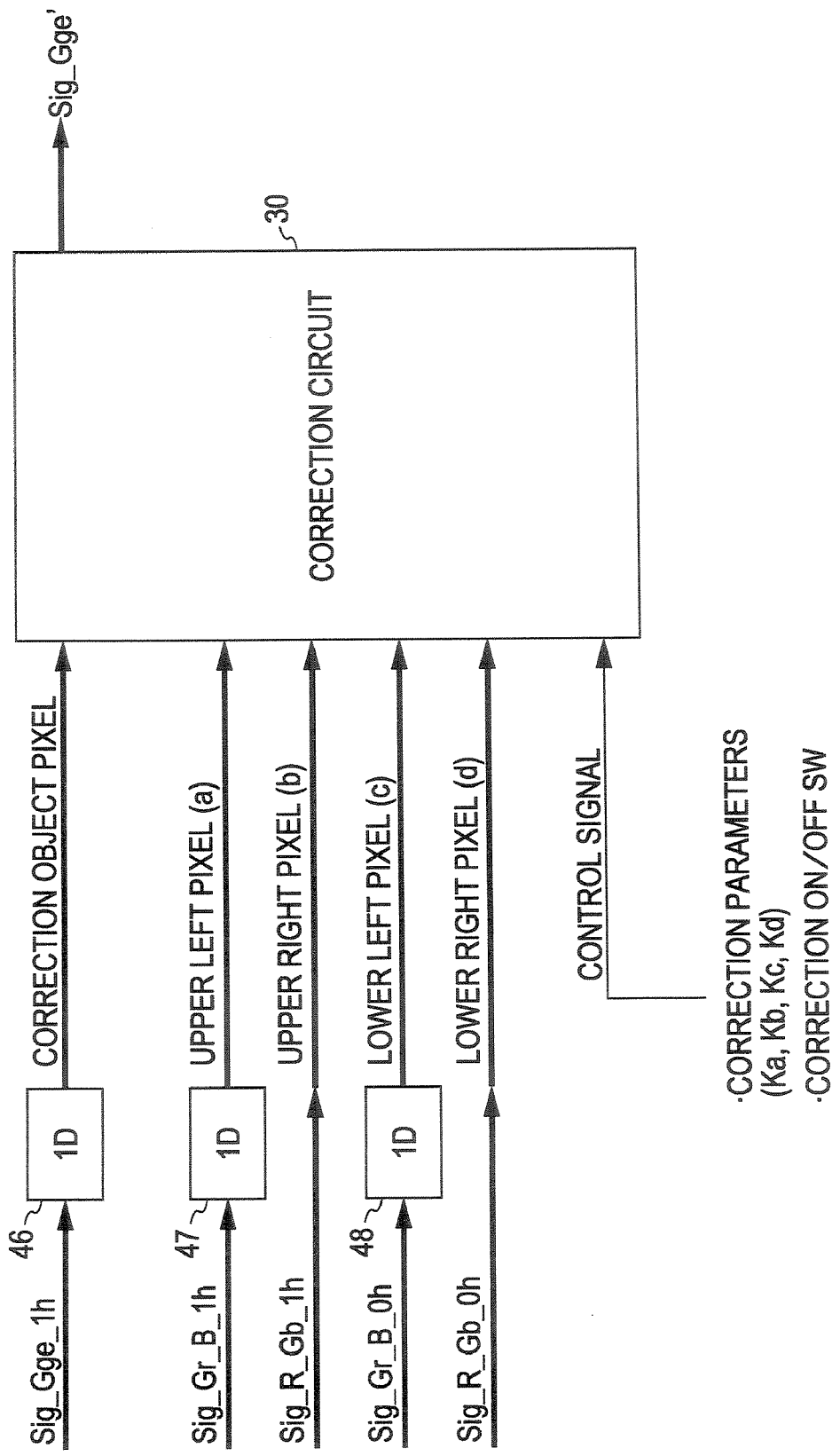
FIG. 15 is a block diagram showing an example of the configuration of a Gge channel correction sub-block.

FIG. 15 is a block diagram showing an example of the configuration of a Gge channel correction sub-block 113D. The Gge channel correction sub-block 113D includes three delay circuits 46 to 48, in addition to the correction circuit 30 as in the R/Gb channel correction sub-block 113A. The 1H-delay signal Sig_Gge_1*h*, the 1H-delay signal Sig_Gr_B_1*h*, the 1H-delay signal Sig_R_Gb_1*h*, the no-delay signal Sig_Gr_B_0*h*, and the no-delay signal Sig_R_Gb_0*h*, among the total of eight signals output from the line memory group 111 in FIG. 8, the two signals being output for every channel, are input in the Gge channel correction sub-block 113D.

Figure 16:
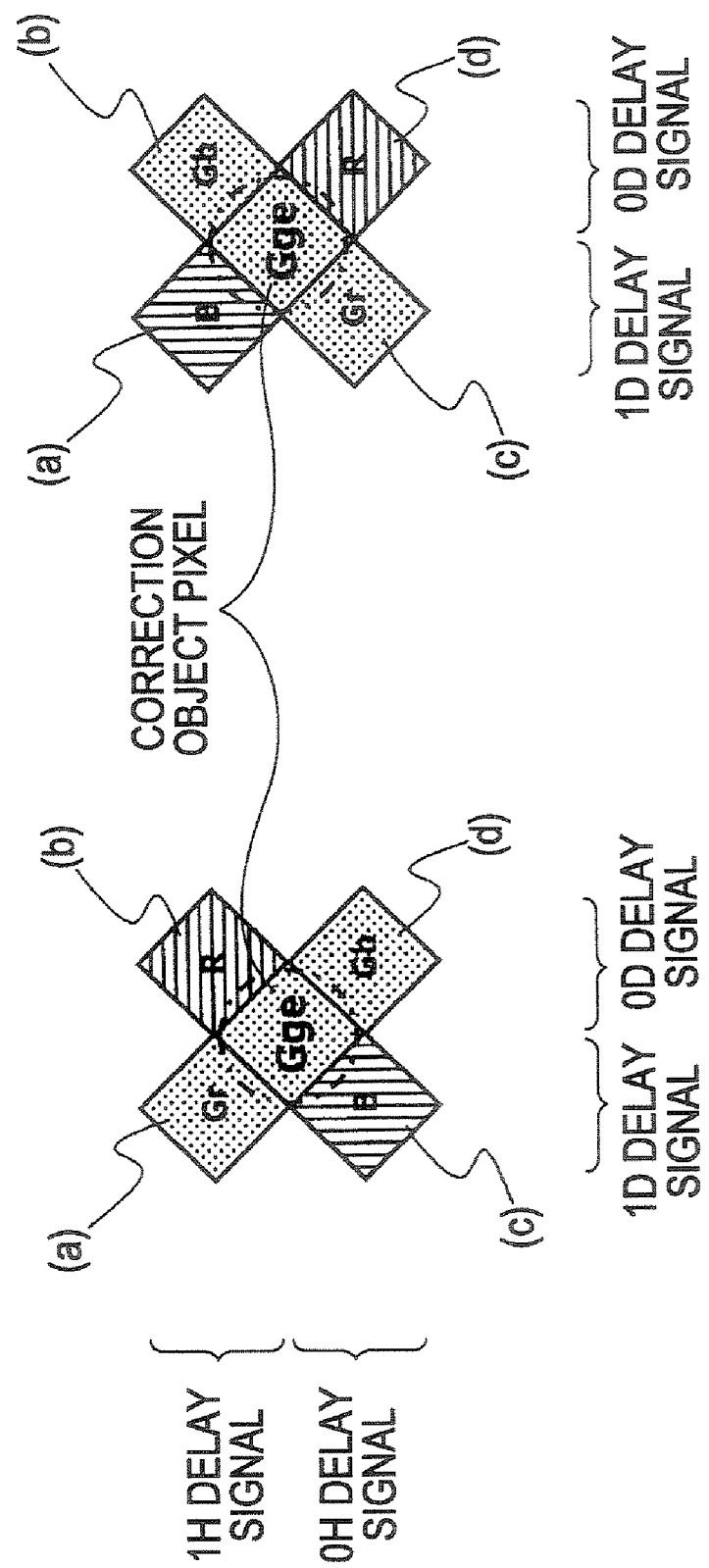
FIG. 16 shows the relationship between a correction object pixel Gge and four neighboring pixels diagonally adjacent to the correction object pixel.

The delay circuit 46 delays the 1H-delay signal Sig_Gge_1*h* by one clock cycle and supplies the delayed signal to the correction circuit 30 as a signal from a correction object pixel. In the Gge channel correction sub-block 113D, the Gge pixel is the correction object pixel, as shown in FIG. 16.

The delay circuit 47 delays the 1H-delay signal Sig_Gr_B_1*h* by one clock cycle and supplies the delayed signal to the correction circuit 30 as a signal from an upper left pixel (a) in contact with the correction object pixel Gge with a side. The 1H-delay signal Sig_R_Gb_1*h* is directly supplied to the correction circuit 30 as a signal from an upper right pixel (b) in contact with the correction object pixel Gge with a side.

The delay circuit 48 delays the no-delay signal Sig_Gr_B_0*h* by one clock cycle and supplies the delayed signal to the correction circuit 30 as a signal from a lower left pixel (c) in contact with the correction object pixel Gge with a side. The no-delay signal Sig_R_Gb_0*h* is directly supplied to the correction circuit 30 as a signal from a lower right pixel (d) in contact with the correction object pixel Gge with a side.

As described above, when the 1H-delay signal Sig_Gge_1*h*, the 1H-delay signal Sig_Gr_B_1*h*, and the no-delay signal Sig_Gr_B_0*h* pass through the delay circuits 46 to 48 (the 1H-delay signal Sig_R_Gb_1*h* and no-delay signal Sig_R_Gb_0*h* are directly supplied to the correction circuit 30) to cause the signal from the correction object pixel Gge to be a signal having a 1H delay plus one clock cycle delay, the signals from the four neighboring pixels diagonally adjacent to the correction object pixel Gge are extracted and the extracted signals are supplied to the correction circuit 30 along with the signal from the correction object pixel Gge.

If the control signal instructs turning on of the correction, the correction circuit 30 performs the correction of the color mixture to the signal from the correction object pixel Gge by using the correction parameters Ka, Kb, Kc, and Kd on the basis of the signals from the four neighboring pixels in contact with the correction object pixel Gge with sides. Since the 1H-delay signal Sig_Gge_1h is selected as an input signal to the correction circuit 30, the signal Sig_Gge' from the correction object pixel Gge after the correction is delayed by 1H with respect to the input signal to the color-mixture correction circuit 11.

Correction Circuit

The configuration of the correction circuit 30 common to the channels will now be described in first to third examples.

First Example

Figure 17:
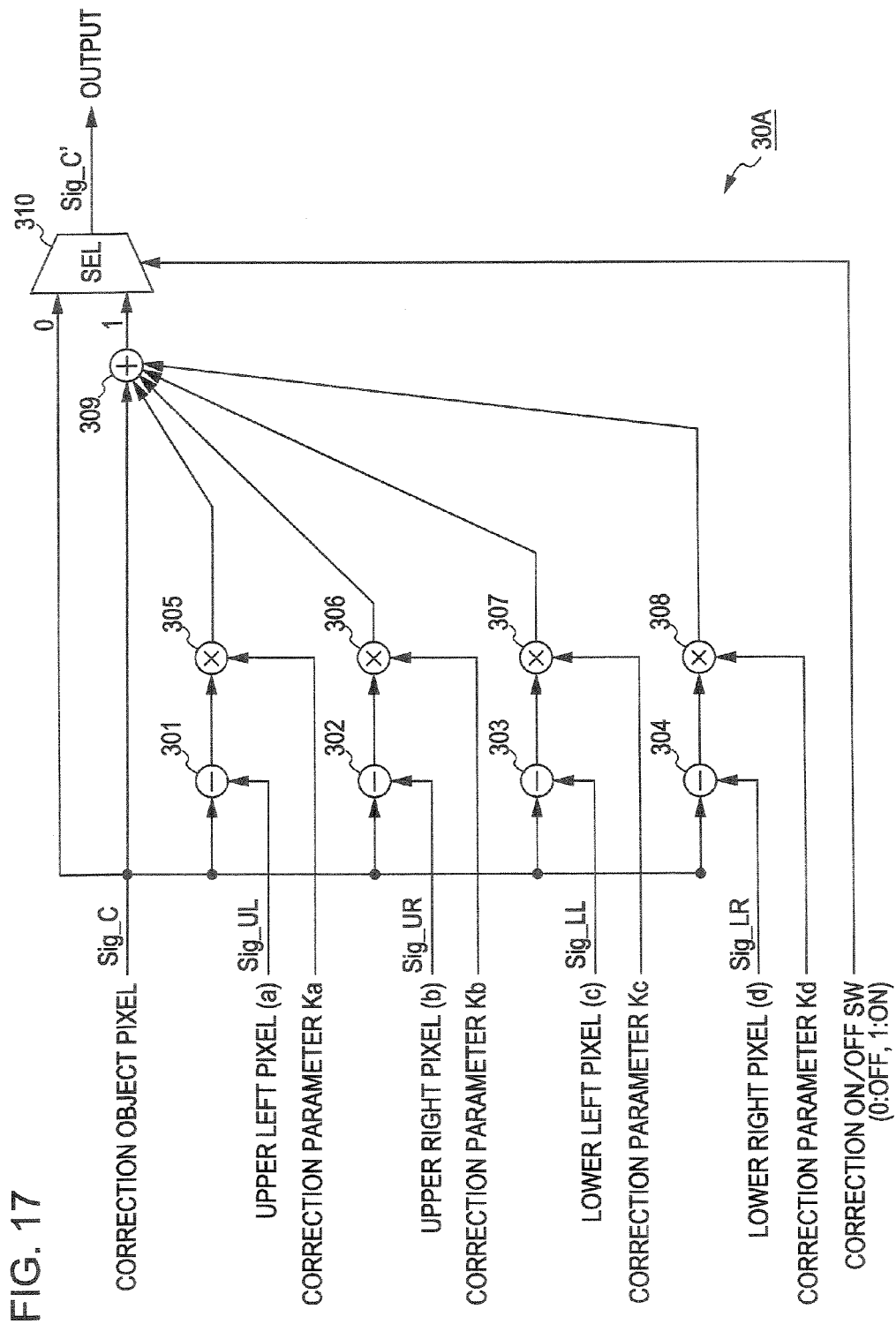
FIG. 17 is a block diagram showing an example of the configuration of a correction circuit in a first example according to the first embodiment of the present invention.

FIG. 17 is a block diagram showing an example of the configuration of a correction circuit 30A in a first example. The correction circuit 30A calculates differences between the signal Sig_C (Sig_R_Gb/Sig_Gr_B/Sig_Ggo/Sig_Gge) from the correction object pixel and the signals (upper left pixel: Sig_UL, upper right pixel: Sig_UR, lower left pixel: Sig_LL, and lower right pixel: Sig_LR) from the pixels diagonally adjacent to the correction object pixel. The correction circuit 30A, then, multiplies the differences by the independent correction parameters Ka, Kb, Kc, and Kd and adds the results of the multiplication to calculate a correction signal Sig_C' (Sig_R_Gb'/Sig_Gr_B/Sig_Ggo'/Sig_Gge').

Specifically, the correction circuit 30A includes four subtractors 301 to 304, four multipliers 305 to 308, one adder 309, and one selector 310, as shown in FIG. 17.

The subtractor 301 calculates a difference between the signal Sig_C from the correction object pixel and the signal Sig_UL from the upper left pixel. The subtractor 302 calculates a difference between the signal Sig_C from the correction object pixel and the signal Sig_UR from the upper right pixel. The subtractor 303 calculates a difference between the signal Sig_C from the correction object pixel and the signal Sig_LL from the lower left pixel. The subtractor 304 calculates a difference between the signal Sig_C from the correction object pixel and the signal Sig_LR from the lower right pixel.

The multiplier 305 multiplies the output signal from the subtractor 301 by the correction parameter Ka. The multiplier 306 multiplies the output signal from the subtractor 302 by the correction parameter Kb. The multiplier 307 multiplies the output signal from the subtractor 303 by the correction parameter Kc. The multiplier 308 multiplies the output signal from the subtractor 304 by the correction parameter Kd. The adder 309 adds the output signals from the multipliers 305 to 308 to the signal Sig_C from the correction object pixel and outputs the added result as the correction signal Sig_C'.

This calculation process can be represented by the following equation:

$$Sig\_C' = Sig\_C + \qquad (1)$$
$$Ka \times (Sig\_C - Sig\_UL) +$$
$$Kb \times (Sig\_C - Sig\_UR) +$$
$$Kc \times (Sig\_C - Sig\_LL) +$$
$$Kd \times (Sig\_C - Sig\_LR)$$

The selector 310 selects and outputs the correction signal Sig_C' output from the adder 309 if the control signal indicating whether the correction is turned on or off (1:ON, 0:OFF), supplied through the communication I/F 42 in FIG. 7, is set to one (ON), and selects and outputs the signal Sig_C from the correction object pixel if the control signal is set to zero (OFF).

Although the multipliers 305 to 308 multiply the differences calculated by the subtractors 301 to 304 by the independent correction parameters Ka, Kb, Kc, and Kd in the first example, this calculation process can be realized by bit shift. Which method is adopted can be determined on the basis of the balance between the correction accuracy and the circuit size.

Figure 18:
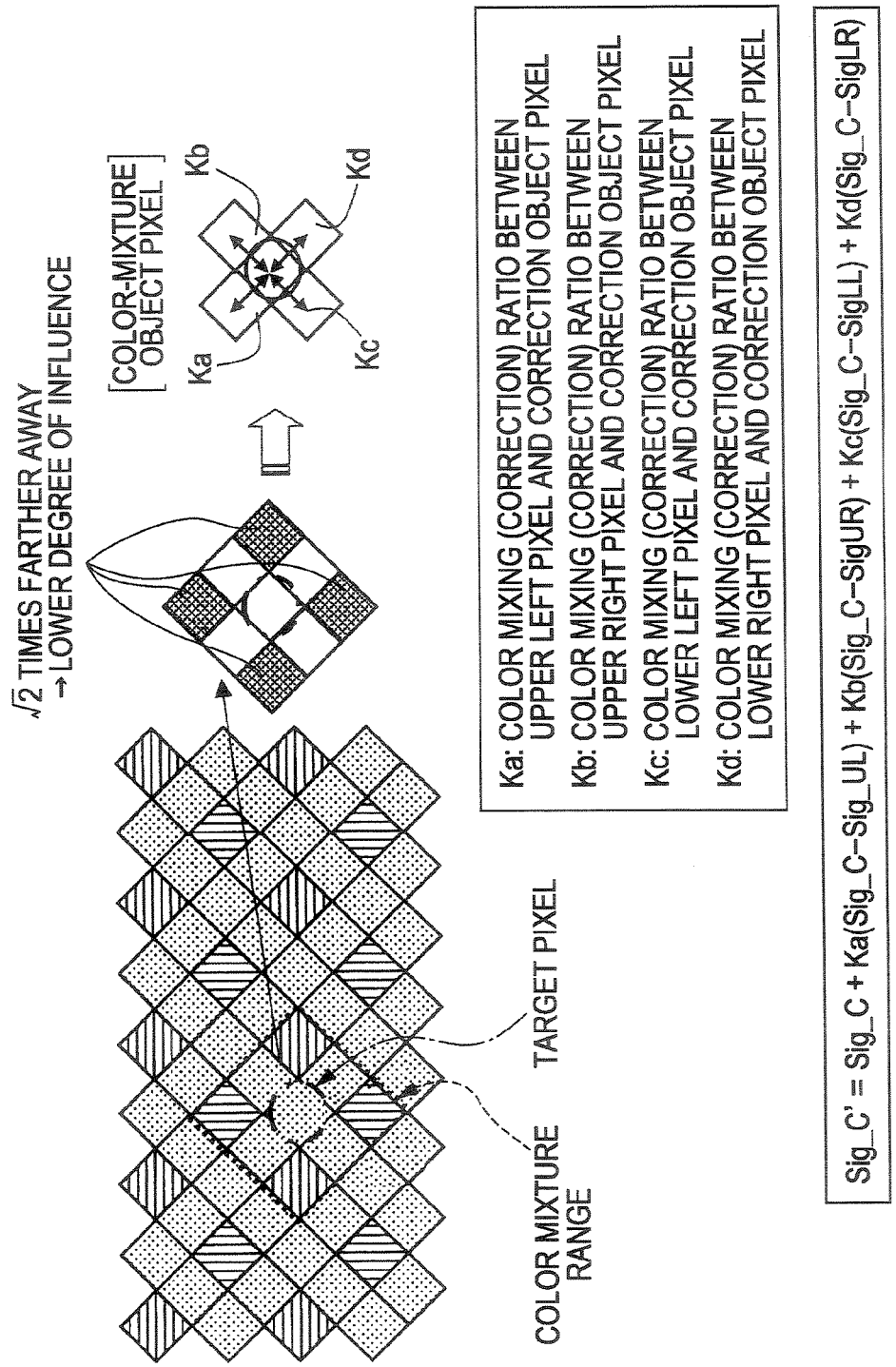
FIG. 18 illustrates a correction model equation of the correction circuit in the first example according to the first embodiment of the present invention.

FIG. 18 illustrates the correction model equation shown in (1). Among the neighboring eight pixels around the correction object pixel, the upper, lower, left, and right pixels with respect to the correction object pixel are $\sqrt{2}$ times farther away from the correction object pixel than the upper left pixel, the upper right pixel, the lower left pixel, and the lower right pixel with respect to the correction object pixel. Accordingly, the upper left pixel, the upper right pixel, the lower left pixel, and the lower right pixel with respect to the correction object pixel have a more dominant influence of the color mixture on the correction object pixel, compared with the upper, lower, left, and right pixels with respect to the correction object pixel. Consequently, it is assumed in this example that the color mixture between the correction object pixel and the upper, lower, left, and right pixels can be negligible, and the upper, lower, left, and right pixels are excluded from the description.

The correction circuit 30 is structured so as to adopt the correction model, in which the color of the correction object pixel is added back by an amount corresponding to the color mixture ratio K when the color of the correction object pixel leaks into the upper left, upper right, lower left, and lower right pixels by the above amount and the color of the correction object pixel is subtracted by the amount corresponding to the color mixture ratio K when the color of the upper left, upper right, lower left, or lower right pixel leaks into the correction object pixel by the above amount, to alleviate the color mixture. In this model, the color mixture ratios between the correction object pixel and the upper left, upper right, lower left, and the lower right pixels are respectively denoted by Ka, Kb, Kc, and Kd. In other words, since the amount of the color mixture increases as the difference in level between the correction object pixel and the neighboring pixels is increased, the correction circuit 30 performs the correction of the color mixture in accordance with the amount of difference.

The above structure achieves the following advantages:

The amount of the correction of the color mixture can be externally controlled in real time through the communication I/F 42 (refer to FIGS. 6 and 7).

Varying the values of the correction parameters Ka, Kb, Kc, and Kd can realize the correction of the color mixture with directionality (can also realize isotropic correction if Ka=Kb=Kc=Kd).

Although the correction model equation (1) is used in this example, the correction circuit 30A is not limited to the circuit configuration realizing the calculation in (1) because the present invention is not focused on the model equation itself.

Second Example

Figure 19:
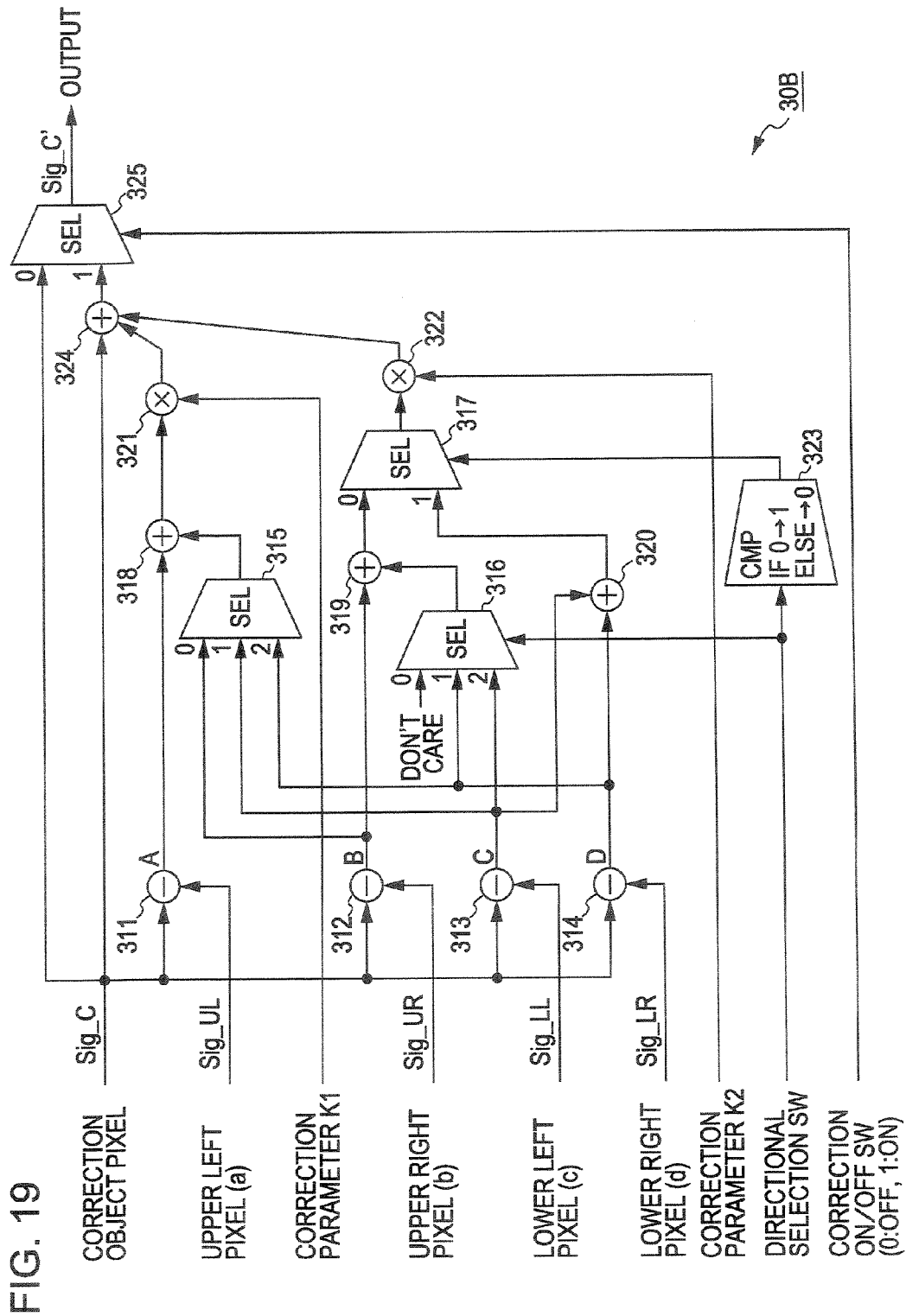
FIG. 19 is a block diagram showing an example of the configuration of a correction circuit in a second example according to the first embodiment of the present invention.

FIG. 19 is a block diagram showing an example of the configuration of a correction circuit 30B in a second example. The correction circuit 30B calculates differences between the signal Sig_C (Sig_K_Gb/Sig_Gr_B/Sig_Ggo/Sig_Gge) from the correction object pixel and the signals (upper left pixel: Sig_UL, upper right pixel: Sig_UR, lower left pixel: Sig_LL, and lower right pixel: Sig_LR) from the pixels diagonally adjacent to the correction object pixel. The correction circuit 30B, then, adds any pair of the differences in accordance with a directional selection control signal (value), supplied through the communication I/F 42. The correction circuit 30B multiplies the addition results by independent correction parameters K1 and K2 and adds the results of the multiplication to calculate a correction signal Sig_C' (Sig_R_Gb'/Sig_Gr_B'/Sig_Ggo'/Sig_Gge').

Specifically, the correction circuit 30B includes four subtractors 311 to 314, three selectors 315 to 317, three adders 318 to 320, two multipliers 321 and 322, one comparator 323, one adder 324, and one selector 325, as shown in FIG. 19.

The subtractor 311 calculates a difference between the signal Sig_C from the correction object pixel and the signal Sig_UL from the upper left pixel. The subtractor 312 calculates a difference between the signal Sig_C from the correction object pixel and the signal Sig_UR from the upper right pixel. The subtractor 313 calculates a difference between the signal Sig_C from the correction object pixel and the signal Sig_LL from the lower left pixel. The subtractor 314 calculates a difference between the signal Sig_C from the correction object pixel and the signal Sig_LR from the lower right pixel.

The selector 315 receives output signals B, C, and D from the subtractors 312, 313, and 314, respectively. The selector 315 selects and outputs the output signal B from the subtractor 312 if the directional selection control signal has a value "0", selects and outputs the output signal C from the subtractor 313 if the directional selection control signal has a value "1", and selects and outputs the output signal D from the subtractor 314 if the directional selection control signal has a value "2". The selector 316 receives output signals C and D from the subtractors 313 and 314, respectively. The selector 316 selects and outputs the output signal D from the subtractor 314 if the directional selection control signal has a value "1", and selects and outputs the output signal C from the subtractor 313 if the directional selection control signal has a value "2".

The adder 318 adds the output signal from the selector 315 to an output signal A from the subtractor 311. The adder 319 adds the output signal from the selector 316 to the output signal B from the subtractor 312. The adder 320 adds the output signal C from the subtractor 313 to the output signal D from the subtractor 314.

The comparator 323 outputs a control signal having a value "1" if the directional selection control signal has a value "0" and outputs a control signal having a value "0" if the directional selection control signal has other values. The selector 317 receives the output signals from the adders 319 and 320. The selector 317 selects and outputs the output signal from the adder 319 if the control signal supplied from the comparator 323 has a value "0" and selects and outputs the output signal from the adder 320 if the control signal supplied from the comparator 323 has a value "1".

The multiplier 321 multiplies the output signal from the adder 318 by the correction parameter K1. The multiplier 322 multiplies the output signal from the selector 317 by the correction parameter K2. The adder 324 adds the output signals from the multipliers 321 and 322 to the signal Sig_C from the correction object pixel to output a correction signal Sig_C'.

This calculation process can be represented by the following equations:

If the directional selection control signal has a value "0", $$Sig\_C' = Sig\_C + \qquad\qquad\qquad (2)$$
$$K1 \times [(Sig\_C - Sig\_UL) + (Sig\_C - Sig\_UR)] +$$
$$K2 \times [(Sig\_C - Sig\_LL) + (Sig\_C - Sig\_LR)]$$

If the directional selection control signal has a value "1", $$Sig\_C' = Sig\_C + \qquad\qquad\qquad (3)$$
$$K1 \times [(Sig\_C - Sig\_UL) + (Sig\_C - Sig\_LL)] +$$
$$K2 \times [(Sig\_C - Sig\_UR) + (Sig\_C - Sig\_LR)]$$

If the directional selection control signal has a value "2", $$Sig\_C' = Sig\_C + \qquad\qquad\qquad (4)$$
$$K1 \times [(Sig\_C - Sig\_UL) + (Sig\_C - Sig\_LR)] +$$
$$K2 \times [(Sig\_C - Sig\_UR) + (Sig\_C - Sig\_LL)]$$

These correction model equations can be switched. The selector 325 selects and outputs the correction signal Sig_C' output from the adder 324 if the control signal indicating whether the correction is turned on or off (1:ON, 0:OFF), supplied through the communication I/F 42, is set to one (ON), and selects and outputs the signal Sig_C from the correction object pixel if the control signal is set to zero (OFF).

Although the multipliers 321 and 322 multiply the output signals from the adder 318 and the selector 317 by the independent correction parameters K1 and K2 in the second example, this calculation process can be realized by bit shift. Which method is adopted can be determined on the basis of the balance between the correction accuracy and the circuit size.

FIG. 20 illustrates the correction model equations shown in (2), (3), and (4). The concept of the correction model equations is the same as in the correction model equation in FIG. 18. FIG. 20 shows combination of the color mixture ratios and the correction model equations depending on the value (0, 1, or 2) of the directional selection control signal.

In the correction circuit 30A (refer to FIG. 17) in the first example, since the calculations should be simultaneously performed in parallel every clock cycle, the four multipliers 305 to 308 are basically provided for every channel. In contrast, in the correction circuit 30B in the second example, since the degree of freedom of the directionality of the correction is reduced and the function similar to that of the correction circuit 30A is realized only by the two multipliers 321 and 322, the circuit size can be greatly reduced. Although the degree of freedom of the directionality is restricted in order to reduce the circuit size, the combination of the color mixture ratios, most suitable for the characteristics of the CMOS image sensor, is used to correct the color mixture in order to improve the degree of freedom as much as possible.

The above structure achieves the following advantages: The amount of the correction of the color mixture can be externally controlled in real time through the communication I/F 42 (refer to FIGS. 6 and 7).

The correction of the color mixture with the circuit size being greatly reduced can be realized while keeping a certain degree of freedom of the directionality of the correction (can also realize isotropic correction if K1=K2).

Third Example

Figure 21:
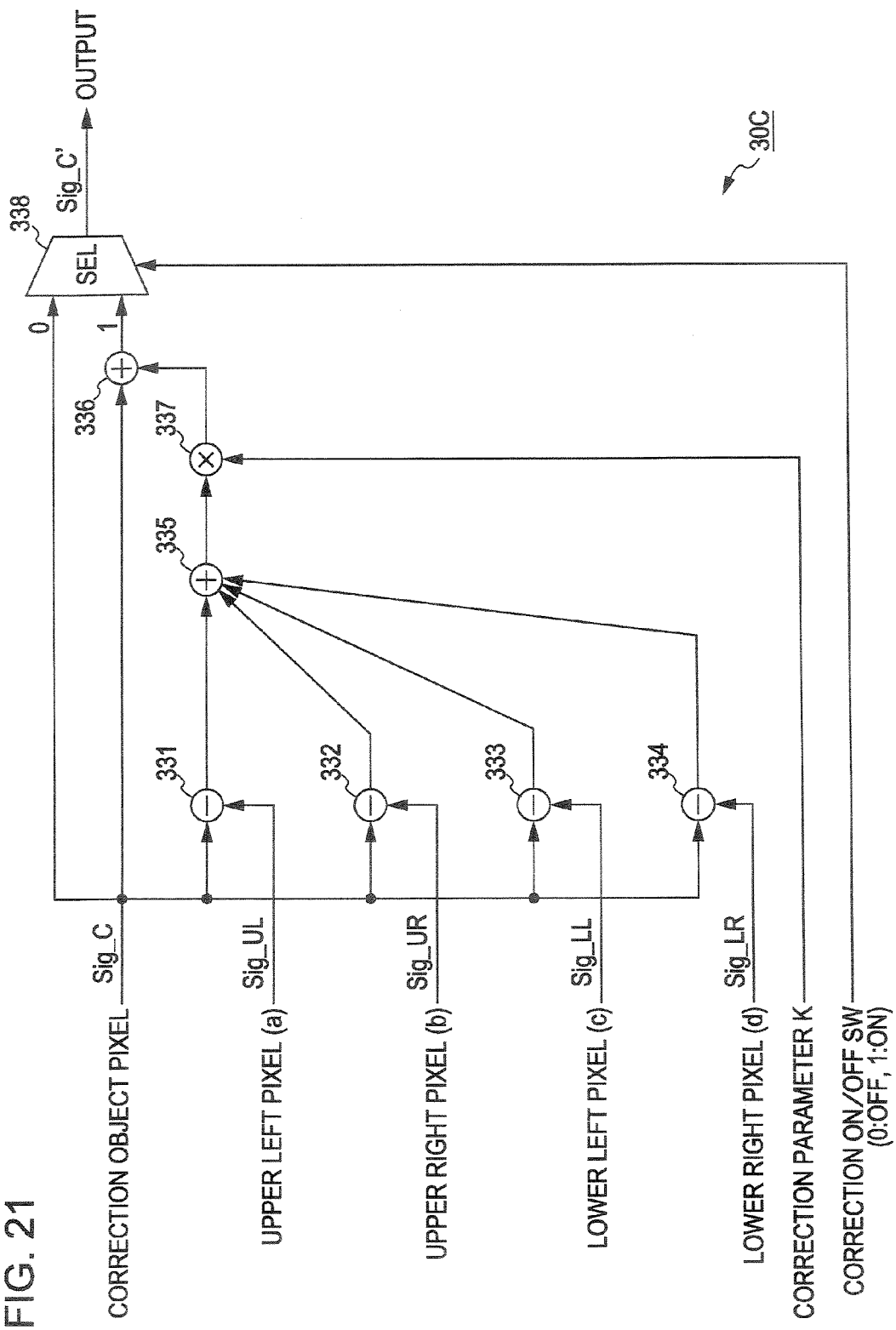
FIG. 21 is a block diagram showing an example of the configuration of a correction circuit in a third example according to the first embodiment of the present invention.

FIG. 21 is a block diagram showing an example of the configuration of a correction circuit 30C in a third example. The correction circuit 30C calculates differences between the signal Sig_C (Sig_R_Gb/Sig_Gr_B/Sig_Ggo/Sig_Gge) from the correction object pixel and the signals (upper left pixel: Sig_UL, upper right pixel: Sig_UR, lower left pixel: Sig_LL, and lower right pixel: Sig_LR) from the pixels diagonally adjacent to the correction object pixel and adds all the differences. The correction circuit 30C, then, multiplies the addition result by a correction parameter K and adds the multiplication result to the original signal Sig_C to calculate a correction signal Sig_C' (Sig_R_Gb'/Sig_Gr_B'/Sig_Ggo'/Sig_Gge').

Specifically, the correction circuit 30C includes four subtractors 331 to 334, two adders 335 and 336, one multiplier 337, and one selector 338, as shown in FIG. 21.

The subtractor 331 calculates a difference between the signal Sig_C from the correction object pixel and the signal Sig_UL from the upper left pixel. The subtractor 332 calculates a difference between the signal Sig_C from the correction object pixel and the signal Sig_UR from the upper right pixel. The subtractor 333 calculates a difference between the signal Sig_C from the correction object pixel and the signal Sig_LL from the lower left pixel. The subtractor 334 calculates a difference between the signal Sig_C from the correction object pixel and the signal Sig_LR from the lower right pixel.

The adder 335 adds all the output signals from the subtractors 331 to 334. The multiplier 337 multiplies the output signal from the adder 335 by the correction parameter K. The adder 336 adds the output signal from the multiplier 337 to the signal Sig_C from the correction object pixel to output the correction signal Sig_C'.

This calculation process can be represented by the following equation:

$$Sig\_C' = Sig\_C + \\ K \times [(Sig\_C - Sig\_UL) + (Sig\_C - Sig\_UR) + \\ (Sig\_C - Sig\_LL) + (Sig\_C - Sig\_LR)] \tag{5}$$

The correction circuit 30C can further reduce the circuit size, compared with the correction circuit 30B in the second example, because the only one multiplier is used to perform the correction of the color mixture, although the degree of freedom of the directionality is lost. The correction circuit 30C has a very effective circuit configuration, for example, when the directionality in the color mixture in the image sensor can be negligible in order to achieve a desired image quality.

The selector 338 selects and outputs the correction signal Sig_C' output from the adder 336 if the control signal indicating whether the correction is turned on or off (1:ON, 0:OFF), supplied through the communication I/F 42, is set to one (ON), and selects and outputs the signal Sig_C from the correction object pixel if the control signal is set to zero (OFF).

Although the multiplier 337 multiplies the output signal from the adder 335 by the correction parameter K in the third example, this calculation process can be realized by bit shift. Which method is adopted can be determined on the basis of the balance between the correction accuracy and the circuit size.

Figure 22:
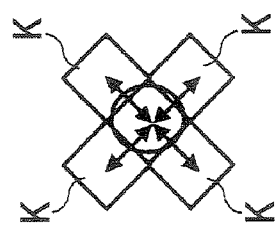
FIG. 22 illustrates a correction model equation of the correction circuit in the third example according to the first embodiment of the present invention.

FIG. 22 illustrates the correction model equation shown in (5). The concept of the correction model equation is the same as in the correction model equation in FIG. 18.

The above structure achieves the following advantages: The amount of the correction of the color mixture can be externally controlled in real time through the communication I/F 42 (refer to FIGS. 6 and 7).

The correction of the color mixture can be realized with the circuit size being greatly reduced, although the degree of freedom of the directionality of the correction is lost.

As described above, the color-mixture correction circuit has a structure in which a condenser microlens is layered on a color separation filter that is layered on pixel cells including photoelectric transducers, and has the color coding in which the G components surround the R and B components in the pixel shifted arrangement. The color-mixture correction circuit corrects the color mixture between the pixels in the CMOS image sensor 20A, which performs vertical scanning for every horizontal zigzag row. The color-mixture correction circuit uses the signals from the multiple neighboring pixels adjacent to a target pixel (correction object pixel) and the correction parameters independently set for the signals to perform the correction of the color mixture to the signal from the target pixel. Since the amount of correction of the color mixture from the neighboring pixels into the target pixel can be independently set for every neighboring pixel, it is possible to give the directionality to the amount of correction of the color mixture from the neighboring pixels into the target pixel, that is, it is possible to set different amounts of correction for different neighboring pixels.

Accordingly, the correction of the color mixture can be performed in accordance with the degree of the color mixture from the neighboring pixels into the target pixel. Even if the photoelectric transducers (photosensitive sections) are shifted from the centers of the pixel cells depending on the layout of the circuit sections, the wiring, or the signal reading sections and, therefore, the physical center of each pixel cell does not necessarily coincide with the optical center thereof to cause the directionality to the color mixture from the neighboring pixels into the target pixel, the correction of the color mixture can be realized in accordance with the directionality to reduce the degree of the color mixture.

Particularly, in the color coding in which the G components surround the R and B components in the pixel shifted arrangement, all the neighboring pixels are the G components when the correction object pixel (target pixel) is the R or B component. Since the value of the correction parameter (the amount of correction) can be set for every G neighboring pixel, the correction of the color mixture can be realized with more effective directionality. In addition, isotropic correction can be realized depending on the values of the correction parameters. Since the external camera controller 5 can set the values of the correction parameters through the communication I/F 42, it is also possible to set the amount of correction in accordance with the shooting conditions in real time.

When the degree of freedom in the four directions is not necessary in order to keep the balance between the desired image quality and the circuit size, the use of the correction circuit 30B in the second example allows the correction circuit keeping a higher degree of freedom of the directionality to be configured while greatly reducing the circuit size. When the degree of freedom in the four directions is not necessary and it is sufficient to realize the isotropic correction in order to keep the balance between the desired image quality and the circuit size, the use of the correction circuit 30C in the third example allows the correction circuit having a further reduced circuit size to be configured.

When the physical center of each pixel cell does not necessarily coincide with the optical center thereof to cause the directionality to the color mixture from the neighboring pixels into the target pixel, the values of the correction parameters (the amounts of correction) independently set for the signals from the multiple neighboring pixels are appropriately set on the basis of the degree of the color mixture from the neighboring pixels into the target pixel.

In the above embodiment, the upper, lower, left, and right pixels, which are in contact with the target pixel with apices, are excluded because the color mixture between the target pixel and the upper, lower, left, and right pixels can be negligible in the pixel shifted arrangement shown in FIG. 2, and the correction of the color mixture is performed by using the signals from the upper left, upper right, lower left, and lower right pixels, which are in contact with the target pixel with sides. However, the color mixture may be corrected by using the signals from the upper, lower, left and right pixels. Also in this case, independent correction parameters are used for the signals from the upper, lower, left and right pixels.

Although the amount of correction is set independently of the color of the pixel in the above embodiment, the amount of correction may be varied for every color. Specifically, the camera controller 5 generates R correction parameters Kar, Kbr, Kcr, and kdr, G correction parameters Kag, Kbg, Kcg, and Kdg, and B correction parameters Kab, Kbb, Kcb, and Kdb and supplies the generated correction parameters to the R/Gb channel correction sub-block 113A and the Gr/B channel correction sub-block 113B through the communication I/F 42.

Figure 23:
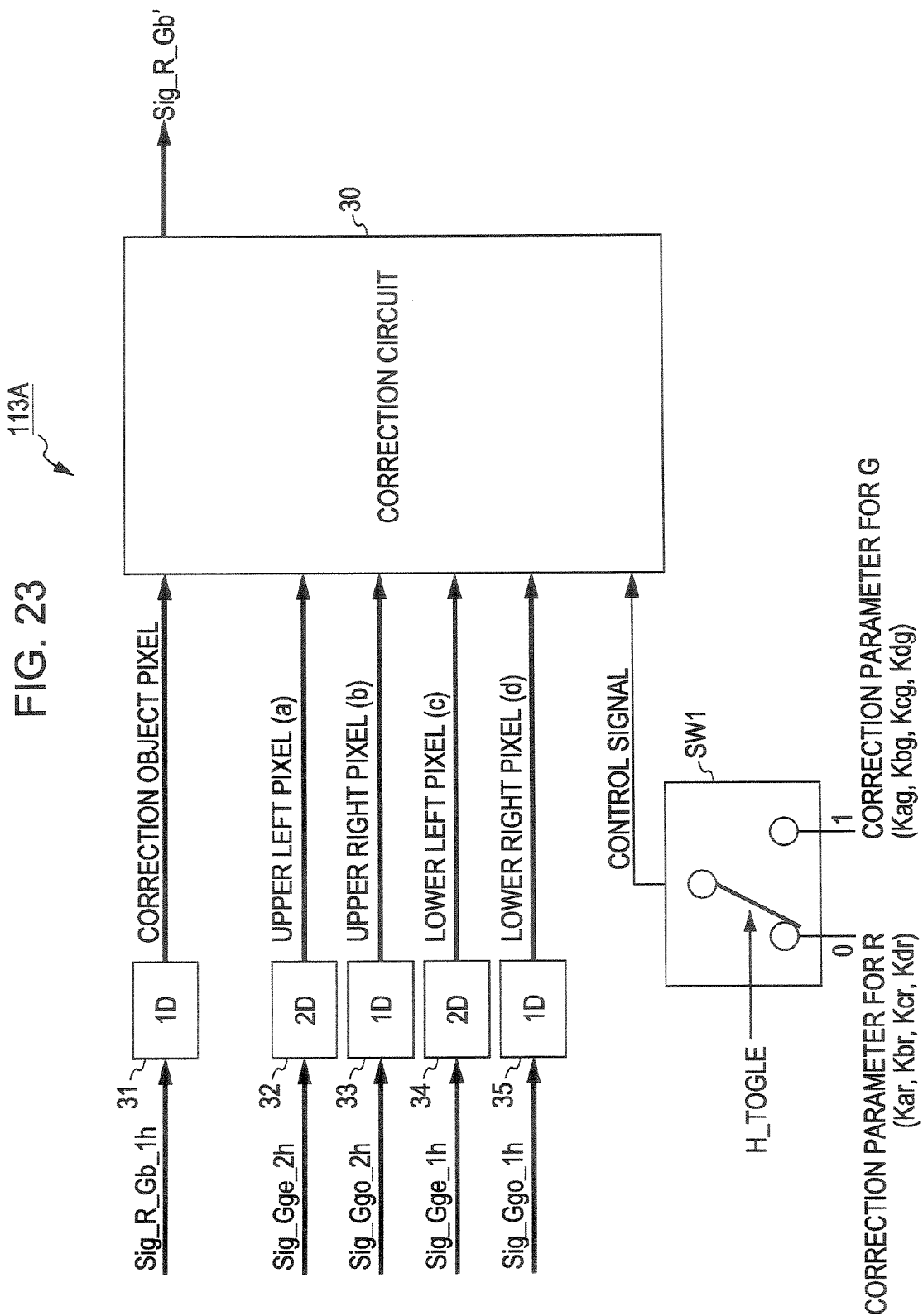
FIG. 23 is a block diagram showing an example of the configuration of the R/Gb channel correction sub-block when the amount of correction is varied for every color.

As shown in FIG. 23, a switch SW1 selectively receiving the R correction parameters Kar, Kbr, Kcr, and kdr and the G correction parameters Kag, Kbg, Kcg, and Kdg is provided in the R/Gb channel correction sub-block 113A. The switch SW1 is switched in response to a timing signal H_TOGLE, which is one of the timing signals from the signal generator 43 and whose level is switched between "High"(1) and "Low" (0) every 1H. The R correction parameters Kar, Kbr, Kcr, and kdr and the G correction parameters Kag, Kbg, Kcg, and Kdg can be alternately supplied to the correction circuit 30 for every 1H to realize the correction of the color mixture in which the amount of correction is varied for every R pixel and for every G pixel.

Figure 24:
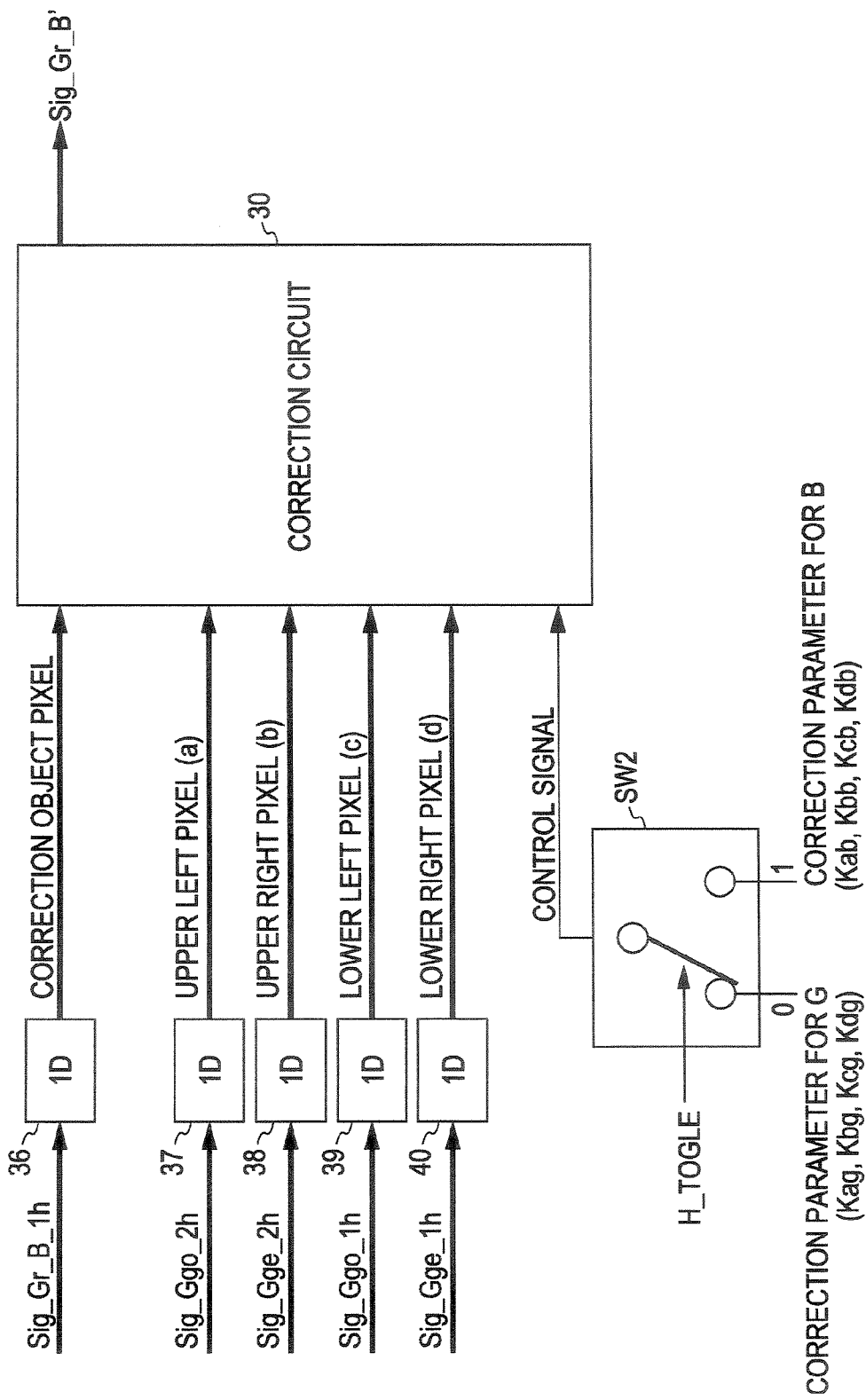
FIG. 24 is a block diagram showing an example of the configuration of the Gr/B channel correction sub-block when the amount of correction is varied for every color.

In contrast, as shown in FIG. 24, a switch SW2 selectively receiving the G correction parameters Kag, Kbg, Kcg, and kdg and the B correction parameters Kab, Kbb, Kcb, and Kdb is provided in the Gr/B channel correction sub-block 113B. The switch SW2 is switched in response to the timing signal H_TOGLE. The G correction parameters Kag, Kbg, Kcg, and kdg and the B correction parameters Kab, Kbb, Kcb, and Kdb can be alternately supplied to the correction circuit 30 for every 1H to realize the correction of the color mixture in which the amount of correction is varied for every G pixel and for every B pixel.

Second Embodiment

Figure 25:
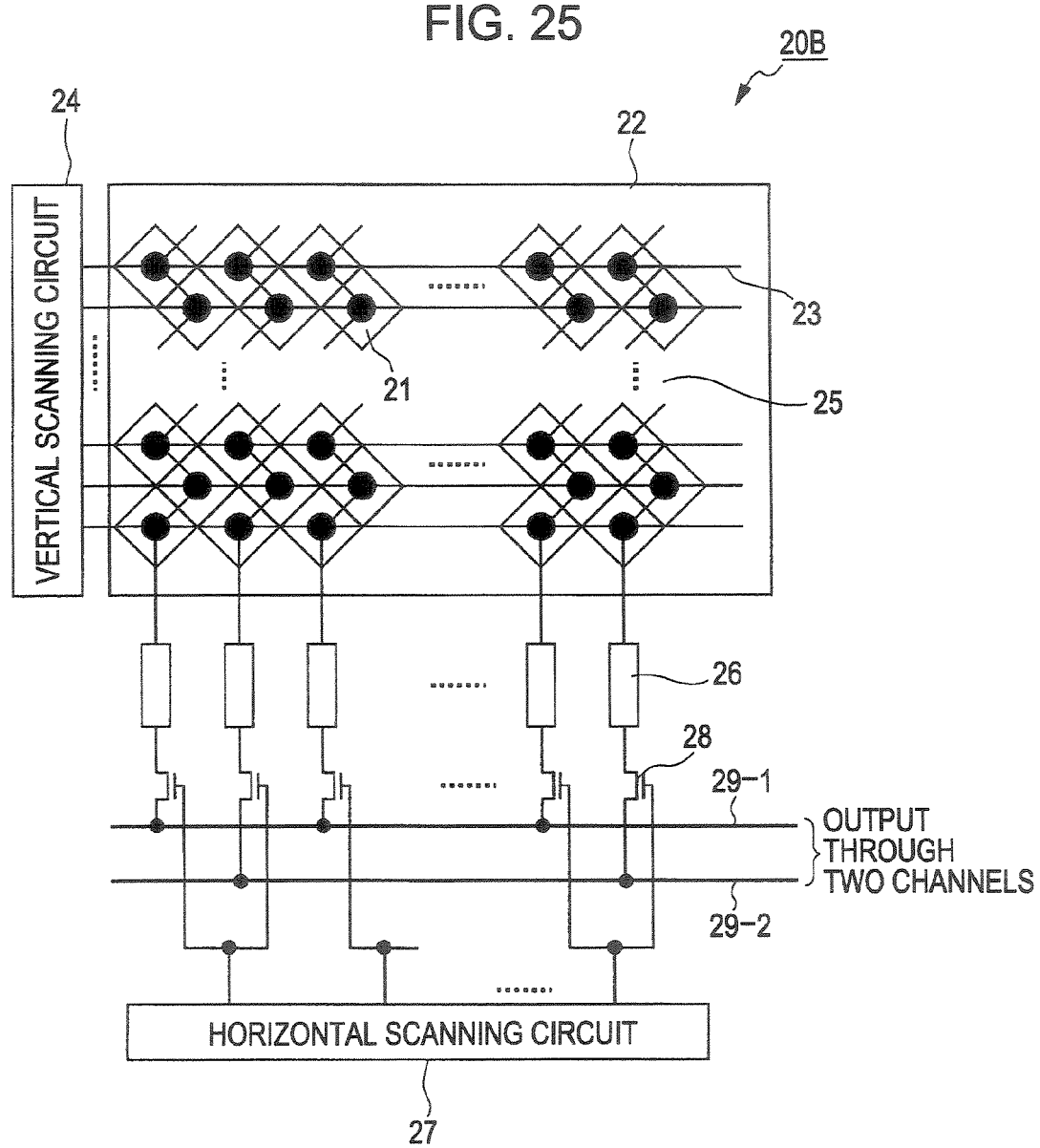
FIG. 25 is a block diagram showing an example of the structure of a CMOS image sensor according to a second embodiment of the present invention.

FIG. 25 is a block diagram schematically showing an example of the structure of a CMOS image sensor 20B according to a second embodiment of the present invention. The same reference numerals are used in FIG. 25 to identify the same components shown in FIG. 3.

The CMOS image sensor 20B according to the second embodiment has the same pixel arrangement and color coding as those of the CMOS image sensor 20A according to the first embodiment. Specifically, the CMOS image sensor 20B has the color coding, shown in FIG. 2, in which the G components surround the R and B components in the pixel shifted arrangement.

In the CMOS image sensor 20B, pixel drive lines 23 are wired for every row. The pixel cells 21 in a pixel array unit 22 are selected in units of rows by selection and scanning by a vertical scanning circuit 24 through the pixel drive line 23. Each vertical signal line 25 is commonly wired to the pixel cells 21 in a vertical zigzag column in units of two columns.

One column processing circuit 26 is connected to one end of each vertical signal line 25. In other words, the column processing circuits 26 are arranged for every two columns and hold the signals supplied from the pixel cells 21 through the vertical signal lines 25. The signals corresponding to one row, held in each column processing circuit 26, are sequentially output to two horizontal signal lines 29-1 and 29-2 in units of two pixels through horizontal selector switches 28 sequentially selected by a horizontal scanning circuit 27 in units of two switches.

As described above, in the CMOS image sensor 20B according to the second embodiment of the present invention, the signals in units of two neighboring pixels for every row are read out in parallel through the two horizontal signal lines 29-1 and 29-2 by using two channels and are horizontally scanned over one screen. After all the signals during one horizontal scanning period (1H) have been read out, the signals in the subsequent row are horizontally scanned to read out the signals from the pixels over one screen.

Figures 26, 27:
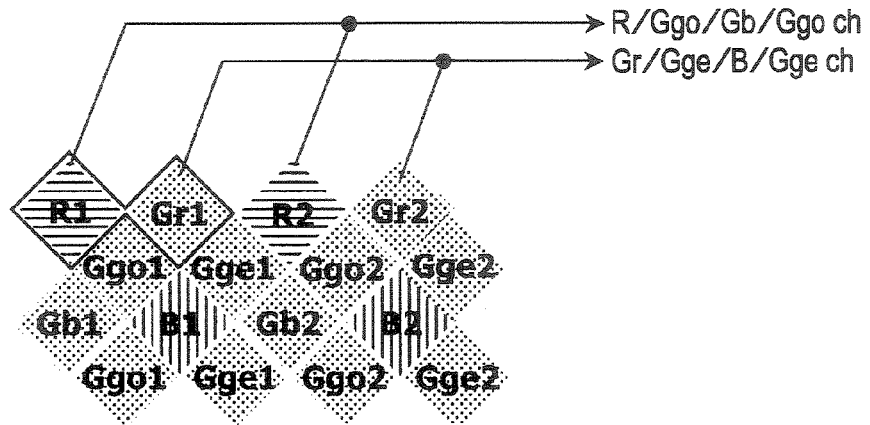
FIG. 26 is a diagram showing the definition of R, G, and B pixels according to the second embodiment of the present invention.
FIG. 27 shows a sequence of output signals through channels according to the second embodiment of the present invention.

For convenience, sixteen R, G, and B pixels in the first to eighth columns in the first to fourth rows in the color coding shown in FIG. 2 are defined as shown in FIG. 26, as in the first embodiment of the present invention.

Under the above definition, the signals in units of the two neighboring pixels for every row are read out in parallel through the two channels in one clock cycle of a clock signal, on which the operation of the CMOS image sensor 20B is based, to output an R/Ggo/Gb/Ggo signal and a Gr/Gge/B/Gge signal through the two channels, as shown in FIG. 26. FIG. 27 shows a sequence of the output signals through the channels in the above readout method.

Camera Signal Processing Circuit

Figure 28:
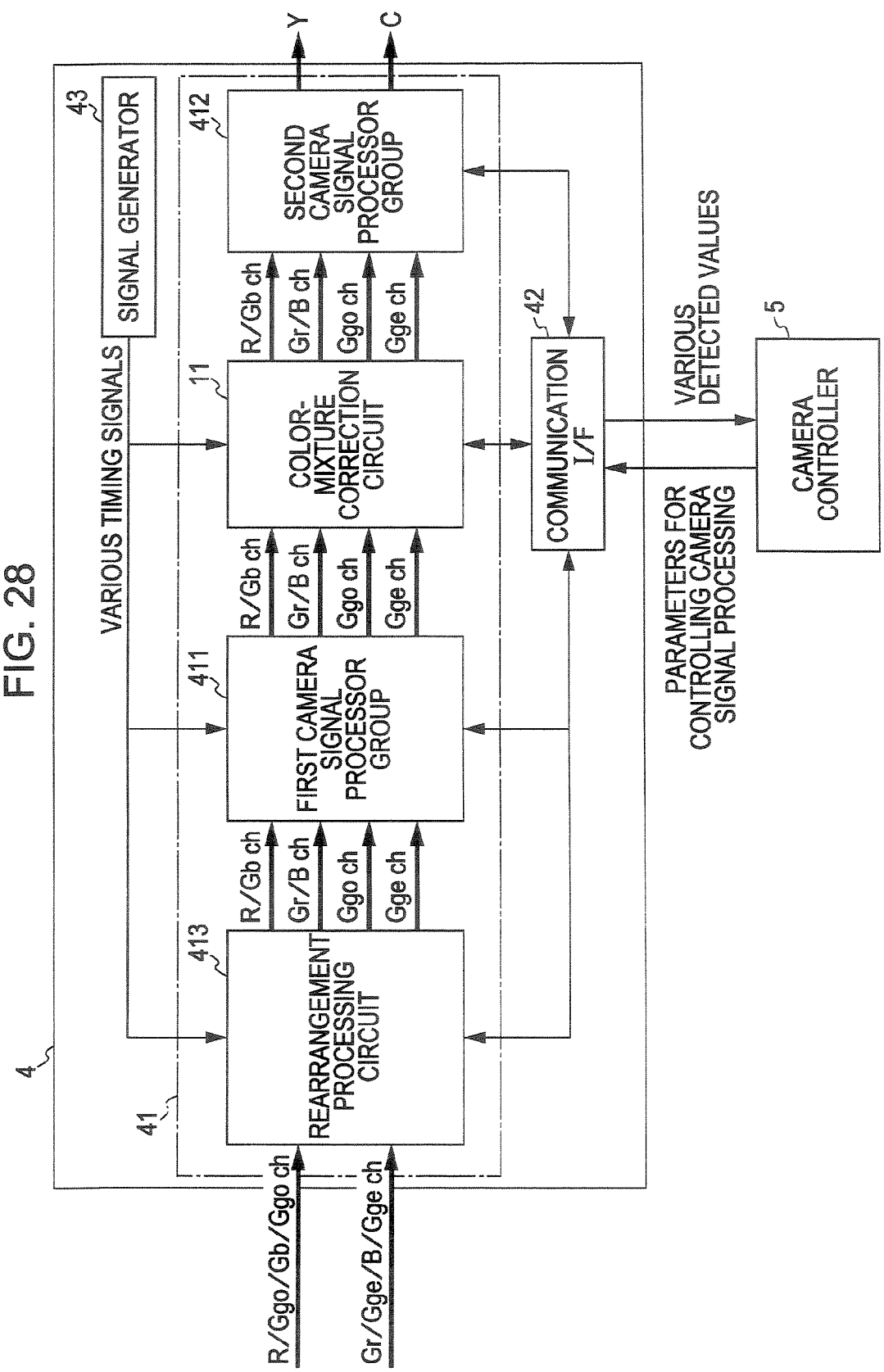
FIG. 28 is a block diagram showing an example of the internal configuration of a camera signal processing circuit according to the second embodiment of the present invention.

FIG. 28 is a block diagram showing an example of the internal configuration of a camera signal processing circuit 41 according to the second embodiment of the present invention. The same reference numerals are used in FIG. 28 to identify the same components shown in FIG. 7.

Referring to FIG. 28, the camera signal processing circuit 41 according to the second embodiment of the present invention includes a rearrangement processing circuit 413, in addition to a first camera signal processor group 411, a color-mixture correction circuit 11, and a second camera signal processor group 412. The rearrangement processing circuit 413 is provided upstream of the first camera signal processor group 411. The rearrangement processing circuit 413 is provided to rearrange the sequence of the output signals from the CMOS image sensor 20B, shown in FIG. 27, into the sequence of the output signals from the CMOS image sensor 20A, shown in FIG. 5.

Rearrangement Processing Circuit

Figure 29:
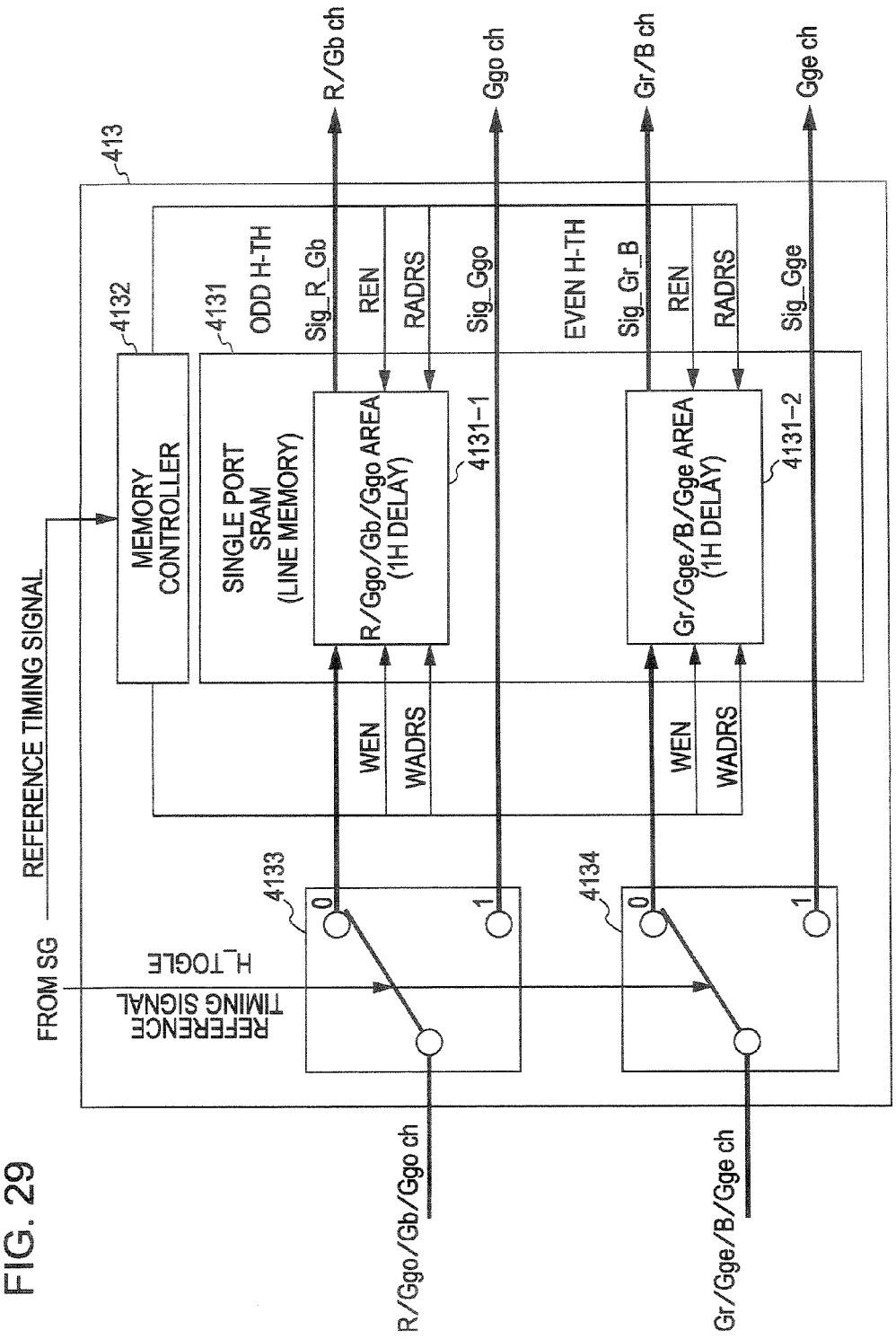
FIG. 29 is a block diagram showing an example of the configuration of a rearrangement processing circuit according to the second embodiment of the present invention.

FIG. 29 is a block diagram showing an example of the configuration of the rearrangement processing circuit 413. Referring to FIG. 29, the rearrangement processing circuit 413 includes a line memory group 4131, a memory controller 4132, switches 4133 and 4134.

The line memory group 4131 is provided for the R/Ggo/Gb/Ggo and Gr/Gge/B/Gge signals from the pixels through the two channels. The line memory group 4131 includes line memories 4131-1 and 4131-2 for causing delays in units of rows. The line memories 4131-1 and 4131-2 form, for example, a single port SRAM. The memory controller 4132 controls writing in and readout from the line memories 4131-1 and 4131-2 on the basis of various timing signals supplied from a signal generator 43 shown in FIG. 28.

The switch 4133 receives the R/Ggo/Gb/Ggo signal from the signal through one channel and performs the switching in response to a timing signal H_TOGLE, which is one of the timing signals from the signal generator 43 and whose level is switched between "High"(1) and "Low" (0) every 1H. The switch 4134 receives the Gr/Gge/B/Gge signal from the pixel through the other channel and performs the switching in response to the control signal H_TOGLE.

The signals input in the odd-numbered rows (the 4N+1-th row, 4N+3-th row, . . . in FIG. 27) are delayed by 1H by the line memories 4131-1 and 4131-2 and are output as R/Gb and Gr/B signals. In contrast, the signals input in the even-numbered rows (the 4N+2-th row, 4N+4-th row, . . . in FIG. 27) do not pass through the line memories 4131-2 and 4131-2 and are output as Ggo and Gge signals.

Owing to the effect of the rearrangement processing circuit 413 having the above configuration, the R/Ggo/Gb/Ggo and Gr/Gge/B/Gge signals from the pixels through the two channels are rearranged into the R/Gb, Ggo, Gr/B, and Gge signals through the four channels, shown in FIG. 30, and the rearranged R/Gb, Ggo, Gr/B, and Gge signals are output. Performing the rearrangement of the signals upstream of the first camera signal processor group 411 in the above manner allows the circuit blocks according to the first embodiment to be used as the first camera signal processor group 411, the color-mixture correction circuit 11, and the second camera signal processor group 412.

However, although the sequence after the rearrangement in the rearrangement processing circuit 413 is similar to that in the first embodiment, the signals after the rearrangement are transmitted every 1H. Accordingly, for example, a timing signal similar to the timing signal H_TOGLE may be applied to the circuit blocks including the first camera signal processor group 411, the color-mixture correction circuit 11, and the second camera signal processor group 412, and the circuit blocks may perform the processing only if the level of the timing signal is "High".

As described above, the CMOS image sensor 20B according to the second embodiment of the present invention has the color coding in which the G components surround the R and B components in the pixel shifted arrangement and performs the vertical scanning for every row, instead of for every horizontal zigzag row in units of two rows. In the correction of the color mixture according to the second embodiment of the present invention, the amount of correction of the color mixture from the neighboring pixels into the target pixel can be independently set for every neighboring pixel, so that advantages similar to those in the first embodiment can be achieved.

Also in the correction of the color mixture according to the second embodiment, the amount of correction may be varied for every color, as in the first embodiment.

Figure 31:
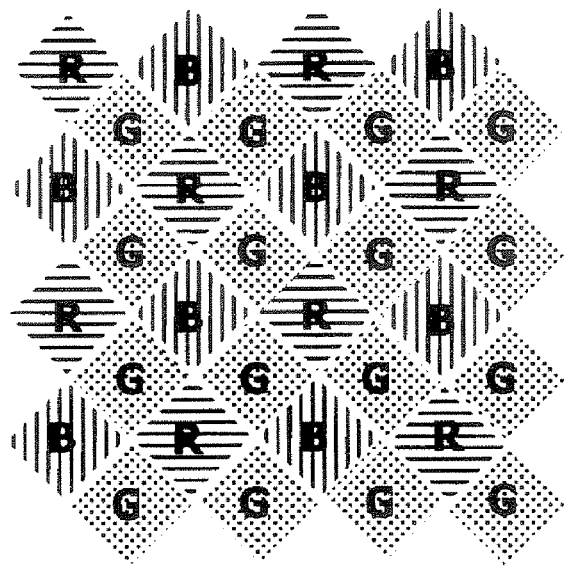
FIG. 31 shows another color coding in pixel shifted arrangement.

Although the correction of the color mixture in the solid-state imaging device having the color coding in which the G components surround the R and B components in the pixel shifted arrangement is exemplified in the first and second embodiments, this color coding is only an example. The present invention is applicable to the correction of the color mixture in a solid-state imaging device having another color coding, for example, the one shown in FIG. 31.

Third Embodiment

Figure 32:
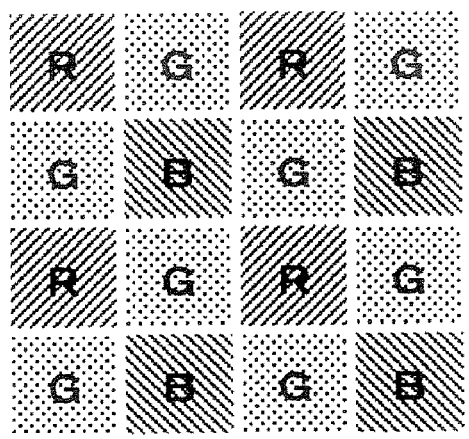
FIG. 32 shows an example of the color coding in a CMOS image sensor according to a third embodiment of the present invention.

FIG. 32 shows an example of the color coding in a CMOS image sensor according to a third embodiment of the present invention.

In the CMOS image sensor according to the third embodiment of the present invention, a pixel array unit in which pixel cells including the photoelectric transducers are two-dimensionally arranged in an array has pixel arrangement in a square lattice. The color coding in the pixel arrangement in a square lattice has, for example, a Bayer array shown in FIG. 32.

Figure 33:
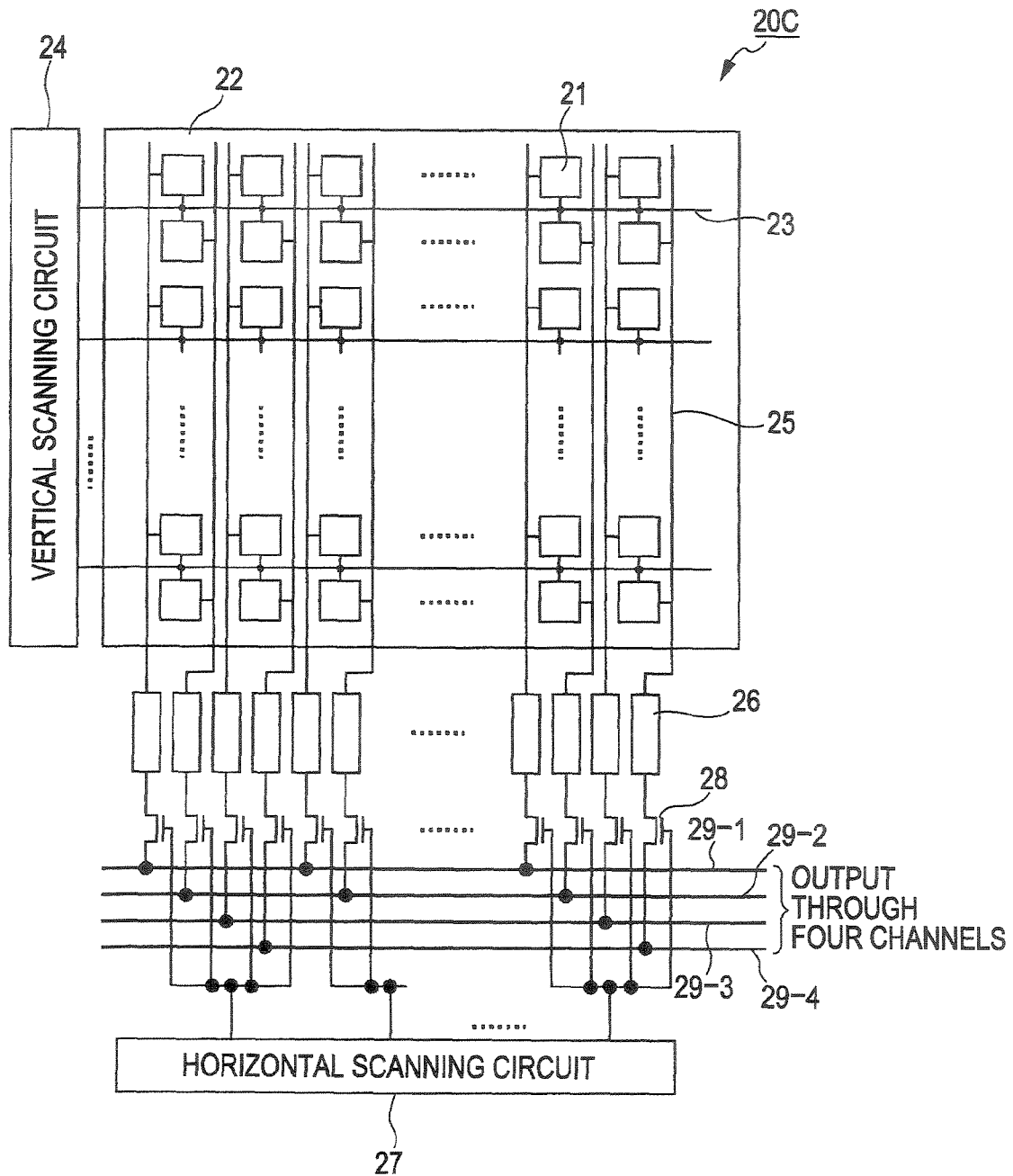
FIG. 33 is a block diagram schematically showing an example of the structure of the CMOS image sensor according to the third embodiment of the present invention.

FIG. 33 is a block diagram schematically showing an example of the configuration of a CMOS image sensor 20C according to the third embodiment of the present invention. The same reference numerals are used in FIG. 33 to identify the same components shown in FIG. 3.

Referring to FIG. 33, a pixel array unit 22 has pixel cells 21 including photoelectric transducers, two-dimensionally arranged in a square lattice. In the pixel arrangement in a square lattice, one pixel drive line 23 is wired for every two rows and two vertical signal lines 25 are wired for every column. A vertical scanning circuit 24 sequentially selects and scans the pixel cells 21 in the pixel array unit 22 in units of two rows through the pixel drive lines 23.

The signals from the pixel cells 21 corresponding to two rows, selected by the scanning by the vertical scanning circuit 24, are read out through the vertical signal lines 25 for odd-numbered rows and the vertical signal lines 25 for even-numbered rows, and are held in the corresponding column processing circuits 26. The signals corresponding to two rows, held in each column processing circuit 26, are sequentially output to four horizontal signal lines 29-1 to 29-4 in units of four pixels (two rows×two columns) through horizontal selector switches 28 sequentially selected by a horizontal scanning circuit 27 in units of four switches.

As described above, in the CMOS image sensor 20C according to the third embodiment of the present invention, the signals in units of four neighboring pixels for every two rows are read out in parallel through the four horizontal signal lines 29-1 to 29-4 by using four channels and are horizontally scanned over one screen. After all the signals during one horizontal scanning period (1H) have been read out, the signals in the subsequent row are horizontally scanned to read out the signals from the pixels over one screen.

Figures 34, 35:
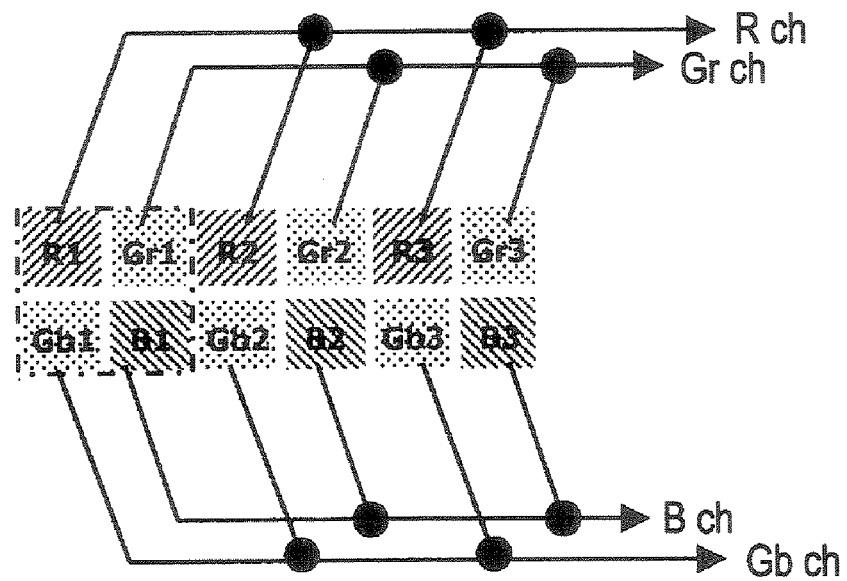
FIG. 34 is a diagram showing the definition of R, G, and B pixels according to the third embodiment of the present invention.
FIG. 35 shows a sequence of output signals through channels according to the third embodiment of the present invention.

For convenience, twelve R, G, and B pixels in the first to sixth columns in the first and second rows in the color coding shown in FIG. 32 are defined as shown in FIG. 34. Specifically, in the first row, the pixel R among the four pixels in the first unit is defined as a pixel R1; the pixel R among the four pixels in the second unit is defined as a pixel R2; and the pixel R among the four pixels in the third unit is defined as a pixel R3. In the second row, the pixel B among the four pixels in the first unit is defined as a pixel B1; the pixel B among the four pixels in the second unit is defined as a pixel B2; and the pixel B among the four pixels in the third unit is defined as a pixel B3.

In the first row, the pixel G among the four pixels in the first unit, adjacent to the pixel R1, is defined as a pixel Gr1; the pixel G among the four pixels in the second unit, adjacent to the pixel R2, is defined as a pixel Gr2; and the pixel G among the four pixels in the third unit, adjacent to the pixel R3, is defined as a pixel Gr3. In the second row, the pixel G among the four pixels in the first unit, adjacent to the pixel B1, is defined as a pixel Gb1; the pixel G among the four pixels in the second unit, adjacent to the pixel B2, is defined as a pixel Gb2; and the pixel G among the four pixels in the third unit, adjacent to the pixel B3, is defined as a pixel Gb3.

Under the above definition, the signals in units of the four neighboring pixels for every two rows are read out in parallel through the four channels in one clock cycle of a clock signal, on which the operation of the CMOS image sensor 20C is based, to output R, Gr, Gb, and B signals through the four channels, as shown in FIG. 34. FIG. 35 shows a sequence of the output signals through the channels in the above readout method.

The internal configuration of the camera signal processing circuit 41 according to the third embodiment is basically the same as that of the camera signal processing circuit 41 according to the first embodiment, shown in FIG. 7. Specifically, the camera signal processing circuit 41 includes a first camera signal processor group 411 and a second camera signal processor group 412, in addition to the color-mixture correction circuit 11. The first camera signal processor group 411 is provided upstream of the color-mixture correction circuit 11 and the second camera signal processor group 412 is provided downstream of the color-mixture correction circuit 11. The camera signal processing circuit 41 processes, in parallel, the R, Gr, Gb, and B signals for every four pixels, shown in FIG. 34, in one clock of the clock signal on which the camera signal processing is based.

Color-Mixture Correction Circuit

FIG. 36 is a block diagram showing an example of the configuration of a color-mixture correction circuit 11 according to the third embodiment of the present invention. The same reference numerals are used in FIG. 36 to identify the same components shown in FIG. 8.

As shown in FIG. 36, in the color-mixture correction circuit 11 according to the third embodiment, a line memory group 111 includes an R line memory 111-5, a Gr line memory 111-6, a Gb line memory 111-7, and a B line memory 111-8, instead of the R/Gb line memory 111-1, the Gr/B line memory 111-2, the Ggo line memory 111-3, the Gge line memory 111-4 in the color-mixture correction circuit 11 according to the first embodiment.

The line memories 111-5 and 111-6 are 1H line memories and the line memories 111-7 and 111-8 are 2H line memories. A memory controller 112 controls writing in and readout from the line memories 111-5, 111-6, 111-7, and 111-8 on the basis of the various timing signals supplied from the signal generator 43 shown in FIG. 7. A correction block 113 corrects the color mixture of the pixels in response to the control signal supplied through the communication I/F 42 shown in FIG. 7.

In the color-mixture correction circuit 11, the R, Gr, Gb, and B signals from the pixels through the four channels are input in the line memories 111-5, 111-6, 111-7, and 111-8 in parallel, respectively. A group of signals having 0H to 2H delays for every channel is generated and output in response to a writing enabling signal WEN, a writing address signal WADRS, a readout enabling signal REN, and a readout address signal RADRS, supplied from the memory controller 112.

The line memory group 111 is structured such that a no-delay signal (Sig_R_$0h$) and a 1H-delay signal (Sig_R_$1h$) are output through the R channel, a no-delay signal (Sig_Gr_$0h$) and a 1H-delay signal (Sig_Gr_$1h$) are output through the Gr channel, a 1H-delay signal (Sig_Gb_$1h$) and a 2H-delay signal (Sig_Gb_$2h$) are output through the Gb channel, and a 1H-delay signal (Sig_B_$1h$) and a 2H-delay signal (Sig_B_$2h$) are output through the B channel.

The group of the signals delayed by the line memories 111-5, 111-6, 111-7, and 111-8 is supplied to the correction block 113. The correction block 113 corrects the color mixture of the pixels in parallel for every channel in accordance with the control signal supplied through the communication I/F 42 and supplies Sig_R', Sig_Gr', Sig_Gb', and Sig_B' signals after the correction to the downstream blocks. The correction block 113 includes four correction sub-blocks provided for the R, Gr, Gb, and B signals from the pixels through the four channels.

R Channel Correction Sub-Block

FIG. 37 is a block diagram showing an example of the configuration of an R channel correction sub-block 113E. The R channel correction sub-block 113E includes a correction circuit 50 and five delay circuits 51 to 55. The 1H-delay signal Sig_R_$1h$, the 2H-delay signal Sig_Gb_$2h$, the 1H-delay signal Sig_Gr_$1h$, the 1H-delay signal Sig_Gr_$1h$, and the 1H-delay signal Sig_Gb_$1h$, among the total of eight signals output from the line memory group 111 in FIG. 36, the two signals being output for every channel, are input in the R channel correction sub-block 113E.

Figure 38A:
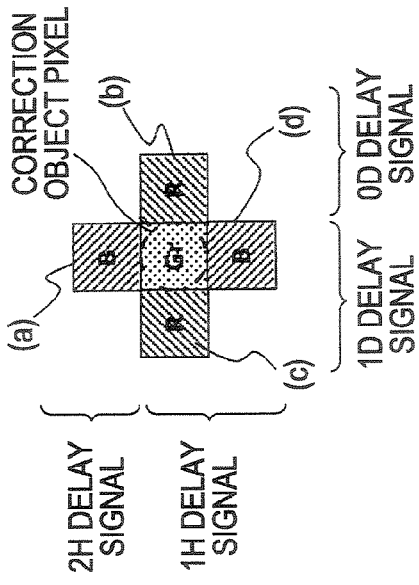
FIGS. 38A to 38D show the relationship between correction object pixel R/Gr/Gb/B and four neighboring pixel adjacent to the correction object pixel horizontally and vertically.

The correction circuit 50 is shared between the channels. The circuit configuration of the correction circuit 50 will be described in detail below. The delay circuit 51 delays the 1H-delay signal Sig_R_$1h$ by one clock cycle of the clock signal having a pixel period on which the correction of the color mixture is based and supplies the delayed signal to the correction circuit 50 as a signal from a correction object pixel. In the R channel correction sub-block 113E, the R pixel is the correction object pixel, as shown in FIG. 38A.

The delay circuit 52 delays the 2H-delay signal Sig_Gb_$2h$ by two clock cycles and supplies the delayed signal to the correction circuit 50 as a signal from an upper pixel (a) in contact with the correction object pixel R with a side. The delay circuit 53 delays the 1H-delay signal Sig_Gr_$1h$ by one clock cycle and supplies the delayed signal to the correction circuit 50 as a signal from a right pixel (b) in contact with the correction object pixel R with a side.

The delay circuit 54 delays the 1H-delay signal Sig_Gr_$1h$ by two clock cycles and supplies the delayed signal to the correction circuit 50 as a signal from a left pixel (c) in contact with the correction object pixel R with a side. The delay circuit 55 delays the 1H-delay signal Sig_Gb_$1h$ by one clock cycle and supplies the delayed signal to the correction circuit 50 as a signal from a lower pixel (d) in contact with the correction object pixel R with a side.

As described above, when the 1H-delay signal Sig_R_$1h$, the 2H-delay signal Sig_Gb_$2h$, the 1H-delay signal Sig_Gr_$1h$, the 1H-delay signal Sig_Gr_$1h$, and the 1H-delay signal Sig_Gb_$1h$ pass through the delay circuits 51 to 55 to cause the signal from the correction object pixel R to be a signal having a 1H delay plus one clock cycle delay, the signals from the four neighboring pixels in contact with the correction object pixel R with sides: that is, the upper, right, left, and lower pixels with respect to the correction object pixel R are extracted and the extracted signals are supplied to the correction circuit 50 along with the signal from the correction object pixel R.

Gr Channel Correction Sub-Block

FIG. 39 is a block diagram showing an example of the configuration of a Gr channel correction sub-block 113F. The Gr channel correction sub-block 113F includes four delay circuits 56 to 59, in addition to the correction circuit 50 as in the correction block 113E. The 1H-delay signal Sig_Gr_1$h$, the 2H-delay signal Sig_B_2$h$, the 1H-delay signal Sig_R_1$h$, the 1H-delay signal Sig_R_1$h$, and the 1H-delay signal Sig_B_1$h$, among the total of eight signals output from the line memory group 111 in FIG. 36, the two signals being output for every channel, are input in the Gr channel correction sub-block 113F.

Figure 38B:
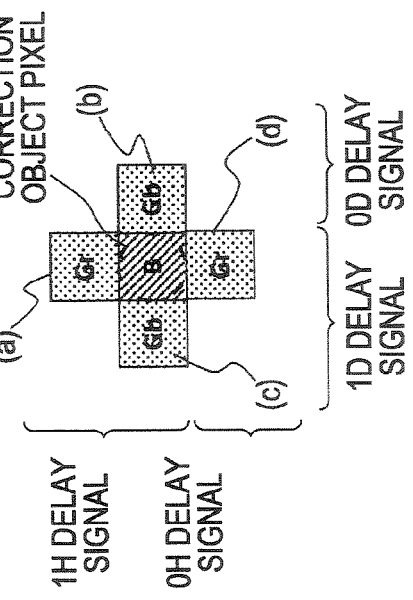

The delay circuit 56 delays the 1H-delay signal Sig_Gr_1$h$ by one clock cycle and supplies the delayed signal to the correction circuit 50 as a signal from a correction object pixel. In the Gr channel correction sub-block 113F, the Gr pixel is the correction object pixel, as shown in FIG. 38B. The delay circuit 57 delays the 2H-delay signal Sig_B_2$h$ by two clock cycles and supplies the delayed signal to the correction circuit 50 as a signal from an upper pixel (a) in contact with the correction object pixel Gr with a side.

The 1H delay signal Sig_R_1$h$ is directly supplied to the correction circuit 50 as a signal from a right pixel (b) in contact with the correction object pixel Gr with a side. The delay circuit 58 delays the 1H-delay signal Sig_R_1$h$ by one clock cycle and supplies the delayed signal to the correction circuit 50 as a signal from a left pixel (c) in contact with the correction object pixel Gr with a side. The delay circuit 59 delays the 1H-delay signal Sig_B_1$h$ by one clock cycle and supplies the delayed signal to the correction circuit 50 as a signal from a lower pixel (d) in contact with the correction object pixel Gr with a side.

As described above, when the 1H-delay signal Sig_Gr_1$h$, the 2H-delay signal Sig_B_2$h$, the 1H-delay signal Sig_R_1$h$, the 1H-delay signal Sig_R_1$h$, and the 1H-delay signal Sig_B_1$h$ pass through the delay circuits 56 to 59 to cause the signal from the correction object pixel Gr to be a signal having a 1H delay plus one clock cycle delay, the signals from the four neighboring pixels in contact with the correction object pixel Gr with sides: that is, the upper, right, left, and lower pixels with respect to the correction object pixel Gr are extracted and the extracted signals are supplied to the correction circuit 50 along with the signal from the correction object pixel Gr.

Gb Channel Correction Sub-Block

Figure 40:
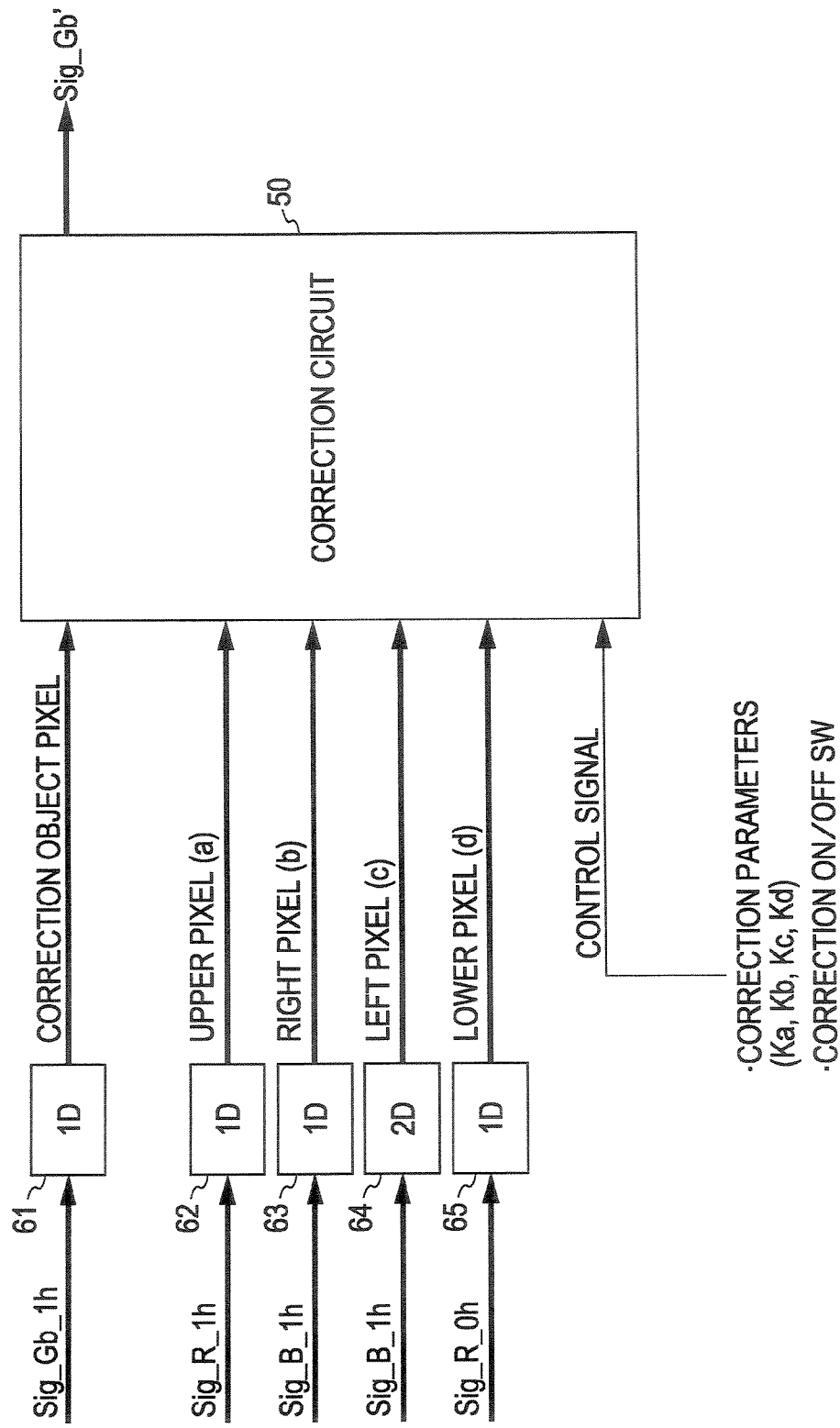
FIG. 40 is a block diagram showing an example of the configuration of a Gb channel correction sub-block.

FIG. 40 is a block diagram showing an example of the configuration of a Gb channel correction sub-block 113G. The Gb channel correction sub-block 113G includes five delay circuits 61 to 65, in addition to the correction circuit 50 as in the correction block 113E. The 1H-delay signal Sig_Gb_1$h$, the 1H-delay signal Sig_R_1$h$, the 1H-delay signal Sig_B_1$h$, the 1H-delay signal Sig_B_1$h$, and the non-delay signal Sig_R_0$h$, among the total of eight signals output from the line memory group 111 in FIG. 36, the two signals being output for every channel, are input in the Gb channel correction sub-block 113G.

Figure 38C:
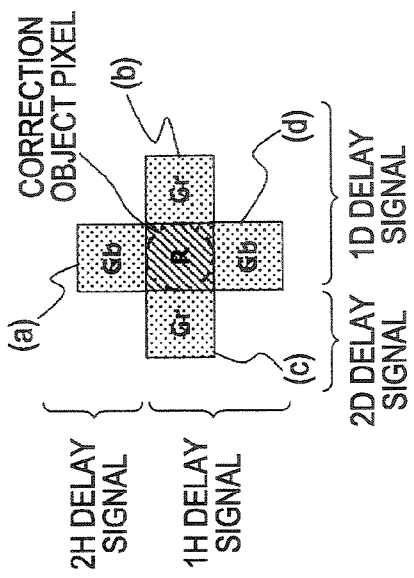

The delay circuit 61 delays the 1H-delay signal Sig_Gb_1$h$ by one clock cycle and supplies the delayed signal to the correction circuit 50 as a signal from a correction object pixel. In the Gb channel correction sub-block 113G, the Gb pixel is the correction object pixel, as shown in FIG. 38C.

The delay circuit 62 delays the 1H-delay signal Sig_R_1$h$ by one clock cycle and supplies the delayed signal to the correction circuit 50 as a signal from an upper pixel (a) in contact with the correction object pixel Gb with a side. The delay circuit 63 delays the 1H-delay signal Sig_B_1$h$ by one clock cycle and supplies the delayed signal to the correction circuit 50 as a signal from a right pixel (b) in contact with the correction object pixel Gb with a side.

The delay circuit 64 delays the 1H-delay signal Sig_B_1$h$ by two clock cycles and supplies the delayed signal to the correction circuit 50 as a signal from a left pixel (c) in contact with the correction object pixel Gb with a side. The delay circuit 65 delays the 1H-delay signal Sig_R_1$h$ by one clock cycle and supplies the delayed signal to the correction circuit 50 as a signal from a lower pixel (d) in contact with the correction object pixel Gb with a side.

As described above, when the 1H-delay signal Sig_Gb_1$h$, the 1H-delay signal Sig_R_1$h$, the 1H-delay signal Sig_B_1$h$, the 1H-delay signal Sig_B_1$h$, and the non-delay signal Sig_R_0$h$ pass through the delay circuits 61 to 65 to cause the signal from the correction object pixel Gb to be a signal having a 1H delay plus one clock cycle delay, the signals from the four neighboring pixels in contact with the correction object pixel Gb with sides: that is, the upper, right, left, and lower pixels with respect to the correction object pixel Gb are extracted and the extracted signals are supplied to the correction circuit 50 along with the signal from the correction object pixel Gb.

B Channel Correction Sub-Block

Figure 41:
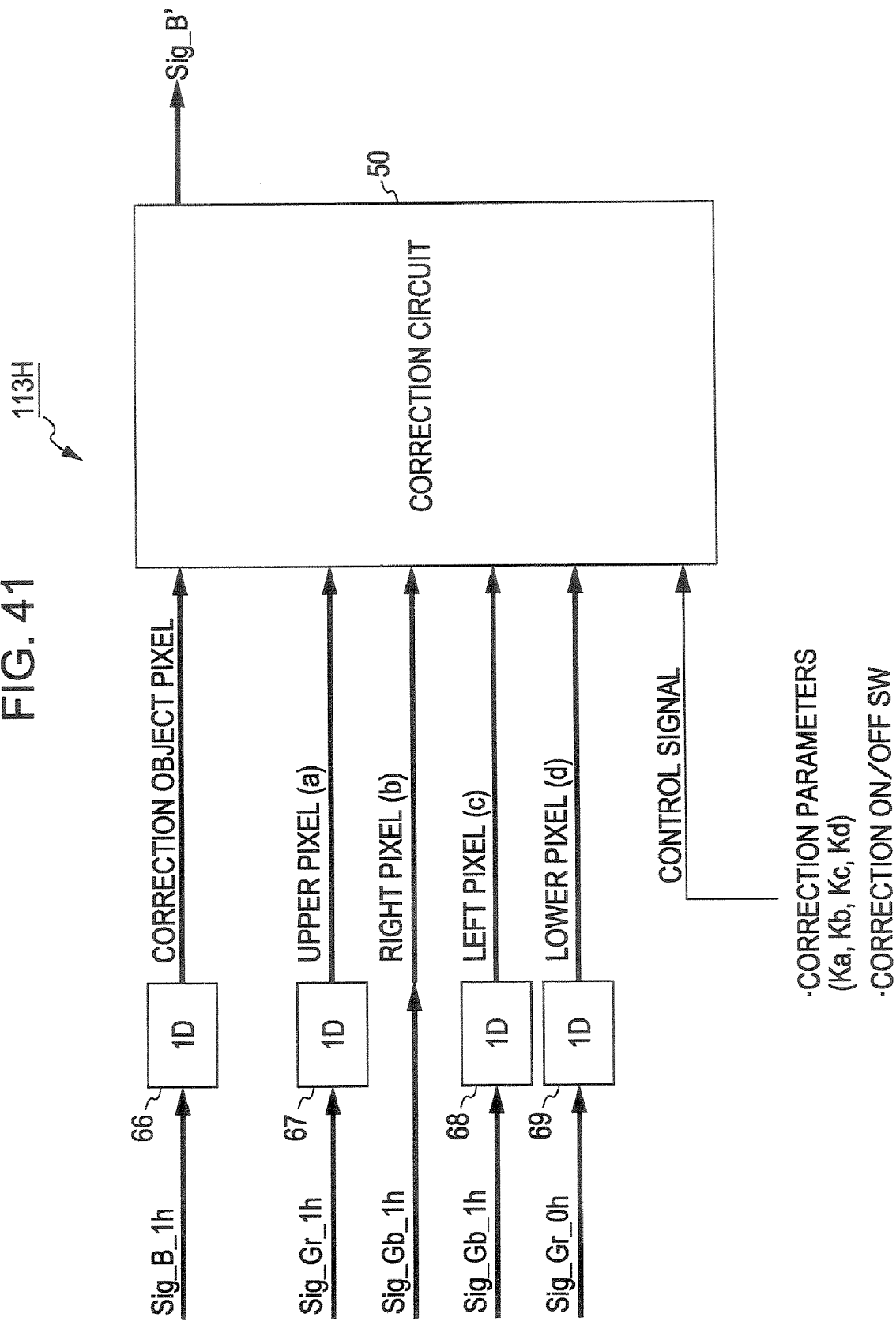
FIG. 41 is a block diagram showing an example of the configuration of a B channel correction sub-block.

FIG. 41 is a block diagram showing an example of the configuration of a B channel correction sub-block 113H. The B channel correction sub-block 113H includes four delay circuits 66 to 69, in addition to the correction circuit 50 as in the correction block 113E. The 1H-delay signal Sig_B_1$h$, the 1H-delay signal Sig_Gr_1$h$, the 1H-delay signal Sig_Gb_1$h$, the 1H-delay signal Sig_Gb_1$h$, and the 0H-delay signal Sig_Gb_0$h$, among the total of eight signals output from the line memory group 111 in FIG. 36, the two signals being output for every channel, are input in the B channel correction sub-block 113H.

Figure 38D:
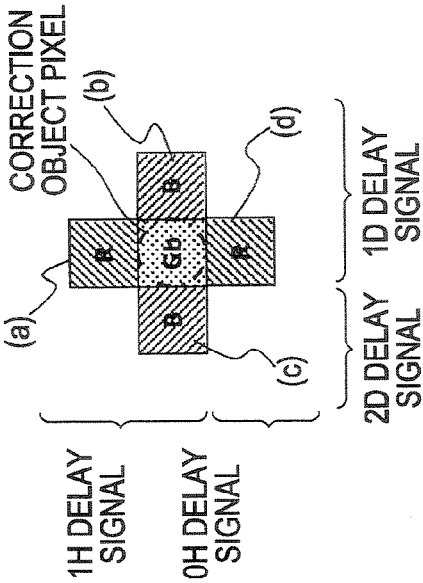

The delay circuit 66 delays the 1H-delay signal Sig_B_1$h$ by one clock cycle and supplies the delayed signal to the correction circuit 50 as a signal from a correction object pixel. In the B channel correction sub-block 113H, the B pixel is the correction object pixel, as shown in FIG. 38D. The delay circuit 67 delays the 1H-delay signal Sig_Gr_1$h$ by one clock cycle and supplies the delayed signal to the correction circuit 50 as a signal from an upper pixel (a) in contact with the correction object pixel B with a side.

The 1H delay signal Sig_Gb_1$h$ is directly supplied to the correction circuit 50 as a signal from a right pixel (b) in contact with the correction object pixel B with a side. The delay circuit 68 delays the 1H-delay signal Sig_Gb_1$h$ by one clock cycle and supplies the delayed signal to the correction circuit 50 as a signal from a left pixel (c) in contact with the correction object pixel B with a side. The delay circuit 69 delays the non-delay signal Sig_Gr_0$h$ by one clock cycle and supplies the delayed signal to the correction circuit 50 as a signal from a lower pixel (d) in contact with the correction object pixel B with a side.

As described above, when the 1H-delay signal Sig_B_1$h$, the 1H-delay signal Sig_Gr_1$h$, the 1H-delay signal Sig_Gb_1$h$, the 1H-delay signal Sig_Gb_1$h$, and the 0H-delay signal Sig_Gb_0$h$ pass through the delay circuits 66 to 69 to cause the signal from the correction object pixel B to be a signal having a 1H delay plus one clock cycle delay, the signals from the four neighboring pixels in contact with the correction object pixel B with sides: that is, the upper, right, left, and lower pixels with respect to the correction object pixel B are extracted and the extracted signals are supplied to the correction circuit 50 along with the signal from the correction object pixel B.

Correction Circuit

The configuration of the correction circuit 50 common to the channels will now be described in first to third examples.

First Example

Figure 42:
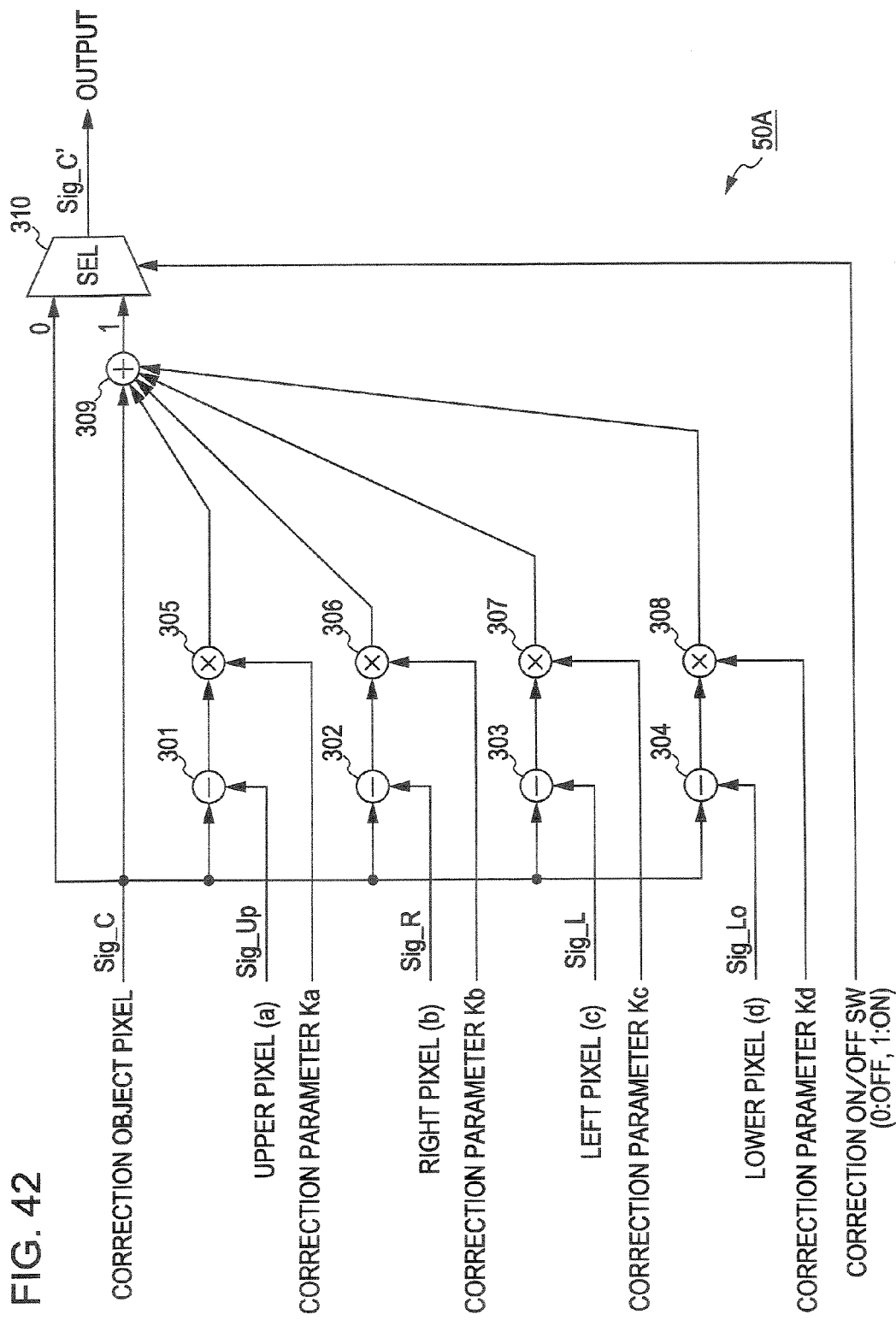
FIG. 42 is a block diagram showing an example of the configuration of a correction circuit in a first example according to the third embodiment of the present invention.

FIG. 42 is a block diagram showing an example of the configuration of a correction circuit 50A in a first example. The correction circuit 50A has the same circuit configuration as the correction circuit 30A shown in FIG. 17 except for the input signals.

Specifically, the correction circuit 50A calculates differences between the signal Sig_C (Sig_R /Sig_Gr/Sig_Gb/Sig_B) from the correction object pixel and the signals (upper: Sigup, right pixel: Sig_R, left pixel: Sig_L, and lower pixel: Sig_Lo) from the pixels adjacent to the correction object pixel horizontally and vertically. The correction circuit 50A, then, multiplies the differences by independent correction parameters Ka, Kb, Kc, and Kd and adds the results of the multiplication to calculate a correction signal Sig_C' (Sig_R'/Sig_Gr'/Sig_Gb'/Sig_B').

"Ka" denotes the color mixture (correction) ratio between the correction object pixel and the upper pixel; "Kb" denotes the color mixture (correction) ratio between the correction object pixel and the right pixel; "Kc" denotes the color mixture (correction) ratio between the correction object pixel and the left pixel; "Kd'" denotes the color mixture (correction) ratio between the correction object pixel and the lower pixel.

This calculation process in the correction circuit 50A can be represented by the following equation:

$$Sig\_C' = Sig\_C + \quad (6)$$
$$Ka \times (Sig\_C - Sig\_Up) +$$
$$Kb \times (Sig\_C - Sig\_R) +$$
$$Kc \times (Sig\_C - Sig\_L) +$$
$$Kd \times (Sig\_C - Sig\_Lo)$$

Figure 43:
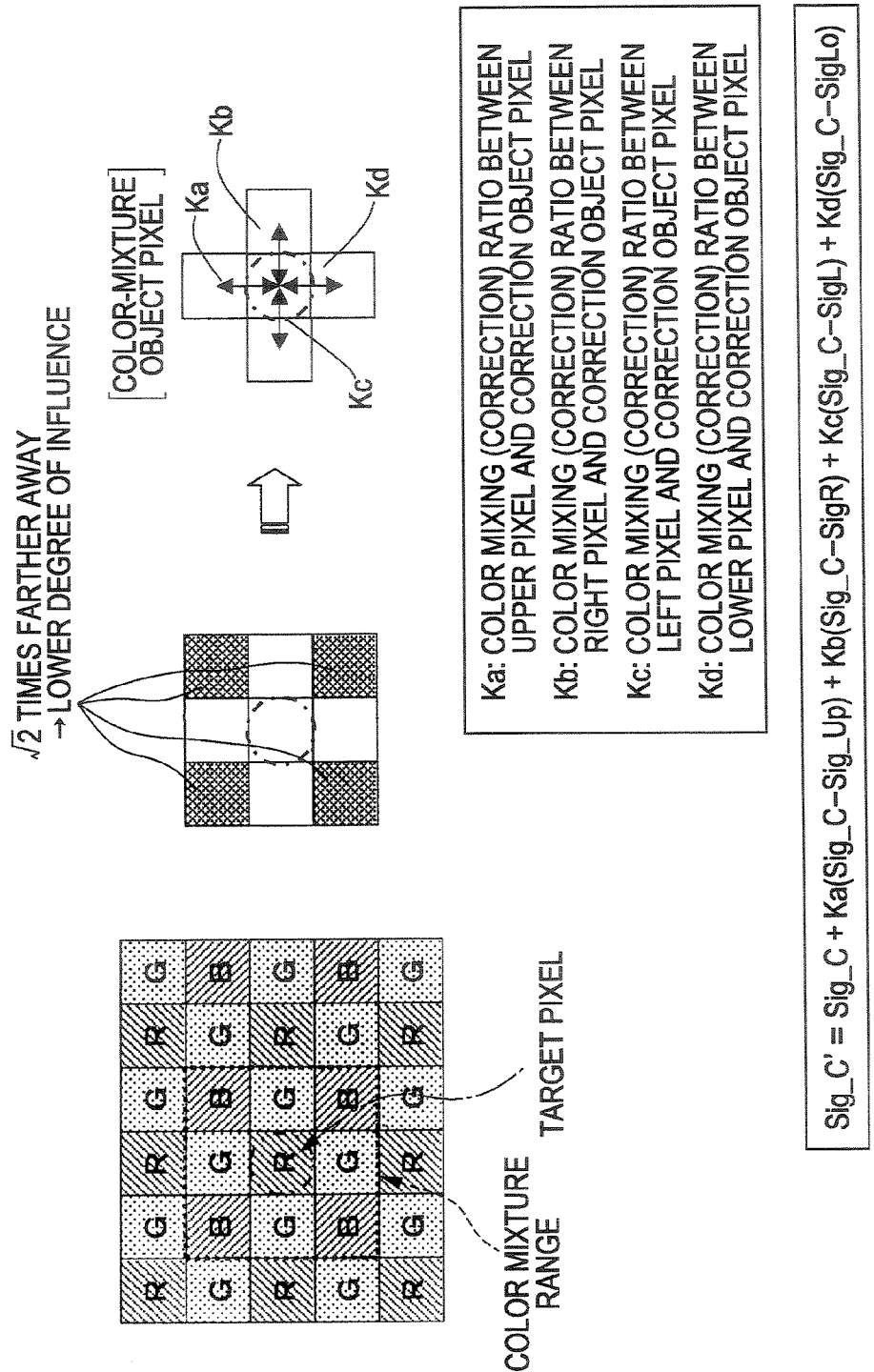
FIG. 43 illustrates a correction model equation of the correction circuit in the first example according to the third embodiment of the present invention.

FIG. 43 illustrates the correction model equation shown in (6). Among the neighboring eight pixels around the correction object pixel, the upper left pixel, the upper right pixel, the lower left pixel, and the lower right pixel with respect to the correction object pixel are √2 times farther away from the correction object pixel than upper, lower, left, and right pixels the with respect to the correction object pixel. Accordingly, the upper, right pixel, left, and lower pixels with respect to the correction object pixel have a more dominant influence of the color mixture on the correction object pixel, compared with the upper left pixel, the upper right pixel, the lower left pixel, and the lower right pixel with respect to the correction object pixel. Consequently, it is assumed in this example that the color mixture between the correction object pixel and the upper left pixel, the upper right pixel, the lower left pixel, and the lower right pixel can be negligible, and the upper left pixel, the upper right pixel, the lower left pixel, and the lower right pixel are excluded from the description.

Second Example

Figure 44:
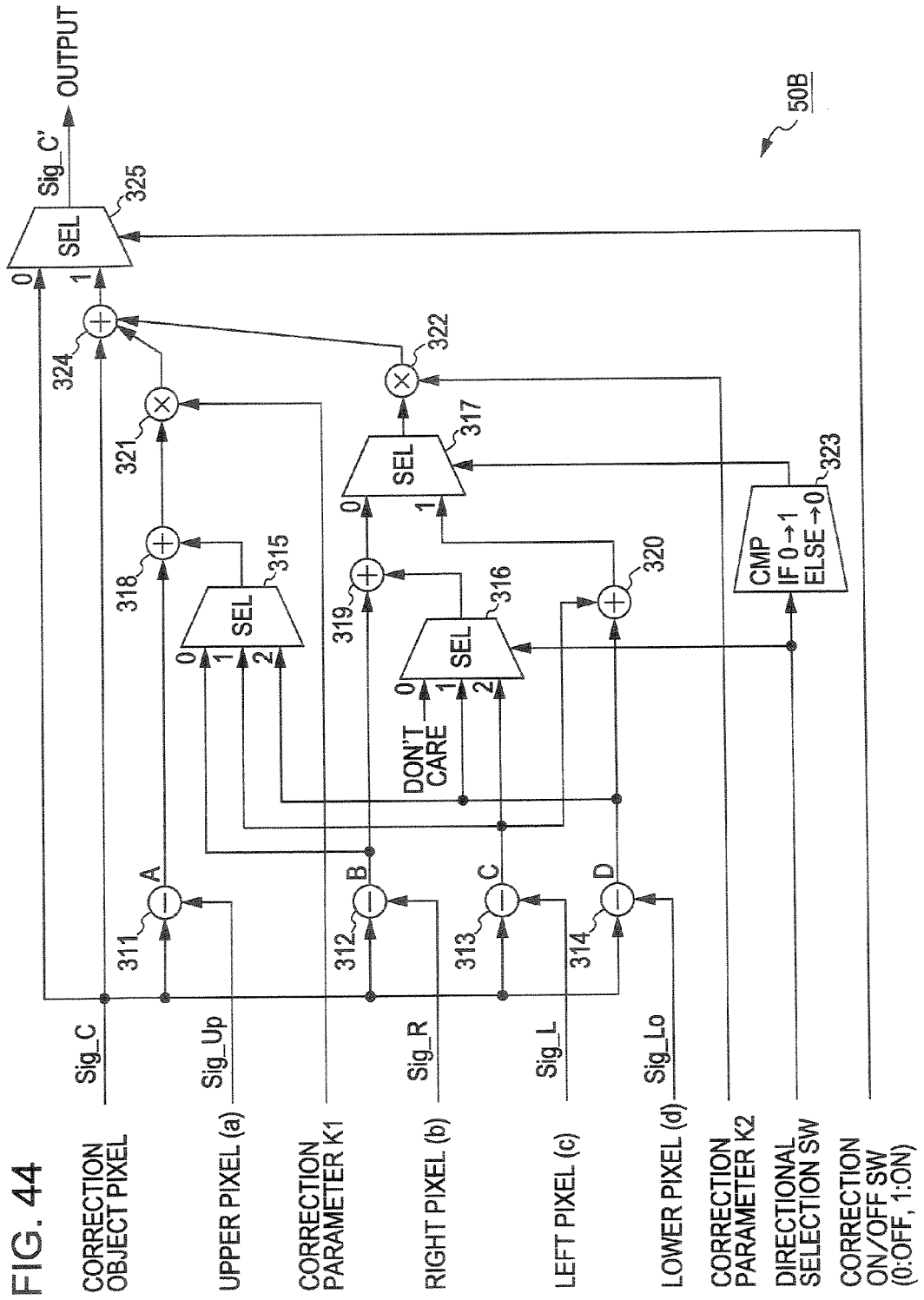
FIG. 44 is a block diagram showing an example of the configuration of a correction circuit in a second example according to the third embodiment of the present invention.

FIG. 44 is a block diagram showing an example of the configuration of a correction circuit 50B in a second example. The correction circuit 50B has the same circuit configuration as the correction circuit 30B shown in FIG. 19 except for the input signals.

Specifically, the correction circuit 50B calculates differences between the signal Sig_C (Sig_R/Sig_Gr/Sig_Gb/Sig_B) from the correction object pixel and the signals (upper pixel: Sig_Up, right pixel: Sig_R, left pixel: Sig_L, and lower pixel: Sig_Lo) from the pixels adjacent to the correction object pixel horizontally and vertically. The correction circuit 50B, then, adds any pair of the differences in accordance with a directional selection control signal (value) supplied through the communication I/F 42. The correction circuit 30B multiplies the addition results by independent correction parameters K1 and K2 and adds the results of the multiplication to calculate a correction signal Sig_C' (Sig_R'/Sig_Gr'/Sig_Gb'/Sig_B').

This calculation process in the correction circuit 50B can be represented by the following equations:

If the directional selection control signal has a value "0", $$Sig\_C' = Sig\_C + \quad (7)$$
$$K1 \times [(Sig\_C - Sig\_Up) + (Sig\_C - Sig\_R)] +$$
$$K2 \times [(Sig\_C - Sig\_L) + (Sig\_C - Sig\_Lo)]$$

If the directional selection control signal has a value "1", $$Sig\_C' = Sig\_C + \quad (8)$$
$$K1 \times [(Sig\_C - Sig\_Up) + (Sig\_C - Sig\_L)] +$$
$$K2 \times [(Sig\_C - Sig\_R) + (Sig\_C - Sig\_Lo)]$$

If the directional selection control signal has a value "2", $$Sig\_C' = Sig\_C + \quad (9)$$
$$K1 \times [(Sig\_C - Sig\_Up) + (Sig\_C - Sig\_Lo)] +$$
$$K2 \times [(Sig\_C - Sig\_R) + (Sig\_C - Sig\_L)]$$

FIG. 45 illustrates the correction model equations shown in (7), (8), and (9). The concept of the correction model equations is the same as in the correction model equation in FIG. 43. FIG. 45 shows combination of the color mixture ratios and the correction model equations depending on the value (0, 1, or 2) of the directional selection control signal.

Third Example

Figure 46:
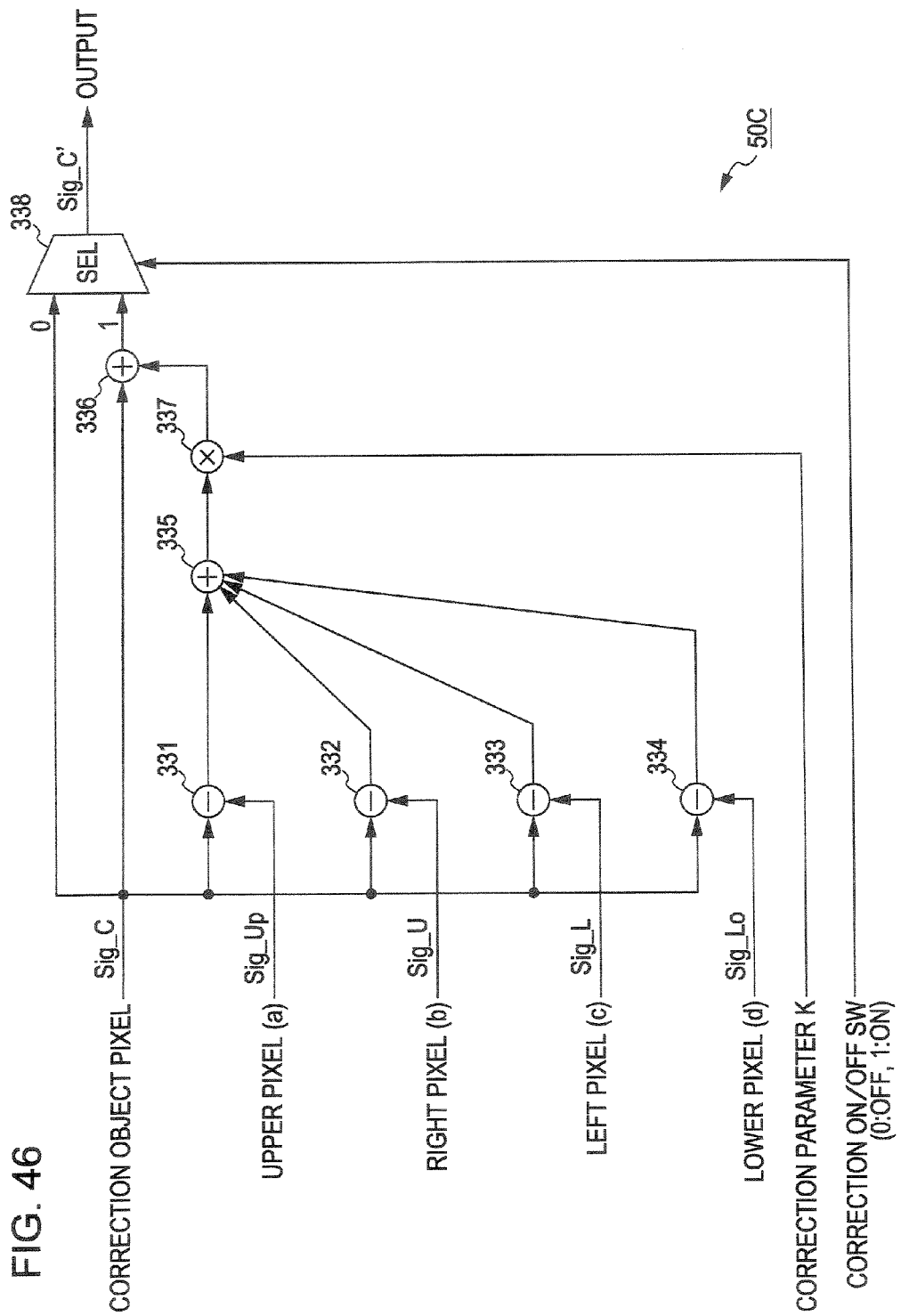
FIG. 46 is a block diagram showing an example of the configuration of a correction circuit in a third example according to the third embodiment of the present invention.

FIG. 46 is a block diagram showing an example of the configuration of a correction circuit 50C in a third example. The correction circuit 50C has the same circuit configuration as the correction circuit 30C shown in FIG. 21 except for the input signals.

Specifically, the correction circuit 50C calculates differences between the signal Sig_C (Sig_R/Sig_Gr/Sig_Gb/Sig_B) from the correction object pixel and the signals (upper pixel: Sig_Up, right pixel: Sig_R, left pixel: Sig_L, and lower pixel: Sig_Lo) from the pixels adjacent to the correction object pixel horizontally and vertically and adds all the differences. The correction circuit 50C, then, multiplies the addition result by a correction parameter K and adds the multiplication result to the original signal Sig_C to calculate a correction signal Sig_C' (Sig_R'/Sig_Gr'/Sig_Gb'/Sig_B').

This calculation process in the correction circuit 50C can be represented by the following equation:

$$\text{Sig\_C}' = \text{Sig\_C} + \\ K \times [(\text{Sig\_C} - \text{Sig\_Up}) + (\text{Sig\_C} - \text{Sig\_R}) + \\ (\text{Sig\_C} - \text{Sig\_L}) + (\text{Sig\_C} - \text{Sig\_Lo})] \quad (10)$$

Figure 47:
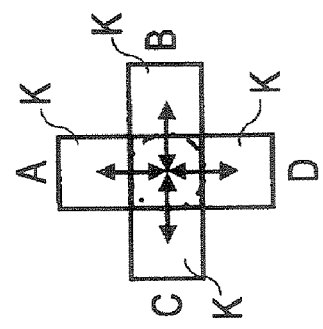
FIG. 47 illustrates a correction model equation of the correction circuit in the third example according to the third embodiment of the present invention.

FIG. 47 illustrates the correction model equation shown in (10). The concept of the correction model equation is the same as in the correction model equation in FIG. 43.

The correction circuits 50A, 50B, and 50C in the first to third examples according to the third embodiment of the present invention have advantages similar to those of the correction circuits 30A, 30B, and 30C in the first to third examples according to the first embodiment of the present invention.

Although the correction model equation (6) is used in the correction circuit 50A in the first example, the correction model equations (7) to (9) are used in the correction circuit 50B in the second example, and the correction model equation (10) is used in the correction circuit 50C in the third example, the correction circuits 50A, 50B, and 50C are not limited to the circuit configurations realizing the calculations in (6) to (10) because the present invention is not focused on the model equation itself.

In the correction of the color mixture according to the third embodiment, the pixel arrangement is in a square lattice, the color coding has, for example, a Bayer array, and the amount of correction of the color mixture from the neighboring pixels into the target pixel can be independently set for every neighboring pixel in the CMOS image sensor 20C performing the vertical scanning in units of two rows, so that advantages similar to those in the first embodiment can be achieved. Also in the correction of the color mixture according to the third embodiment, the amount of correction may be varied for every color, as in the first embodiment.

Although the color coding has a Bayer array in the pixel arrangement in a square lattice in the third embodiment of the present invention, the present invention is not limited to the application to the Bayer array. The present invention is applicable to any color coding in a square lattice.

Fourth Embodiment

The correction of the color mixture in the case where the physical center of each pixel cell does not necessarily coincide with the optical center thereof to vary the color mixture ratio (degree) from the neighboring pixels into the target pixel is described in the first to third embodiments described above. However, it is known that the color mixture ratio is varied with the f-number (focal ratio) of the lens 1a in the optical system 1 (refer to FIG. 1). The correction of the color mixture in a fourth embodiment of the present invention is based on the f-number.

Figure 48A:
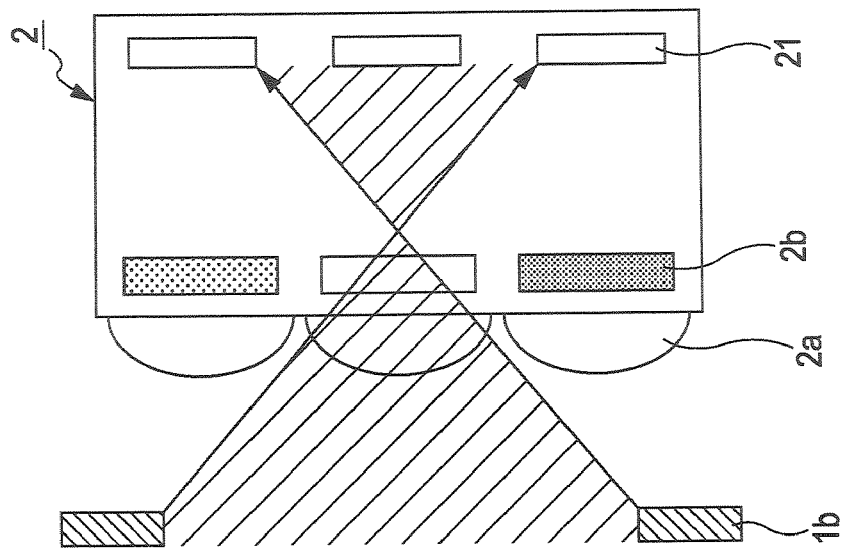
FIGS. 48A and 48B are conceptual diagrams showing the relationship between the aperture diameter of an aperture and the color mixture in a CMOS image sensor according to a fourth embodiment of the present invention.
Figure 48B:
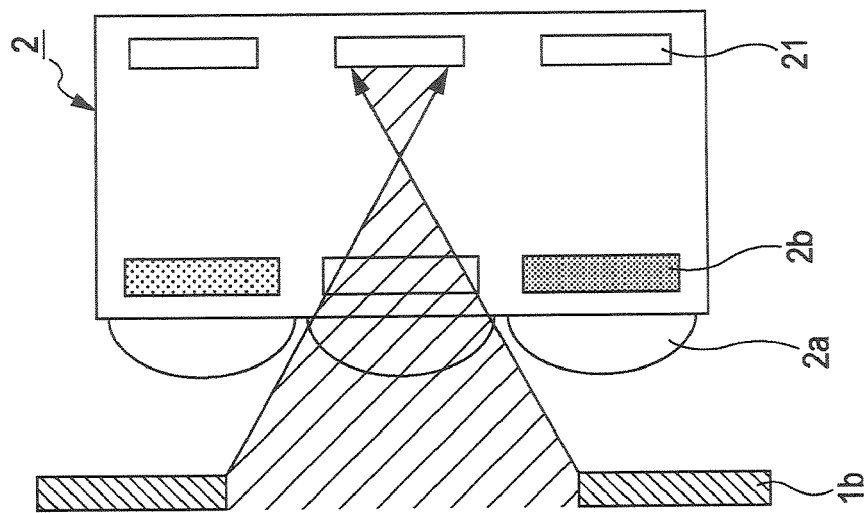

FIGS. 48A and 48B are conceptual diagrams showing the relationship between the aperture diameter (focal ratio/f-number) of the aperture 1b and the color mixture in the CMOS image sensor 2.

The aperture diameter of the aperture 1b is varied in accordance with the status of a subject or an instruction from a user in order to adjust the light intensity. Light through the aperture 1b passes through a condenser lens 2a on the CMOS image sensor 2 and a color filter 2b for discriminating the color of the subject and is received by a pixel cell 21. The color filter 2b generally has three colors of R, G, and B and has the color coding used in the first, second, or third embodiment of the present invention.

If the aperture diameter of the aperture 1b is small, that is, the f-number is large (FIG. 48A), light condensed on a pixel cell 21 passes through only the color filter corresponding to the pixel. However, if the aperture diameter of the aperture 1b is increased, that is, the f-number is decreased (FIG. 48B), light through color filters that do not correspond to the pixel is filtered into the pixel cell 21.

Accordingly, in the correction of the color mixture according to the fourth embodiment of the present invention, the values of the correction parameters Ka, Kb, Kc, and Kd used in the correction of the color mixture in the first to third embodiments are set in accordance with the aperture diameter, that is, the f-number of the aperture 1b to constantly realize appropriate correction of the color mixture even if the f-number is varied due to the status of the subject or the instruction from the user. The setting of the correction parameters Ka, Kb, Kc, and Kd in accordance with the f-number is performed by the camera controller 5 shown in FIG. 1.

Figure 49:
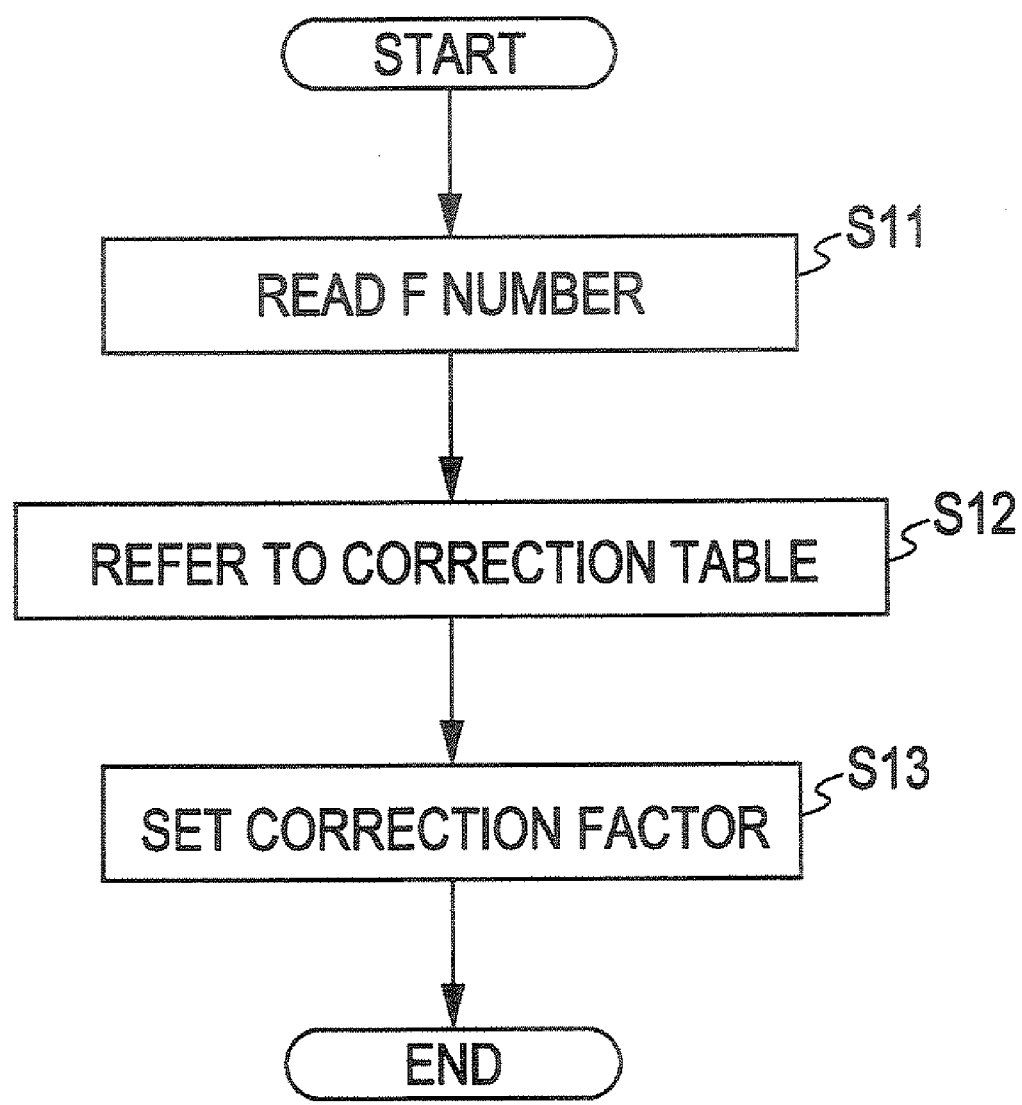
FIG. 49 is a flowchart showing a correction process performed by a camera controller according to the fourth embodiment of the present invention.

FIG. 49 is a flowchart showing a correction process performed by the camera controller 5. Specifically, FIG. 49 shows a process of setting the correction values of the correction parameter Ka, Kb, Kc, and Kd in accordance with the f-number. This correction process is repeated every update period of an image.

After the correction process is started, in Step S11, the camera controller 5 reads the current f-number of the aperture 1b from detected data supplied from the digital signal processing circuit 4 or from data set by the user, supplied from the human I/F controller 6. The values of the correction parameters Ka, Kb, Kc, and Kd corresponding to the f-number are held in advance in a correction table (for example, a ROM table). In Step S12, the camera controller 5 reads out the correction values corresponding to the f-number, acquired in Step S11, from the correction table. In Step S13, the camera controller 5 sets the correction values read out from the correction table and transmits the set values to the color-mixture correction circuit 11 in the digital signal processing circuit 4 (refer to FIGS. 7 and 28).

The correction of the color mixture according to the first to third embodiments of the present invention is performed to the signal from the target pixel by using the signals from the multiple neighboring pixels adjacent to the target pixel and the correction parameters independently set for the signals. Setting the values of the correction parameters in accordance with the f-number (the aperture diameter of the aperture 1b) in this correction of the color mixture can provide the directionality to the amount of correction of the color mixture from the neighboring pixels into the target pixel. In addition, it is possible to constantly perform appropriate correction of the color mixture eve if the f-number is varied due to the status of the subject or the instruction from the user.

Although the CMOS image sensor is exemplified as the solid-state imaging device in the above embodiments of the present invention, the present invention is not limited to the application to the CMOS image sensor. The present invention is applicable to amplified solid-state image sensors other than CMOS image sensors and, further, to any solid-state imaging device, such as charge transfer solid-state imaging devices typified by CCD image sensors.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus for a solid-state imaging device, the apparatus correcting a color mixture between pixel cells in the solid-state imaging device in which the pixel cells including photoelectric transducers are two-dimensionally arranged in an array and in which color filters having primary color components for generating luminance components and other color components are arranged over the pixel cells, the signal processing apparatus comprising:

correction processing means for performing a correction to a signal from a target pixel by using signals from a plurality of pixels adjacent to the target pixel in the solid-state imaging device and correction parameters independently set for each of the signals from the plurality of pixels adjacent to the target pixel such that different amounts of correction may be set for each of the adjacent pixels.

2. The signal processing apparatus for the solid-state imaging device according to claim 1, wherein the color filters include color coding in which the primary color components are arranged to surround other color components.

3. The signal processing apparatus for the solid-state imaging device according to claim 1, wherein the plurality of pixels include four pixels in contact with sides of the target pixel.

4. The signal processing apparatus for the solid-state imaging device according to claim 3, wherein the correction processing means includes:

subtracting means for calculating differences between the signal from the target pixel and the signals from the four pixels;

multiplying means for multiplying the differences corresponding to the four pixels by the correction parameters to obtain multiplication results; and adding means for adding the multiplication results to the signal from the target pixel to calculate a correction signal.

5. The signal processing apparatus for the solid-state imaging device according to claim 1, wherein values of the correction parameters are arbitrarily and externally set by communication.

6. The signal processing apparatus for the solid-state imaging device according to claim 5, wherein the values of the correction parameters are set for every color of the color filters.

7. The signal processing apparatus for the solid-state imaging device according to claim 5, wherein the values of the correction parameters are set in accordance with an aperture diameter of an aperture included in an optical system through which light from a subject is led to the solid-state imaging device.

8. A signal processing method of correcting a color mixture between pixel cells in a solid-state imaging device in which the pixel cells including photoelectric transducers are two-dimensionally arranged in an array and in which color filters having primary color components for generating luminance components and other color components are arranged over the pixel cells, the signal processing method comprising the step of:

performing a correction to a signal from a target pixel by using signals from a plurality of pixels adjacent to the target pixel in the solid-state imaging device and correction parameters independently set for each of the signals from the plurality of pixels adjacent to the target pixel such that different amounts of correction may be set for each of the adjacent pixels.

9. An imaging system, comprising:

a solid-state imaging device in which pixel cells including photoelectric transducers are two-dimensionally arranged in an array and in which color filters having primary color components for generating luminance components and other color components are arranged over the pixel cells;

an optical system through which light from a subject is led to the solid-state imaging device;

and correction processing means for performing correction to a signal from a target pixel by using signals from a plurality of pixels adjacent to the target pixel in the solid-state imaging device and correction parameters independently set for each of the signals from the plurality of pixels adjacent to the target pixel such that different amounts of correction may be set for each of the adjacent pixels.

10. A signal processing apparatus for a solid-state imaging device, the apparatus correcting a color mixture between pixel cells in the solid-state imaging device in which the pixel cells including photoelectric transducers are two-dimensionally arranged in an array and in which color filters having primary color components for generating luminance components and other color components are arranged over the pixel cells, the signal processing apparatus comprising:

a correction processing unit that performs a correction to a signal from a target pixel by using signals from a plurality of pixels adjacent to the target pixel in the solid-state imaging device and correction parameters independently set for each of the signals from the plurality of pixels adjacent to the target pixel such that different amounts of correction may be set for each of the adjacent pixels.

11. An imaging system, comprising:

a solid-state imaging device in which pixel cells including photoelectric transducers are two-dimensionally arranged in an array and in which color filters having primary color components for generating luminance components and other color components are arranged over the pixel cells;

an optical system through which light from a subject is led to the solid-state imaging device; and a correction processing unit that performs correction to a signal from a target pixel by using signals from a plurality of pixels adjacent to the target pixel in the solid-state imaging device and correction parameters independently set for each of the signals from the plurality of pixels adjacent to the target pixel such that different amounts of correction may be set for each of the adjacent pixels.

12. The signal processing apparatus for the solid-state imaging device according to claim 10, wherein the color filters include color coding in which the primary color components are arranged to surround other color components.

13. The signal processing apparatus for the solid-state imaging device according to claim 10, wherein the plurality of pixels include four pixels in contact with sides of the target pixel.

14. The signal processing apparatus for the solid-state imaging device according to claim 13, wherein the correction processing means includes:
- subtracting means for calculating differences between the signal from the target pixel and the signals from the four pixels;
- multiplying means for multiplying the differences corresponding to the four pixels by the correction parameters to obtain multiplication results; and
- adding means for adding the multiplication results to the signal from the target pixel to calculate a correction signal.

15. The signal processing apparatus for the solid-state imaging device according to claim 10, wherein values of the correction parameters are arbitrarily and externally set by communication.

16. The signal processing apparatus for the solid-state imaging device according to claim 15, wherein the values of the correction parameters are set for every color of the color filters.

17. The signal processing apparatus for the solid-state imaging device according to claim 15, wherein the values of the correction parameters are set in accordance with an aperture diameter of an aperture included in an optical system through which light from a subject is led to the solid-state imaging device.

* * * * *